United States Patent
Brunner et al.

(10) Patent No.: US 10,981,696 B2
(45) Date of Patent: *Apr. 20, 2021

(54) UTILITY ASSEMBLY AND COUPLING MECHANISM

(71) Applicants: Keter Plastic Ltd., Herzliya (IL); Milwaukee Electric Tool Corporation, Brookfield, WI (US)

(72) Inventors: Yaron Brunner, Kibbutz Gvat (IL); Grant T. Squiers, Cudahy, WI (US); Christopher S. Hoppe, Milwaukee, WI (US); Steven W. Hyma, Milwaukee, WI (US)

(73) Assignees: Keter Plastic Ltd., Herzliya (IL); Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,201

(22) Filed: Nov. 29, 2017

(65) Prior Publication Data

US 2018/0161975 A1    Jun. 14, 2018

Related U.S. Application Data

(63) Continuation of application No. PCT/IL2017/050481, filed on Apr. 30, 2017.
(Continued)

(51) Int. Cl.
*B65D 21/02* (2006.01)
*B65D 21/028* (2006.01)
(Continued)

(52) U.S. Cl.
CPC ........... *B65D 21/0223* (2013.01); *A45C 5/14* (2013.01); *A45C 7/005* (2013.01); *A45C 13/02* (2013.01);
(Continued)

(58) Field of Classification Search
CPC ......... A47B 47/00; A47B 67/04; A47B 87/02; A47B 87/007; A47B 87/0276;
(Continued)

(56) References Cited

U.S. PATENT DOCUMENTS 2,042,387 A     5/1936   Cobb
2,430,200 A  *  11/1947  Wilson ................... E04F 13/10
                                                      52/536

(Continued)

FOREIGN PATENT DOCUMENTS

CN         2608238 Y      3/2004
CN       200947356 Y      9/2007
(Continued)

OTHER PUBLICATIONS

International Search Report for International Application No. PCT/IL2017/050481 dated Aug. 20, 2017.
(Continued)

*Primary Examiner* — Gideon R Weinerth
(74) *Attorney, Agent, or Firm* — Mintz Levin Cohn Ferris Glovsky and Popeo, P.C.

(57) ABSTRACT

The present disclosure concerns a coupling mechanism for detachably attaching two or more utility modules to one another, utility assembles, mobile carriers and other attachable modules and articles.

20 Claims, 48 Drawing Sheets

Related U.S. Application Data

(60) Provisional application No. 62/459,076, filed on Feb. 15, 2017, provisional application No. 62/330,334, filed on May 2, 2016.

(51) Int. Cl.
  *A45C 13/02* (2006.01)
  *B25H 3/02* (2006.01)
  *A45C 5/14* (2006.01)
  *A45C 7/00* (2006.01)
  *A45F 3/10* (2006.01)
  *B25H 1/04* (2006.01)
  *B62B 1/14* (2006.01)
  *B62B 5/06* (2006.01)

(52) U.S. Cl.
  CPC ............... *A45F 3/10* (2013.01); *B25H 1/04* (2013.01); *B25H 3/02* (2013.01); *B25H 3/021* (2013.01); *B62B 1/14* (2013.01); *B65D 21/0209* (2013.01); *B65D 21/0228* (2013.01); *A45C 7/0045* (2013.01); *B25H 3/023* (2013.01); *B62B 5/067* (2013.01); *B65D 2255/00* (2013.01); *B65D 2701/533* (2013.01)

(58) Field of Classification Search
  CPC .... A47B 88/90; B65D 21/0224; B65D 21/02; B65D 21/0223; B65D 21/0212; B65D 21/0217; B65D 21/0219; B65D 21/0222; B65D 21/0228; B65D 21/023; B65D 25/2823; B65D 25/06; B65D 21/0204; B65D 21/00; B25H 3/021; B25H 3/022; B25H 3/023; B25H 3/04; B25H 3/06; B25H 3/02; Y10T 403/7045; A45C 7/0045; A45C 5/14
  USPC ..... 206/508, 511, 504, 302, 501; 280/47.18, 280/47.19, 47.26, 79.2, 47.28, 652; 312/107, 111
  See application file for complete search history.

(56) References Cited

U.S. PATENT DOCUMENTS

| | | | |
|---|---|---|---|
| 2,970,358 A | 2/1961 | Elsner | |
| 3,005,282 A | 10/1961 | Christiansen | |
| 3,117,692 A * | 1/1964 | Carpenter | B65D 21/0219 206/501 |
| 3,506,321 A * | 4/1970 | Hampel | A47B 87/02 312/107 |
| 3,974,898 A * | 8/1976 | Tullis | A45C 7/0045 190/3 |
| 4,168,076 A | 9/1979 | Johnson | |
| 5,035,445 A | 7/1991 | Poulin | |
| 5,105,947 A | 4/1992 | Wise | |
| 5,240,264 A | 8/1993 | Williams | |
| 5,301,829 A | 4/1994 | Chrisco | |
| 5,429,260 A * | 7/1995 | Vollers | B65D 11/10 220/4.33 |
| 5,595,228 A * | 1/1997 | Meisner | B25H 1/04 144/285 |
| 5,608,603 A | 3/1997 | Su | |
| 5,628,443 A * | 5/1997 | Deutsch | A45C 7/0086 150/113 |
| D395,533 S | 6/1998 | Morison et al. | |
| 5,797,617 A | 8/1998 | Lin | |
| 5,951,037 A | 9/1999 | Hsieh et al. | |
| 5,988,473 A * | 11/1999 | Hagan | B60R 9/00 224/404 |
| 6,050,660 A | 4/2000 | Gurley | |
| 6,085,925 A * | 7/2000 | Chung | H05K 5/0021 206/511 |
| 6,109,627 A | 8/2000 | Be | |
| 6,176,559 B1 | 1/2001 | Tiramani et al. | |
| D437,669 S | 2/2001 | Blason et al. | |
| 6,347,847 B1 | 2/2002 | Tiramani et al. | |
| 6,367,631 B1 | 4/2002 | Steigerwald | |
| 6,371,320 B2 | 4/2002 | Sagol | |
| D456,972 S | 5/2002 | Blason et al. | |
| 6,431,580 B1 | 8/2002 | Kady | |
| 6,547,347 B2 * | 4/2003 | Saito | G06F 1/184 292/177 |
| 6,601,930 B2 | 8/2003 | Tiramani et al. | |
| 6,619,772 B2 | 9/2003 | Dierbeck | |
| 6,637,707 B1 | 10/2003 | Gates et al. | |
| 6,641,013 B2 * | 11/2003 | Dise | B60R 9/00 220/23.2 |
| 6,945,546 B2 | 9/2005 | Guirlinger | |
| 6,948,691 B2 | 9/2005 | Brock et al. | |
| 6,983,946 B2 | 1/2006 | Sullivan et al. | |
| 7,044,484 B2 | 5/2006 | Wang | |
| 7,066,475 B2 | 6/2006 | Barnes | |
| D525,789 S | 8/2006 | Hosking | |
| 7,147,243 B2 | 12/2006 | Kady | |
| 7,263,742 B2 | 9/2007 | Valentini | |
| 7,367,571 B1 | 5/2008 | Nichols | |
| 7,503,569 B2 | 3/2009 | Duvigneau | |
| 7,658,887 B2 | 2/2010 | Hovatter | |
| 7,779,764 B2 | 8/2010 | Naidu et al. | |
| 7,780,026 B1 | 8/2010 | Zuckerman | |
| D627,967 S | 11/2010 | Kuhls | |
| 7,841,144 B2 * | 11/2010 | Pervan | E04F 15/02 52/395 |
| D630,851 S | 1/2011 | Landau et al. | |
| 8,028,845 B2 | 10/2011 | Himes | |
| D653,832 S | 2/2012 | Vilkomirski et al. | |
| 8,132,819 B2 * | 3/2012 | Landau | B25H 3/028 280/47.131 |
| 8,177,463 B2 | 5/2012 | Walker | |
| D661,858 S | 6/2012 | Lifshitz et al. | |
| 8,191,910 B2 | 6/2012 | Landau et al. | |
| D663,952 S | 7/2012 | Crevling, Jr. et al. | |
| D664,354 S | 7/2012 | Crevling, Jr. et al. | |
| D674,605 S | 1/2013 | Vilkomirski et al. | |
| 8,454,033 B2 | 6/2013 | Tsai | |
| 8,459,495 B2 * | 6/2013 | Koenig | B65D 25/2858 220/761 |
| 8,505,729 B2 | 8/2013 | Sosnovsky et al. | |
| 8,567,796 B2 | 10/2013 | Bar-Erez et al. | |
| 8,677,661 B2 * | 3/2014 | Michels | B65D 25/205 40/312 |
| D701,696 S | 4/2014 | Shitrit et al. | |
| 8,689,396 B2 | 4/2014 | Wolfe et al. | |
| 8,714,355 B2 | 5/2014 | Huang | |
| 8,813,960 B2 * | 8/2014 | Fjelland | B65D 21/023 206/503 |
| 8,875,888 B2 | 11/2014 | Koenig et al. | |
| 8,979,100 B2 | 3/2015 | Bensman et al. | |
| 8,985,922 B2 | 3/2015 | Neumann | |
| D738,106 S | 9/2015 | Shitrit | |
| 9,132,543 B2 * | 9/2015 | Bar-Erez | B25H 3/023 |
| D753,394 S | 4/2016 | Brunner | |
| D753,395 S | 4/2016 | Brunner | |
| D765,974 S | 9/2016 | Tonelli et al. | |
| D770,179 S | 11/2016 | Menirom | |
| 9,506,489 B2 * | 11/2016 | Ko | A47B 87/02 |
| 9,511,491 B2 | 12/2016 | Brunner | |
| 9,566,990 B2 * | 2/2017 | Bar-Erez | B25H 3/023 |
| 9,616,562 B2 | 4/2017 | Hoppe et al. | |
| 9,643,629 B2 | 5/2017 | Bar-Erez et al. | |
| D790,221 S | 6/2017 | Yahav et al. | |
| 9,701,443 B2 * | 7/2017 | Wang | B65D 21/0228 |
| 9,725,209 B1 | 8/2017 | Ben-Gigi | |
| 9,872,562 B2 * | 1/2018 | Brunner | A47B 31/00 |
| D814,187 S | 4/2018 | Caglar | |
| D816,334 S | 5/2018 | Brunner | |
| D826,510 S | 8/2018 | Brunner | |
| D828,671 S | 9/2018 | Cope et al. | |
| D833,744 S | 11/2018 | Yahav et al. | |
| D837,515 S | 1/2019 | Shpitzer | |
| 10,434,638 B1 * | 10/2019 | Tsai | B25H 3/023 |
| D871,013 S | 12/2019 | Liu | |

(56) References Cited

U.S. PATENT DOCUMENTS

| | | | |
|---|---|---|---|
| 10,583,962 B2 | 3/2020 | Brunner et al. | |
| D895,967 S | 9/2020 | Brunner et al. | |
| 2002/0000440 A1 | 1/2002 | Sagol et al. | |
| 2002/0171228 A1 | 11/2002 | Kady | |
| 2003/0115715 A1 | 6/2003 | Valentini | |
| 2003/0146589 A1 | 8/2003 | Jarko et al. | |
| 2003/0184034 A1 | 10/2003 | Pfeiffer | |
| 2003/0205877 A1 | 11/2003 | Verna et al. | |
| 2004/0103494 A1 | 6/2004 | Valentini | |
| 2004/0195793 A1 | 10/2004 | Sullivan et al. | |
| 2004/0206656 A1 | 10/2004 | Dubois et al. | |
| 2005/0062244 A1 | 3/2005 | Guirlinger | |
| 2005/0104308 A1 | 5/2005 | Barnes | |
| 2005/0139745 A1 | 6/2005 | Liao et al. | |
| 2006/0006770 A1 | 1/2006 | Valentini | |
| 2006/0027475 A1* | 2/2006 | Gleason | A45C 7/0045 206/373 |
| 2006/0038367 A9* | 2/2006 | Ferraro | A47B 87/0253 280/47.35 |
| 2006/0119060 A1 | 6/2006 | Sullivan et al. | |
| 2006/0186624 A1 | 8/2006 | Kady | |
| 2006/0254946 A1* | 11/2006 | Becklin | B65D 21/0223 206/508 |
| 2007/0068757 A1* | 3/2007 | Tan | A45C 5/143 190/18 A |
| 2007/0090616 A1 | 4/2007 | Tompkins | |
| 2007/0145700 A1 | 6/2007 | Ambrose et al. | |
| 2007/0194543 A1* | 8/2007 | Duvigneau | A45C 5/14 280/47.26 |
| 2008/0104921 A1* | 5/2008 | Pervan | E04F 15/02 52/588.1 |
| 2008/0115312 A1 | 5/2008 | DiPasquale et al. | |
| 2008/0121547 A1 | 5/2008 | Dur et al. | |
| 2008/0134607 A1* | 6/2008 | Pervan | E04B 5/00 52/395 |
| 2008/0169739 A1* | 7/2008 | Goldenberg | B25H 3/04 312/244 |
| 2008/0271280 A1 | 11/2008 | Tiede et al. | |
| 2008/0277221 A1 | 11/2008 | Josefson et al. | |
| 2008/0308369 A1 | 12/2008 | Louis, Sr. | |
| 2009/0026901 A1 | 1/2009 | Nies, III et al. | |
| 2009/0071990 A1 | 3/2009 | Jardine et al. | |
| 2009/0145790 A1 | 6/2009 | Panosian et al. | |
| 2009/0145866 A1* | 6/2009 | Panosian | A47F 5/0838 211/85.15 |
| 2009/0145913 A1 | 6/2009 | Panosian et al. | |
| 2009/0178946 A1 | 7/2009 | Patstone et al. | |
| 2010/0052276 A1 | 3/2010 | Brunner | |
| 2010/0139566 A1 | 6/2010 | Lopuszanski | |
| 2010/0147642 A1 | 6/2010 | Andochick | |
| 2010/0219193 A1* | 9/2010 | Becklin | B65D 21/0224 220/630 |
| 2011/0073516 A1* | 3/2011 | Zelinskiy | B25H 3/02 206/509 |
| 2011/0139665 A1* | 6/2011 | Madsen | B25H 3/026 206/508 |
| 2011/0155613 A1 | 6/2011 | Koenig et al. | |
| 2011/0181008 A1 | 7/2011 | Bensman et al. | |
| 2011/0220531 A1* | 9/2011 | Meether | B62B 3/02 206/508 |
| 2012/0160886 A1 | 6/2012 | Henny et al. | |
| 2012/0180250 A1 | 7/2012 | Ricklefsen et al. | |
| 2012/0207571 A1 | 8/2012 | Scott | |
| 2012/0326406 A1* | 12/2012 | Lifshitz | B25H 3/02 280/47.19 |
| 2013/0024468 A1 | 1/2013 | Kocsis | |
| 2013/0031731 A1 | 2/2013 | Hess | |
| 2013/0031732 A1 | 2/2013 | Hess et al. | |
| 2013/0121783 A1 | 5/2013 | Kelly | |
| 2013/0127129 A1 | 5/2013 | Bensman et al. | |
| 2013/0154218 A1 | 6/2013 | Tiilikainen | |
| 2013/0223971 A1 | 8/2013 | Grace, IV | |
| 2014/0076759 A1 | 3/2014 | Roehm et al. | |
| 2014/0161518 A1 | 6/2014 | Ko | |
| 2014/0166516 A1* | 6/2014 | Martinez | B25H 3/022 206/372 |
| 2015/0274362 A1 | 10/2015 | Christopher et al. | |
| 2015/0376917 A1 | 12/2015 | Brunner | |
| 2016/0023349 A1 | 1/2016 | Hoppe et al. | |
| 2016/0130034 A1* | 5/2016 | Kuhls | B25H 3/023 206/510 |
| 2016/0144500 A1* | 5/2016 | Chen | B25H 3/02 206/349 |
| 2016/0168880 A1* | 6/2016 | Phelan | B65D 55/14 206/1.5 |
| 2017/0121056 A1* | 5/2017 | Wang | B65D 21/0228 |
| 2017/0138382 A1* | 5/2017 | Ko | F16B 12/24 |
| 2017/0165828 A1 | 6/2017 | Fleischmann | |
| 2017/0166352 A1* | 6/2017 | Hoppe | B25H 3/022 |
| 2017/0174392 A1* | 6/2017 | De Loynes | B65D 21/0215 |
| 2017/0217464 A1* | 8/2017 | Bar-Erez | B62B 1/14 |
| 2017/0239808 A1* | 8/2017 | Hoppe | A45C 7/0045 |
| 2017/0257958 A1 | 9/2017 | Sabbag et al. | |
| 2017/0266804 A1* | 9/2017 | Kinskey | B65D 33/14 |
| 2017/0318927 A1* | 11/2017 | Kraus | A45C 3/00 |
| 2017/0349013 A1 | 12/2017 | Grönholm | |
| 2018/0044059 A1 | 2/2018 | Brunner | |
| 2018/0161975 A1* | 6/2018 | Brunner | B62B 1/14 |
| 2018/0220758 A1 | 8/2018 | Burchia | |
| 2018/0290288 A1* | 10/2018 | Brunner | B25H 1/04 |
| 2019/0002004 A1* | 1/2019 | Brunner | B25H 3/02 |
| 2019/0031222 A1 | 1/2019 | Takyar et al. | |
| 2019/0039781 A1* | 2/2019 | Kogel | B65D 21/0212 |
| 2019/0106244 A1* | 4/2019 | Brunner | A45F 3/10 |
| 2019/0225371 A1 | 7/2019 | Hoppe et al. | |
| 2020/0055534 A1 | 2/2020 | Hassell | |

FOREIGN PATENT DOCUMENTS

| | | |
|---|---|---|
| CN | 101068661 A | 11/2007 |
| CN | 102248523 A | 11/2011 |
| CN | 102469899 A | 5/2012 |
| CN | 102834035 A | 12/2012 |
| CN | 302371147 S | 3/2013 |
| CN | 103118578 A | 5/2013 |
| CN | 103659777 A | 3/2014 |
| CN | 204161752 U | 2/2015 |
| DE | 3510307 A1 | 9/1986 |
| DE | 9313802 U1 | 12/1993 |
| DE | 4415638 A1 | 11/1995 |
| DE | 29708343 U1 | 7/1997 |
| DE | 19750543 A1 | 5/1999 |
| DE | 20218996 U1 | 3/2003 |
| DE | 102004057870 A1 | 6/2006 |
| DE | 202011002617 U1 | 4/2011 |
| DE | 102010003754 A1 | 10/2011 |
| DE | 102010003756 A1 | 10/2011 |
| DE | 102012106482 A1 | 1/2014 |
| DE | 102012220837 A1 | 5/2014 |
| DE | 202014103695 U1 | 12/2014 |
| DE | 202015105053 U1 | 10/2016 |
| DE | 202015005752 U1 | 11/2016 |
| DE | 102015112204 A1 | 2/2017 |
| DE | 102015112204 A1 | 2/2017 |
| DE | 102015013053 A1 | 4/2017 |
| DE | 402018201520 | 11/2018 |
| EM | 000705231-0001 | 4/2007 |
| EM | 002419283-0001 | 3/2014 |
| EP | 0916302 A2 | 5/1999 |
| EP | 1321247 A2 | 6/2003 |
| EP | 1428764 B1 | 6/2006 |
| EP | 1819487 | 8/2007 |
| EP | 2289671 A2 | 3/2011 |
| EP | 2346741 A1 | 7/2011 |
| EP | 2456341 | 5/2012 |
| EP | 2555660 | 2/2013 |
| EP | 2555661 | 2/2013 |
| EP | 2805799 A2 | 11/2014 |
| EP | 3141354 A1 | 3/2017 |
| GB | 694707 A | 7/1953 |
| GB | 2047181 B | 2/1983 |
| GB | 2330521 A | 4/1999 |

(56) References Cited

FOREIGN PATENT DOCUMENTS

| | | | |
|---|---|---|---|
| GB | 2406331 A | 3/2005 |
| GB | 2413265 A | 10/2005 |
| JP | 2003194020 A | 7/2003 |
| JP | 1276744 S | 7/2006 |
| JP | D1395115 S | 8/2010 |
| JP | 1477050 S | 8/2013 |
| JP | D1503434 S | 7/2014 |
| KR | 30-0271616 | 2/2000 |
| KR | 30-0320243 | 6/2002 |
| KR | 3008422360000 | 3/2016 |
| KR | 3008599650000 | 6/2016 |
| KR | 3008812960000 | 11/2016 |
| KR | 3009995990000 | 3/2019 |
| TW | I324578 B | 5/2010 |
| TW | 135074 S | 6/2010 |
| TW | 168686 S | 7/2015 |
| TW | 174412 S1 | 3/2016 |
| WO | 2005045886 A2 | 5/2005 |
| WO | WO-2007121745 A1 | 11/2007 |
| WO | WO-2007121746 A2 | 11/2007 |
| WO | WO-2009140965 A1 | 11/2009 |
| WO | WO-2011009480 A1 | 1/2011 |
| WO | WO-2013026084 A1 | 2/2013 |
| WO | WO-14125488 A2 | 8/2014 |
| WO | 2016142935 A1 | 9/2016 |
| WO | 2017028845 A1 | 2/2017 |
| WO | WO-2017191628 A1 | 11/2017 |
| WO | WO-2017212840 A1 | 12/2017 |

OTHER PUBLICATIONS

Non-Final Rejection dated Jun. 14, 2018, in U.S. Appl. No. 15/826,232. (12 Pages).
Final Rejection dated Nov. 28, 2018, in U.S. Appl. No. 15/826,232 (14 Pages).
International Search Report and Written Opinion for International Application No. PCT/US2018/044629, dated Jan. 9, 2019 (20 Pages).
International Search Report and Written Opinion for International Application No. PCT/US2018/033161, dated Aug. 6, 2018 (14 Pages).
Non-Final Rejection dated Jan. 24, 2019, in U.S. Appl. No. 16/216,724 (17 Pages).
Sortimo Logistixx, Sortimo International GmbH, Mobile Sortimente, http://p125638.mittwaldserver.info/fileadmin/media/PDFs/Logistixx_Broschuere_DE_WEB.pdf.
ToolGuyd. Sys-Cart Base, a Systainer Mounting Platform, https://toolguyd.com/systainer-sys-cart-mounting-base/.
BluCave Video. https://www.youtube.com/watch?v=Sw7fQQPwOtY&feature=youtu.be&t=.
Batavia Gmbh. BluCave Storage System. https://protect-us.mimecast.com/s/5XIGCR6KypcgJnIKi9EDoim?domain=batavia.eu.
ITS. Dewalt 171229 Dewalt TSTAK Carrier Trolley, https://www.its.co.uk/pd/171229-Dewalt-TSTAK-Carrier-Trolley-_DEW171229.htm.
Youtube. TSTAK Phase 2 Upgrades Video. https://www.youtube.com/watch?v=jb06y6J1dr4&feature=youtu.be&t=197.
Get Tools Direct. TSTAK Vac Rack (Suits DWV902M & DWV900L) DwV9500-XJ, https://www.gettoolsdirect.com.au/dewalt-tstak-vac-rack-suits-dwv902m-and-dwv900l-dwv9500-xj.html.
Vertak. https://www.alibaba.com/product-detail/Vertak-global-patented-multi-funciton-portable_60217794260.html.
ToolGuyd. Ryobi ToolBlox Tool Cabinet System, https://toolguyd.com/ryobi-toolblox-cabinets/.
Batavia. BluCave Universal Storage System, https://batavia.eu/blucave-storage-system/.
The Greenhead. Blitz Box—Portable Storage Box/Shelf, https://www.thegreenhead.com/2013/03/blitz-box-portable-storage-box-shelf.php.
Amazon. Hopkins FloTool 91002 Thino Box with Mount, https://www.amazon.com/exec/obidos/ASIN/B003K15F31/20140000-20.
International Search Report for International Application No. PCT/IL2019/050689, dated Aug. 23, 2019 (3 pages).
Milwaukee Dolly, announced 2019 (online), (site visited Mar. 9, 2020). Available from internet, URL: https://www.zoro.com/milwaukee-tool-box-dolly-7-4164-h-18-2932-w-48-22-8410/i/G3958724/ (Year: 2019).
Wheel board, announced 2019 (online), (site visited Mar. 9, 2020). Available from internet, URL: https://www.gearooz.com accu-case-aca-wheel-board (Year: 2019).
Neue Produktfamilie: Systemboxen—Durchdacht, Komfortabel Und in Wertigem Design (dated Oct. 19, 2015), Wayback machine archive (dated Dec. 16, 2015), Auer Packaging präsentiert neue Produktfamilie Systemboxen (dated Sep. 2015), and images, with certified translations.
Messetermine 2016 (dated Feb. 18, 2016), Wayback machine archive (dated Apr. 4, 2016), AUER Packaging im in-und Ausland present (dated Feb. 2016), and photograph, with certified translations.
AUER Packaging 1 2016.
Nugent, Paul. "Rotational Molding." Applied Plastics Engineering Handbook Processing and Materials, edited by Myer Kutz, Elsevier Inc., 2011, pp. 311-332.
Kazmer, David. "Design of Plastic Parts." Applied Plastics Engineering Handbook Processing and Materials, edited by Myer Kutz, Elsevier Inc., 2011, pp. 535-551.
Cain, Tristan. "Bird Billder, er—Builder." Brick Journal, Nov. 2013 (Issue 26), pp. 15-16.
"Cavity". Merriam-Webster's Collegiate Dictionary (11th Ed.), Merriam-Webster, Incorporated, 2020, p. 197.
AUER Packaging 2 2016.
Forum Post: Systainer clone (dated Feb. 15, 2016).
"Structure Design", Design Solutions Guide, BASF Corporation, 2007.
General Design Principles for DuPont Engineering Polymers, E.I. du Pont de Nemours and Company, 2000.

\* cited by examiner

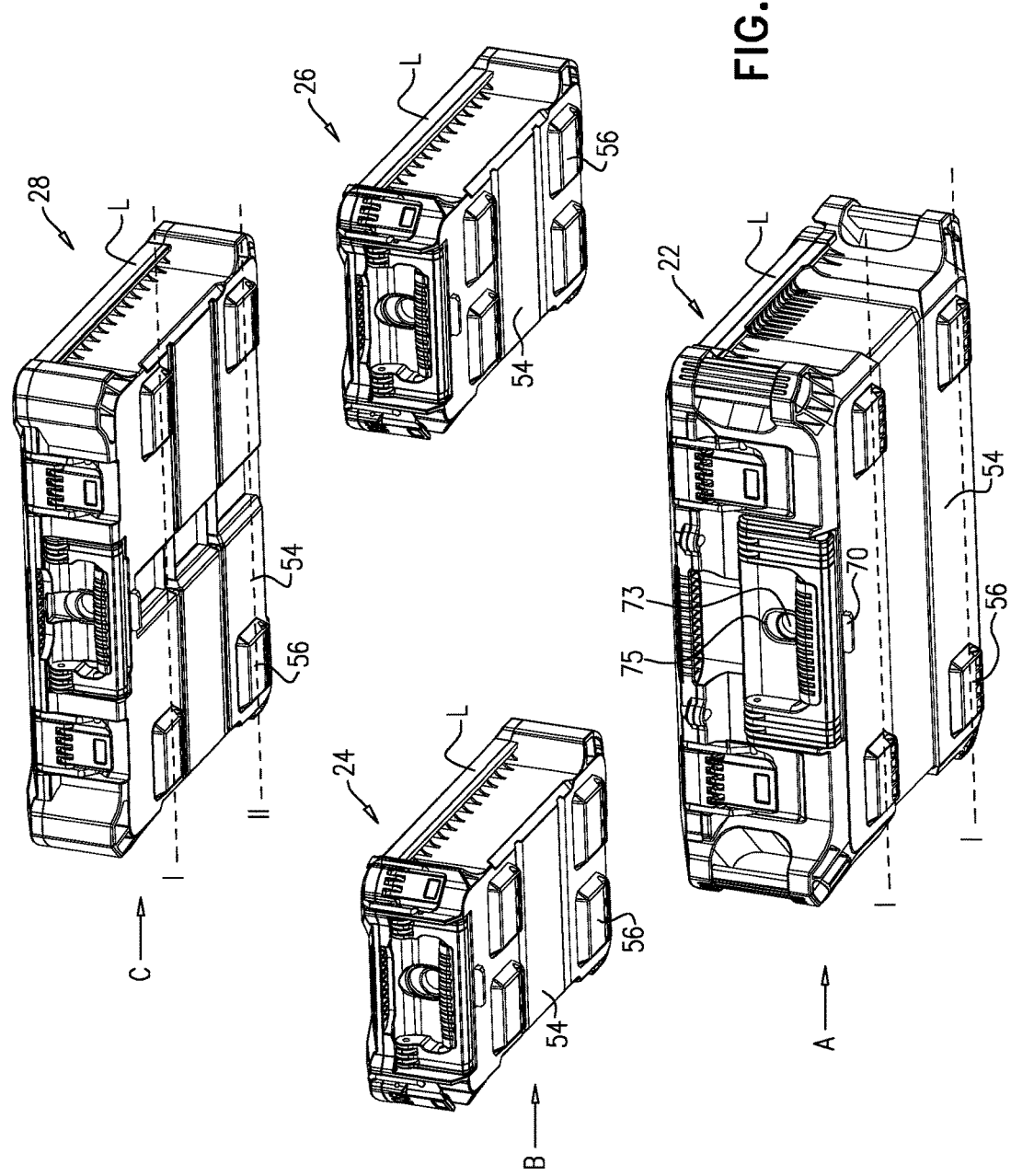

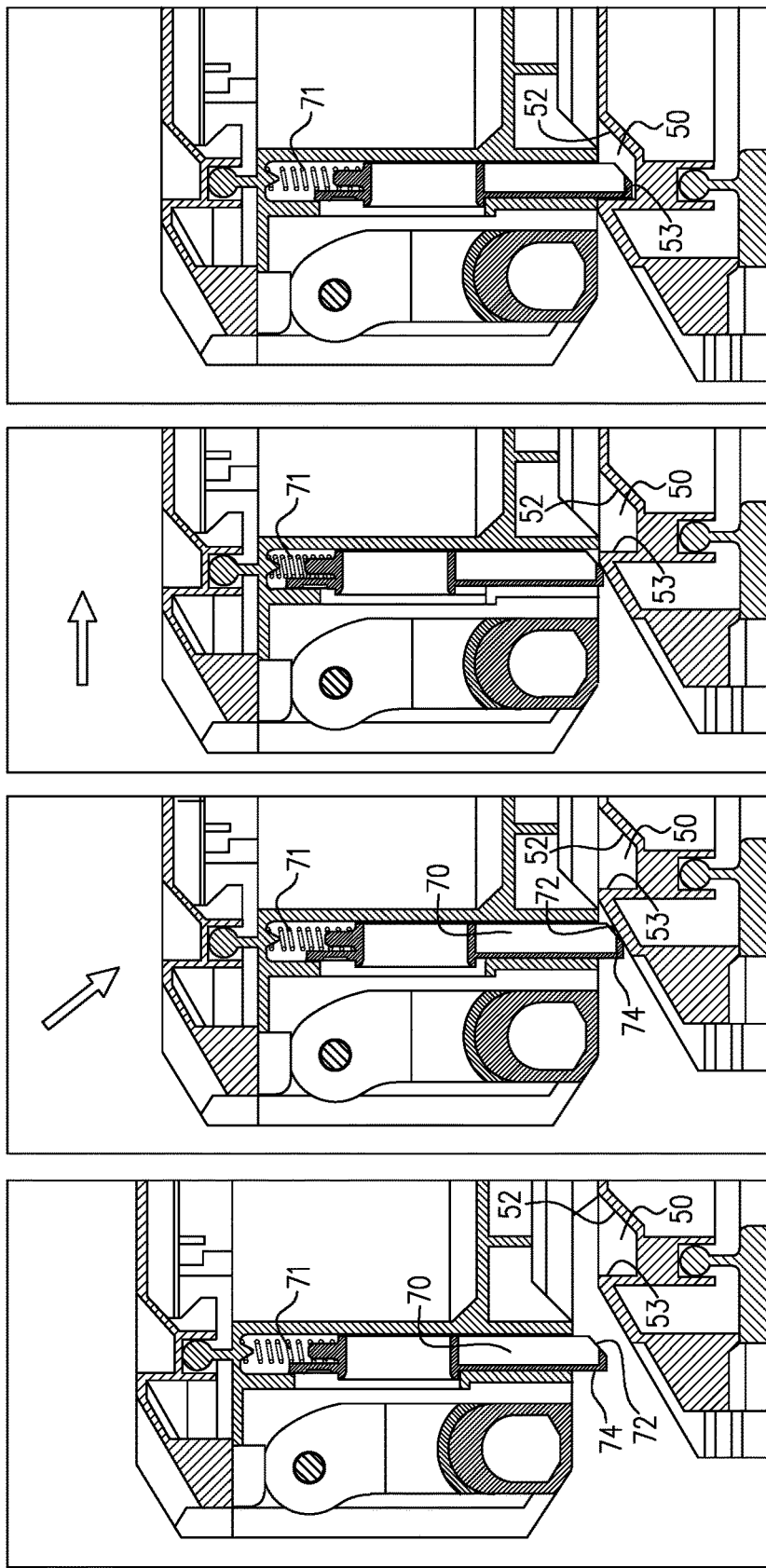

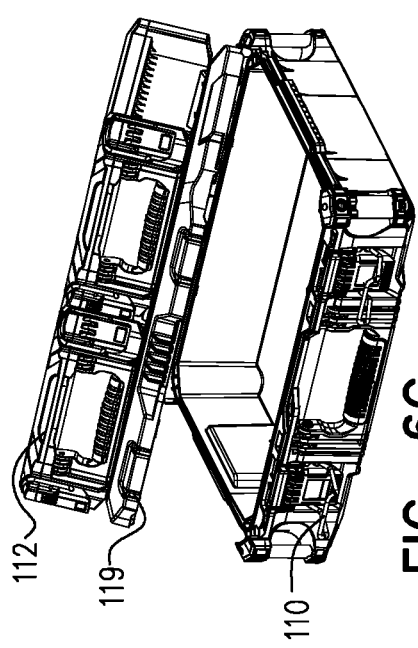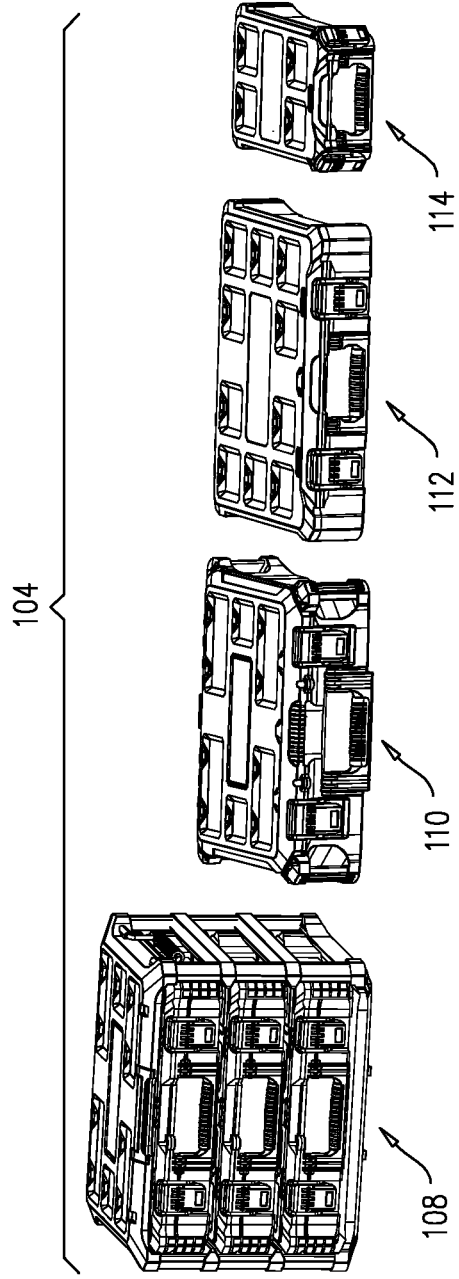

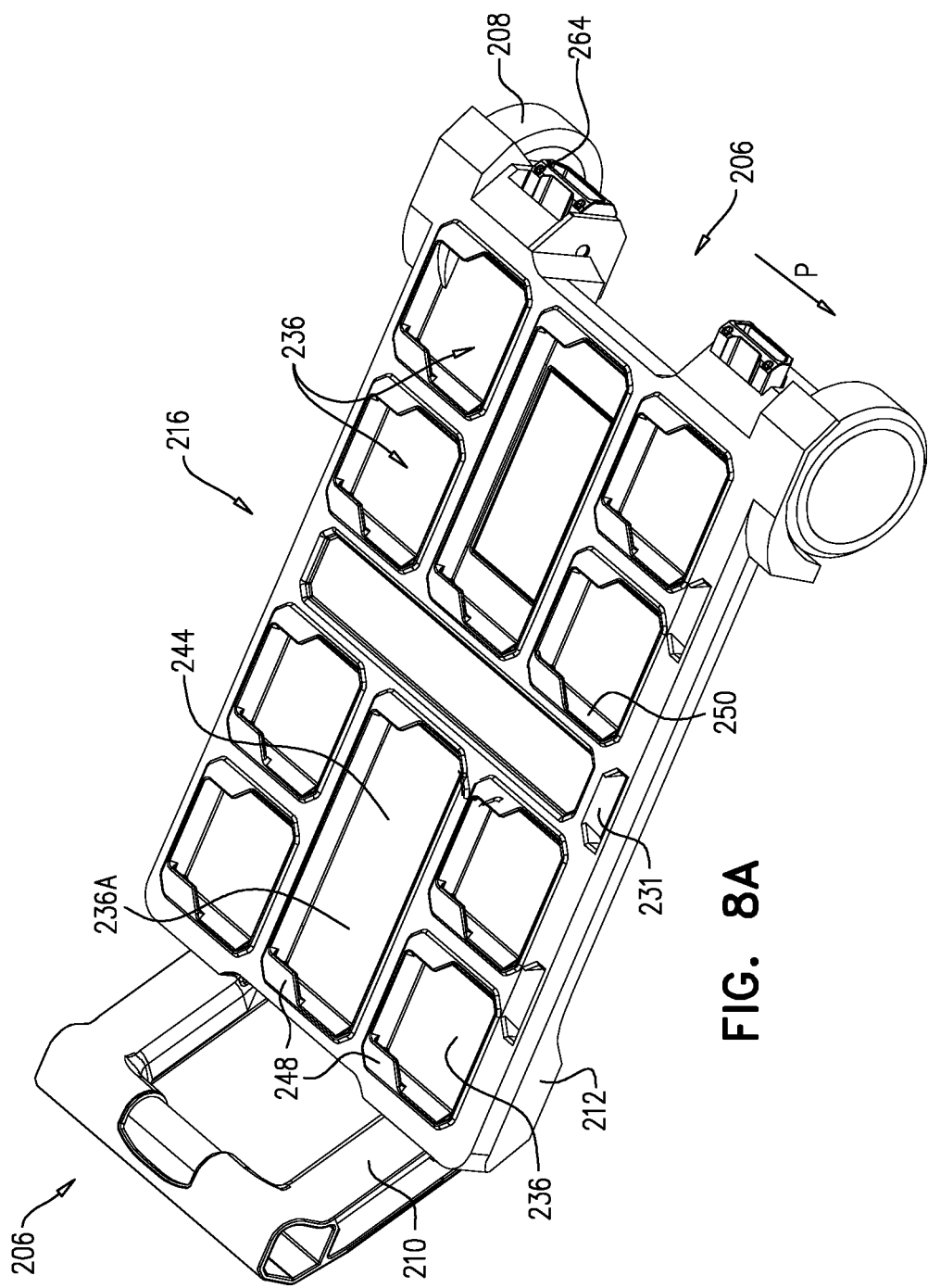

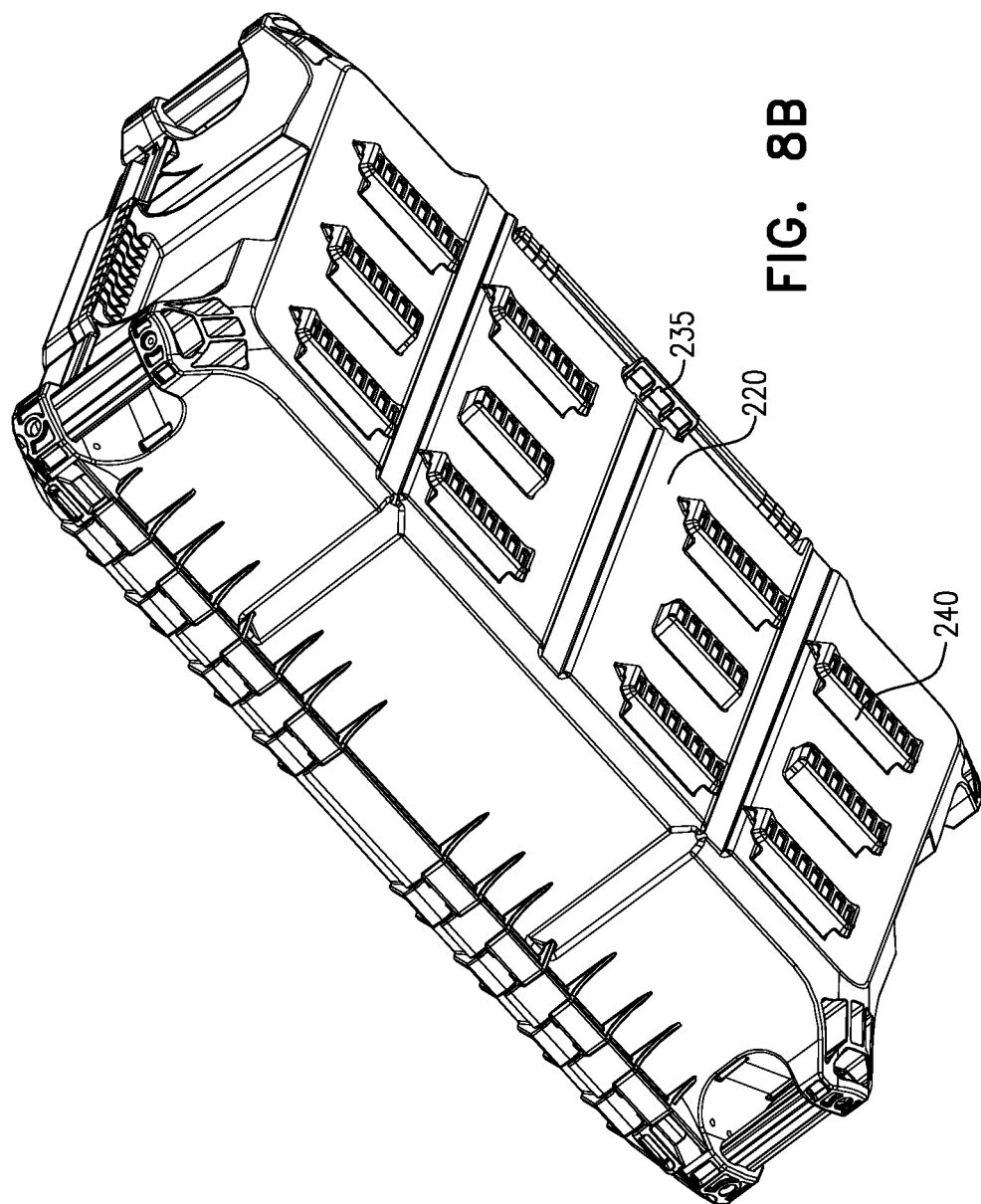

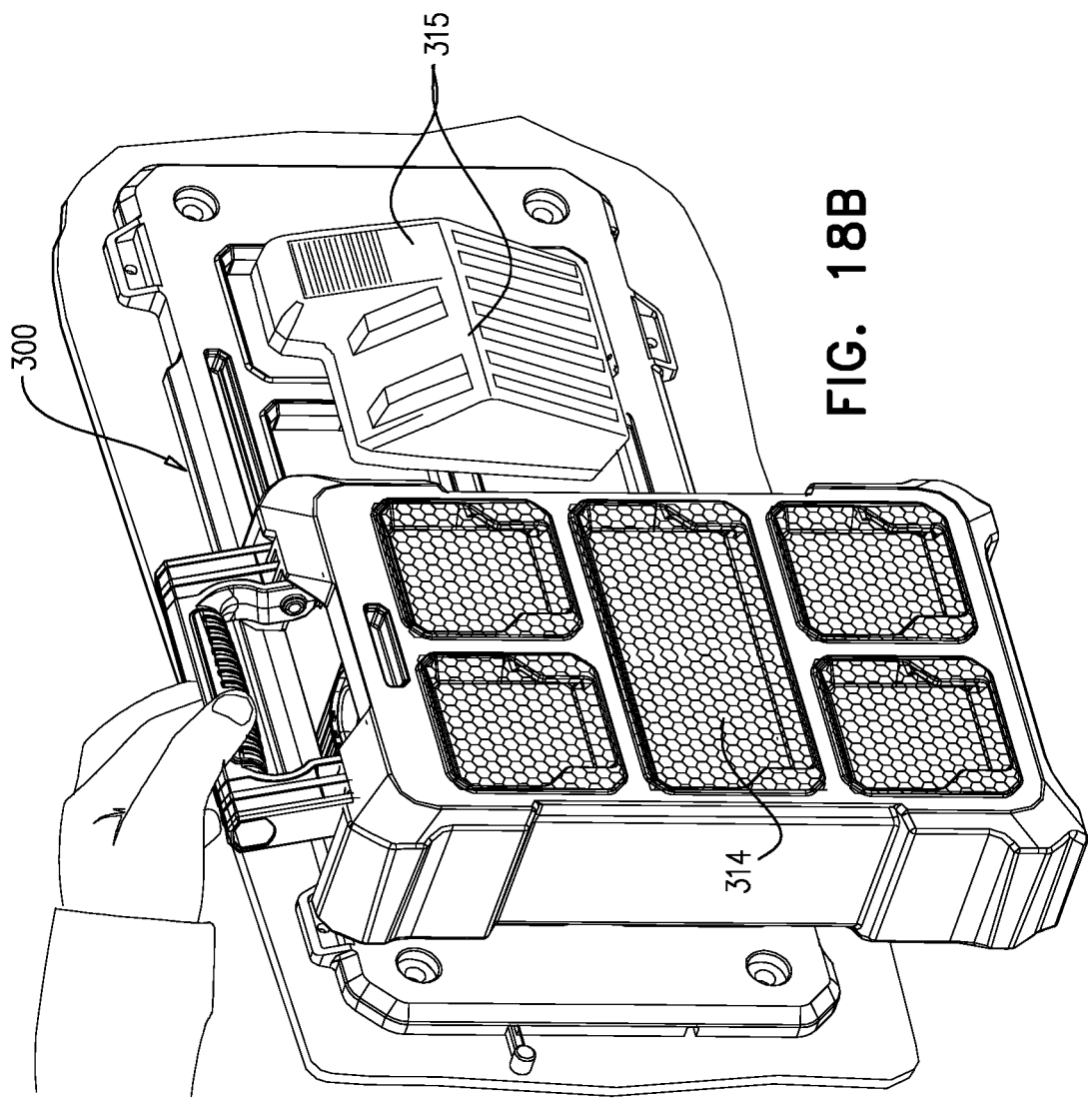

UTILITY ASSEMBLY AND COUPLING MECHANISM

TECHNOLOGICAL FIELD

The present disclosure is directed to a container assembly and more specifically to a utility assembly comprising two or more detachably attachable utility modules. The disclosure is further concerned with a coupling mechanism facilitating detachably attaching the utility modules to one another.

The term 'utility module' is used hereinafter in its broad meaning and is meant to denote a variety of articles such as, storage containers, travel luggage, tool boxes, organizers, compacted work benches, cable storage, tools (e.g., hand tools, power generators and power sources), communication modules, carrying platforms, locomotion platforms, etc., of any shape and size, and wherein any utility module can be detachably attached to any other utility module.

The term 'utility assembly' as used herein denotes any set of utility modules configured for articulation to one another, either as a stationary unit or locomotive.

GENERAL DESCRIPTION

A first aspect of the disclosure concerns a coupling mechanism configured for readily detachably attaching any first article to any second article, wherein any first article and any second article can be any utility module.

The coupling mechanism comprises a male coupler at a face of one of the first utility module and the second utility module, and a female coupler at a face of the other one of the first utility module and the second utility module, said female coupler has a depressed locking location configured with at least one locking rib extending above a depressed surface and along a sliding path, and having an open edge facing in a first sense; said male coupler has a projecting locking location disposed in register with said depressed locking location and configured with at least one locking tongue extending along said engaging sliding path at a second sense, opposite to said first sense, and configured for arresting engagement at a space between said locking rib and depressed surface, the coupling mechanism further comprises at least one locking member for arresting the first utility module with respect to said second utility module and preventing sliding displacement along said sliding path.

The arrangement is such that at a locked position of a utility assembly the at least one locking tongue of the male coupler engages below said at least one locking rib of the female coupler and the at least one locking member is engaged, thus preventing any respective displacement between the first utility module and the second utility module, and retaining the coupling mechanism at an engaged and locked position.

The term 'first utility module' as used herein denotes any utility module bearing at least one second utility module over a first surface thereof. The second utility module of a utility assembly may comprise three or more stages of utility modules, and functions as first utility module with respect to a third stage utility module mounted thereover and serving in turn as a second utility module.

According to certain embodiments, one or more female couplers are configured at the top face of the first utility module, and one or more male couplers are configured at the bottom face of the second utility module The disclosed subject-matter is directed to a utility module configured with at least one of a male coupling mechanism and a female coupling mechanism of the disclosure, a module assembly comprising one or more utility modules of the aforementioned type and a set of utility modules of the aforementioned type.

According to a configuration of the first aspect, there is provide a utility assembly comprising at least a first utility module and at least a second utility module, and comprising a coupling mechanism configured between the first utility module and the second utility module; said coupling mechanism comprising at one of a top face of the first utility module and a bottom face of the second utility module one or more depressed locking locations each configured with a locking rib, and at least one locking latch arresting location; and the other one of said top face of the first utility module and a bottom face of the second utility module comprises one or more projecting portions each configured with a locking tongue disposed in register with said one or more depressed locking locations, and at least one locking latch disposed in register with said at least one locking latch arresting location.

The arrangement is such that, at a locked position, the bottom face of the second utility module at least partially rests over the top face of the first utility module, and the one or more projecting tongues are arrested by the corresponding one or more locking ribs, and the at least one locking latch is arrested by corresponding at least one locking latch arresting location, thereby preventing sliding displacement between the first utility module and the second utility module, and further wherein disengaging the second utility module from the first utility module is facilitated by disengaging the at least one locking latch from the at least one locking latch arresting location.

Locking engagement between the second utility module and the first utility module is obtained when the one or more depressed locking locations and the one or more projecting portions are disposed behind one another (though not necessarily aligned).

According to a particular configuration of the coupling mechanism, the one or more depressed locking locations and the one or more locking latch arresting locations are configured at the top face of the first utility module, and the one or more projecting portions and the at least one locking latch are configured at the bottom face of the second utility module. According to this configuration, locking between the first utility module and the second utility module is obtained by positioning the second utility module over the second utility module such that one or more locking tongues of the projecting portions engages with one or more respective locking ribs of the depressed locking locations, and wherein the locking latch interlocks with the respective locking latch arresting location.

The arrangement being such that the attaching engagement between the second utility module and the first utility module takes place when the one or more locking tongues and the corresponding one or more respective locking ribs are engaged, thereby preventing vertical separation between the utility modules (i.e. preventing lifting of the second utility module of the first utility module), and further when the locking latch is arrested by the respective locking latch arresting location, thereby preventing sliding displacement of the utility modules one with respect to the other (i.e. sliding displacement of the second module over the first module).

Disengaging the second utility module from the first utility module can be facilitated only after disengaging the locking latch from said locking latch arresting location.

According to a second aspect of the disclosure there is disclosed a coupling mechanism for a utility assembly comprising at least a first utility module and at least a second utility module, said coupling mechanism is configured between the first utility module and the second utility module and comprises at one of a top face of the first utility module and a bottom face of the second utility module with at least one depressed locking location configured with a locking rib, and at least one locking latch arresting location; and the other one of said top face of the first utility module and a bottom face of the second utility module comprises at least one projecting portion with a locking tongue disposed in register with said at least one depressed locking location, and at least one locking latch disposed in register with said at least one locking latch arresting location; and wherein at a locked position the bottom face at least partially rests over the top face, and the at least one projecting tongue is arrested by the corresponding at least one locking rib and the at least one locking latch is arrested by corresponding at least one locking latch arresting location, and further wherein disengaging the second utility module from the first utility module is facilitated by disengaging the at least one locking latch from the at least one locking latch arresting location.

Engaging the first and second utility modules into the locked position is provided by sliding the second utility module with respect to the first utility module along a sliding path defined by at least one of said at least one locking rib and said at least one locking tongue.

According to one particular configuration the at least one locking rib extends substantially parallel to the sliding path and according to another configuration the at least one locking rib extends substantially perpendicular and intersects the sliding path.

A third aspect of the present disclosure is directed to a utility module being a mobile carrier unit and comprising at least one carrier engagement surface, compatible for interlocking engagement in a detachable manner with a first engagement surface of a utility module.

The term carrier unit as used herein denotes any kind of propelled cart configured for detachably attaching and carrying load. The carrier unit may be a hand cart, a mobile tool cart, a mobile workshop, traveling luggage cart, a trolley, etc.

With particular reference to the third aspect, the carrier engagement surface can be larger than the utility module's first engagement surface corresponding with it. In this case, several utility modules may be interlocked simultaneously upon one carrier unit.

According to one configuration there is disclosed a carrier unit comprising a manipulating arrangement, a locomotion system, and an engagement surface comprising one or more engaging elements. The carrier unit is designated for detachable interlocking engagement with one or more utility modules, each comprising a first engagement surface configured with one or more first engaging elements compatible for detachable interlocking engagement with the carrier engaging elements.

According to yet configuration there is disclosed an assembly comprising a carrier unit comprising an engagement surface comprising one or more engaging elements, and at least one utility module configured with at least one first engagement surface comprising one or more first engaging elements compatible for detachable interlocking engagement with the carrier unit's engaging elements.

According to a modification of this aspect, there is also provided a container unit comprising a top member configured with a second engagement surface of the utility module, said top member, according to one example constitutes a cover of the utility module.

The arrangement is such that a container unit can be readily and easily applied over and interlockingly articulated to a carrier unit, or over a utility module configured with a second engagement surface mimicking the first engagement surface second engagement surface mimicking the first engagement surface of the carrier unit.

Engagement between the carrier unit and the container, and further between two containers, is facilitated by any locking mechanism of the disclosure hereinabove and hereinafter.

According to a specific example, there is a latching mechanism, wherein the first engaging elements of the carrier unit are configured for interlocking engagement with engaging elements of the mating surface of the respective utility module. The latching mechanism may assume various configurations, e.g., male-female couplings, dovetail couplings, and the like. The arrangement being such that only a minor displacement is required in order to lockingly mount, and respectively detach, a utility module over the carrier unit.

According to one specific configuration, the detachable interlocking engagement mechanism between the carrier engaging elements and the utility module's first engaging elements is a dovetail engagement mechanism, comprising laterally projecting shoulders configured on one of the carrier engagement surfaces and the first engagement surface of a utility module, and a shoulder receiving recess configured on the other one of one of the carrier engagement surfaces and the first engagement surface of a utility module; where said laterally projecting shoulders are configured for sliding engagement with said shoulder receiving recess.

According to a particular configuration, one or both of the carrier engagement surfaces and the first engagement surface of a respective utility module are configured with depressions, each accommodating respective laterally projecting locking shoulders. Said dovetail engagement mechanism members constitute said engaging elements, wherein said carrier engaging elements comprise one of said dovetail engagement members, while the utility module's first engaging element comprises the respective said dovetail engagement member.

According to another configuration, the detachable interlocking engagement mechanism between the carrier engaging elements and the utility module's first engaging elements is an undercut engagement mechanism, comprising lateral projections configured on one of the carrier engagement surfaces and the first engagement surface of a container unit, and a receiving recess configured on the other one of one of the carrier engagement surfaces and the first engagement surface of a utility module; where said lateral projections are configured for engagement with said receiving recess.

Interlocking engagement of the utility module and the carrier unit takes place by placing the first engagement surface of a utility module over the carrier engagement surface, such that the utility module's first engaging elements are disposed shifted over the respective carrier engaging elements of the carrier unit, and are then slidingly shifted to obtain sliding interlocking engagement therebetween.

The detachable interlocking engagement mechanism may further comprise a locking mechanism configured for preventing unintentional detaching of the slidingly engaging elements once they are fully interlocked, i.e. to prevent detaching of the utility module from the carrier unit or from another utility module.

According to one configuration, the locking mechanism, comprises a locking pin that is configured for snapingly protruding from one of the engagement surfaces into a designated nook on the other engagement surface. This prevents the engaging surfaces from sliding relatively to each other, and by that it prevents said engaging elements from being slidingly separated once interlocked.

According to one configuration, the carrier engagement surface of the carrier unit constitutes a top wall of the carrier unit, when the carrier unit is balanced horizontally to the ground, and wherein the utility module's first engagement surface constitutes a bottom wall of the container unit, when the utility module is balanced horizontally to the ground. The utility module can further comprise a second engagement surface constituting its top wall, or a cover, when the utility module is balanced horizontally to the ground. The second engagement surface of the utility module simulates the carrier engagement surface as it is compatible for engaging with another utility module's first engagement surface.

Any one or more of the following features, designs and configurations, can be implemented in a utility module, a utility assembly, locking mechanism, and the carrier unit and assembly according to the present disclosure, individually or in various combinations thereof:

- A single locking rib can extend at rear end of a depressed locking location (i.e. the female coupler may comprise a single locking rib) and substantially perpendicular to the sliding path;
- Two locking ribs can extend at side edges of a depressed locking location (i.e. the female coupler may comprise two locking ribs) and disposed substantially parallel to the sliding path;
- Two locking ribs can each extend at a respective side edge of two neighboring depressed locking locations, said locking ribs disposed substantially parallel to the sliding path;
- The utility assembly can be modular wherein a top face of a first utility module can interlock with a bottom face of a second utility module disposed thereover in a substantially fully overlapping relation, or with a bottom face of at least one second utility module only partially overlapping therewith;
- A second utility module overlapping a significant portion of a first utility module can be configured with a single release latch for displacing several locking latches articulated therewith;
- Two or more second utility modules can be mounted over a first utility module, each being independently detachable attachable over the first utility module;
- The at least one second utility module is configured for snap-type locking over the first utility module;
- A release latch for displacing the locking latch into disengagement from the locking latch arresting location can be disposed at a front face of the respective second utility module;
- The at least one locking latch and the at least one locking latch arresting location can be disposed at a front portion of the respective utility modules;
- At least one of the first utility module and the second utility module are configured with a gliding surface facilitating displacement and positioning the respective second utility module at the locking position with respect to the first utility module;
- The gliding surface reduces tolerances between the projecting portion and the depressed locking location receiving same;
- One or both of the locking tongue and locking rib can be configured with a slanting surface at corresponding orientation, along the sliding path, for reducing or substantially elimination tolerance therebetween;
- One or both of a front edge of the projecting portion and a corresponding front edge of the depressed locking location can be slanted for gliding positioning of the second utility module into true locking position over the first utility module;
- The locking latch can be configured for displacement in a direction substantially normal to a respective face of a utility module;
- The locking latch can be spring biased and configured for normally projecting from a face of the respective first or second utility module;
- The locking latch can be manipulable to be opened through an opening configured at a front wall of the respective utility module;
- Corners of the utility modules can be reinforced;
- One or more of the utility modules can be a container module, and the utility assembly can be a container assembly/tool caddy;
- The container module can be compartmented and can be configured with sub-containers and sub-compartments;
- The top face of the container module can be configured as a lid or as a functional component of the container module;
- A lid of a second container can be opened also when articulated and locked in position over a first container;
- A lid of a first container can be opened also when a second container is articulated and locked in position thereabove;
- At least one of the container modules can be a locomoting container and can be configured with an arrangement for locomoting said container module. Where the locomoting container is attached to other container modules it can facilitate for locomoting the utility assembly;
- The container modules can be configured with carrying arrangement disposed at any one or more of its faces. According to a particular configuration, a front face of the container modules is configured with a carrying handle and according to another configuration side faces of the container modules can be configured with a carrying handle;
- Examples of utility modules can be any one or more of a cooler box, a workpiece grip, a power supply (e.g., power bank, generator), hand tools, power tools, a locomotive platform (e.g., a work dolly), powered or not, a tactical unit (e.g., military gear, scientific equipment, communications equipment, personal gear, outdoor gear, etc.);
- A tool caddy can be configured with a carrying handle (e.g. telescopic);
- A utility module can be a soft-shell container with at least a rigid face portion configured with a male/female coupler;
- The utility module can be an interface coupling module, i.e. functions only as a coupling interface;
- The interface coupling module can be attached to a surface of any element or object and by different arrangements, fixedly or detachably;
- The interface coupling module can be a cargo interface module for a utility vehicle, so as to attach one or more utility modules to the vehicle;
- The cargo interface module can be a bed cargo module, a roof rack module, etc.;

The interface coupling module can be a surface mount for attaching utility modules, e.g. a floor mount, wall mount, wall rack, etc.;

The interface coupling module can be a tool mount/rack;

The interface coupling module can be belt mount for mounting of utility modules (e.g., a hand tool) to a workers belt;

The interface coupling module can be an interface mount module for coupling two utility modules to one another, e.g. for articulating two utility modules, both configured with a similar male coupler or a female coupler, and wherein the interface mount module is configured at both faces with another of male coupler or a female coupler;

The interface coupling module can be a back pack carrying module, for facilitating attachment and carrying of utility modules;

A top face of a utility module can be configured with a carrying handle, said carrying handle displaceable between a stowed position and a carrying position, wherein at the stowed position said carrying handle at least partially extends within a niche and does not to interfere with the coupling mechanism;

The carrier unit may include one or more auxiliary engagement surfaces positioned on an exterior face of the carrier unit. For example, an auxiliary engagement surface can be configured at a bottom face of the carrier unit;

The carrier unit may include a second engagement surface simulating/mimicking the first engagement surface of the utility module;

A utility module may be configured with one or more auxiliary first and second engagement surfaces;

The carrier engagement surface may be a connectivity platform detachably attached to the exterior surface of the carrier unit, facilitating a cart unit or a carrier unit according to the present disclosure;

One or both of the utility module's first and second engagement surfaces may be detachably attached to an exterior surface of the utility module;

The carrier engagement surface and the utility module's first engagement surface may be like elements;

The utility module's first and second engagement surfaces may be like elements;

The carrier unit's engaging elements and the utility module's first engaging elements may be similar elements;

One engagement surface may include several engaging elements and one locking mechanism;

The coupling mechanism is configured for spontaneous displacement into locking engagement within a locking receptacle, wherein manual interference is required only for unlocking the locking mechanism and detaching a utility module from a respective utility module or carrier unit;

The coupling mechanism can be a spring biased locking pin, normally projecting from a respective engagement surface;

One or both of the carrier unit and the utility module may further include a locking mechanism designated to prevent unintentional separation of the engagement surfaces while they are interlocked;

The locking mechanism is manipulable between an unlocked position in which said engagement surfaces may slide upon each other, and a locked state in which the engagement surfaces may not slide upon each other;

The locking mechanism may be configured with a biasing mechanism for snap arresting at least at its locked state;

The locking mechanism may be configured with a manually operated activating portion for switching between said unlocked and locked positions.

The carrier unit may be assembled together with other carrier units the same way it's assembled with the utility modules;

The locomotion system of the carrier unit may comprise a wheel system (e.g., axially fixed roller wheels, swivel wheels, etc.), a sliding platform, caterpillar tracks, etc;

The locomotion system of the carrier unit comprises, according to a particular example, several fixed axis wheels, wherein the perimeter of said wheels is tangent with a base edge of the carrier unit;

At an assembled configuration, where one or more utility modules are attached to the carrier unit, the assembly can be positioned vertically wherein a side face of the one or more containers rest over a supporting surface. According to a particular example, at this position the carrier unit and container assembly are configured with stability members for retaining their stability while positioned vertically to the ground;

The carrier unit may be stable while positioned horizontally to the ground, by a support system projecting from a bottom face thereof. The support system may comprise friction enhancing surfaces to restrict displacement of the assembly while placed over a bearing surface;

The carrier unit may be foldable to a more compact configuration;

The carrier unit may comprise an external storage box detachably interconnectable to its exterior walls;

The carrier unit may comprise a power supply detachably interconnectable to its exterior walls;

The carrier unit's transporting system may be motorized while powered via said power supply;

The carrier unit may further include a locking mechanism to insure interlocking connection of the engagement surfaces;

The container unit may comprise non-rigid portions;

The carrier unit may comprise at least one manipulating arrangement, configurable between a stowed position in which the manipulating arrangement is retracted, and a manipulating position in which the manipulating arrangement is extracted. The manipulating arrangement may be a telescopic or foldable handle;

The manipulating arrangement may be a gripping handle, a D-grip handle, a T-grip handle, a flexible strap, etc.

EMBODIMENTS

The present disclosure also encompasses embodiment as defined in the following numbered phrases. It should be noted that these numbered embodiments intended to add to this disclosure and is not intended in any way to be limiting.

1. A coupling mechanism configured for readily detachably attaching a first utility module to a second utility module, the coupling mechanism comprising a male coupler at a face of one of the first utility module and the second utility module, and a female coupler at a face of the other one of the first utility module and the second utility module, said female coupler having a depressed locking location configured with at least one locking rib extending above a depressed surface and along a sliding path, and having an open edge facing in a first sense; said male coupler having a projecting locking location disposed in register with said depressed locking location and configured with at least one locking tongue extending along said engaging sliding path at a second sense, opposite to said first sense, and configured for arresting engagement at a space between said locking rib and depressed surface, the coupling mechanism further comprises at least one locking member for arresting the first utility module with respect to said second utility module and preventing sliding displacement along said sliding path.

2. The coupling mechanism of embodiment 1, wherein said female coupler is configured at the top face of the first utility module, and the male coupler is configured at the bottom face of the second utility module.

3. The coupling arrangement of embodiment 1 or 2, wherein the at least one locking rib extends substantially parallel to the sliding path.

4. The coupling arrangement of embodiment 1 or 2, wherein the at least one locking rib extends substantially perpendicular and intersects the sliding path.

5. The coupling arrangement of embodiment 1 or 2, wherein the female coupler comprises a single locking rib extends at rear end of a depressed locking location and substantially perpendicular to the sliding path.

6. The coupling arrangement of embodiment 1 or 2, wherein the female coupler comprises two locking ribs extend at side edges of a depressed locking location and disposed substantially parallel to the sliding path.

7. The coupling arrangement of embodiment 1 or 2, wherein the female coupler comprises two locking ribs each extend at a respective side edge of two neighboring depressed locking locations, said locking ribs disposed substantially parallel to the sliding path.

8. A coupling mechanism for a utility assembly that comprises at least a first utility module and at least a second utility module, said coupling mechanism is configured between the first utility module and the second utility module; one of a top face of the first utility module and a bottom face of the second utility module comprises at least one depressed locking location configured with a locking rib, and at least one locking latch arresting location; and the other one of said top face of the first utility module and a bottom face of the second utility module comprises at least one projecting portion with a locking tongue disposed in register with said at least one depressed locking location, and at least one locking latch disposed in register with said at least one locking latch arresting location; and wherein at a locked position the bottom face at least partially rests over the top face, and the at least one projecting tongue is arrested by the corresponding at least one locking rib and the at least one locking latch is arrested by corresponding at least one locking latch arresting location, and further wherein disengaging the second utility module from the first utility module is facilitated by disengaging the at least one locking latch from the at least one locking latch arresting location, such that engaging the first and second utility modules into the locked position is provided by sliding the second utility module with respect to the first utility module along a sliding path defined by at least one of said at least one locking rib and said at least one locking tongue.

9. The coupling arrangement of embodiment 8, wherein the at least one locking rib extends substantially parallel to the sliding path.

10. The coupling arrangement of embodiment 8, wherein the at least one locking rib extends substantially perpendicular and intersects the sliding path.

11. The coupling arrangement of embodiment 8, wherein a single locking rib extends at rear end of a depressed locking location and substantially perpendicular to the sliding path.

12. The coupling arrangement of embodiment 8, wherein two locking ribs extend at side edges of a depressed locking location and disposed substantially parallel to the sliding path.

13. The coupling arrangement of embodiment 8, wherein two locking ribs each extend at a respective side edge of two neighboring depressed locking locations, said locking ribs disposed substantially parallel to the sliding path.

14. The coupling arrangement of any one of embodiments 8 to 13, further comprising a release latch for displacing the locking latch into disengagement from the locking latch arresting location can be disposed at a front face of the respective second utility module.

15. The coupling arrangement of any one of embodiments 8 to 14, wherein the at least one locking latch and the at least one locking latch arresting location are disposed at a front portion of the respective utility modules.

16. The coupling arrangement of any one of embodiments 8 to 15, wherein the locking latch is configured for displacement in a direction substantially normal to a respective face of a utility module.

17. The coupling arrangement of any one of embodiments 8 to 16, wherein locking latch is spring biased and configured for normally projecting from a face of the respective first or second utility module.

18. The coupling arrangement of any one of embodiments 8 to 17, wherein the locking latch is manipulable to be opened through an opening configured at a front wall of the respective utility module.

19. The coupling arrangement of any one of embodiments 1 to 18, wherein one or both of the locking tongue and locking rib are configured with a slanting surface at corresponding orientation along the sliding path.

20. The coupling arrangement of any one of embodiments 1 to 19, wherein one or both of a front edge of the projecting portion (or the projecting locking location) and a corresponding front edge of the depressed locking location are slanted for gliding positioning of the second utility module into locking position over the first utility module.

21. The coupling mechanism of any one of embodiments 1 to 20, wherein the first utility module is configured for detachably attaching one or more second utility modules thereto.

22. A coupling mechanism for a utility assembly comprising at least a first utility module and at least a second utility module, said coupling mechanism is configured between the first utility module and the second utility module and comprises at one of a top face of the first utility module and a bottom face of the second utility module with at least one depressed locking location configured with a locking rib, and at least one locking latch arresting location; and the other one of said top face of the first utility module and a bottom face of the second utility module comprises at least one projecting portion with a locking tongue disposed in register with said at least one depressed locking location, and at least one locking latch disposed in register with said at least one locking latch arresting location; and wherein at a locked position the bottom face at least partially rests over the top face, and the at least one projecting tongue is arrested by the corresponding at least one locking rib and the at least one locking latch is arrested by corresponding at least one locking latch arresting location, and further wherein disengaging the second utility module from the first utility module is facilitated by disengaging the at least one locking latch from the at least one locking latch arresting location.

23. A utility assembly comprising at least a first utility module and at least a second utility module, and comprising a coupling mechanism according to any one of embodiments 1 to 21, the coupling mechanism being configured between the first utility module and the second utility module.

24. A utility assembly comprising at least a first utility module and at least a second utility module, and comprising a coupling mechanism for readily detachably attaching the first and second utility modules, the coupling mechanism being configured between the first utility module and the second utility module; said coupling mechanism comprising at one of a top face of the first utility module and a bottom face of the second utility module one or more depressed locking locations each configured with a locking rib, and at least one locking latch arresting location; and the other one of said top face of the first utility module and a bottom face of the second utility module comprises one or more projecting portions each configured with a locking tongue disposed in register with said one or more depressed locking locations, and at least one locking latch disposed in register with said at least one locking latch arresting location; such that at a locked position, the bottom face of the second utility module at least partially rests over the top face of the first utility module, and the one or more projecting tongues are arrested by the corresponding one or more locking ribs, and the at least one locking latch is arrested by corresponding at least one locking latch arresting location, thereby preventing sliding displacement between the first utility module and the second utility module, and disengaging the second utility module from the first utility module is facilitated by disengaging the at least one locking latch from the at least one locking latch arresting location.

25. The utility assembly of embodiment 24, wherein the first and second utility modules are in a locking engagement when said one or more depressed locking locations and the one or more projecting portions are disposed behind one another.

26. The utility assembly of embodiment 24 or 25, wherein said one or more depressed locking locations and said one or more locking latch arresting locations are configured at the top face of the first utility module, and the one or more projecting portions and the at least one locking latch are configured at the bottom face of the second utility module.

27. The utility assembly of any one of embodiments 24 to 26, wherein at least one second utility module is configured for snap-type locking over the first utility module.

28. The utility assembly of any one of embodiments 24 to 27 wherein engaging the first and second utility modules into the locked position is provided by sliding the second utility module with respect to the first utility module along a sliding path defined by at least one of said at least one locking rib and said at least one locking tongue.

29. The utility assembly of any one of embodiments 24 to 28, wherein the at least one locking rib extends substantially parallel to the sliding path.

30. The utility assembly of embodiment 29, wherein the at least one locking rib extends substantially perpendicular and intersects the sliding path.

31. The utility assembly of embodiment 29, wherein a single locking rib extends at rear end of a depressed locking location and substantially perpendicular to the sliding path.

32. The utility assembly of embodiment 29 wherein two locking ribs extend at side edges of a depressed locking location and disposed substantially parallel to the sliding path.

33. The utility assembly of embodiment 29, wherein two locking ribs each extend at a respective side edge of two neighboring depressed locking locations, said locking ribs disposed substantially parallel to the sliding path.

34. The utility assembly of any one of embodiments 24 to 33, wherein a top face of a first utility module interlocks with a bottom face of a second utility module disposed thereover in a substantially fully overlapping relation, or with a bottom face of at least one second utility module only partially overlapping therewith.

35. The utility assembly of any one of embodiments 24 to 33, wherein the second utility module overlaps a significant portion of a first utility module and is configured with a single release latch for displacing several locking latches articulated therewith.

36. The utility assembly of any one of embodiments 24 to 35, further comprising a release latch for displacing the locking latch into disengagement from the locking latch arresting location can be disposed at a front face of the respective second utility module.

37. The utility assembly of any one of embodiments 24 to 36, wherein the locking latch is configured for displacement in a direction substantially normal to a respective face of a utility module.

38. The utility assembly of any one of embodiments 24 to 37, wherein the locking latch is spring biased and configured for normally projecting from a face of the respective first or second utility module.

39. The utility assembly of any one of embodiments 24 to 38, wherein two or more second utility modules can be mounted over a first utility module, each being independently detachable attachable over the first utility module.

40. The utility assembly of any one of embodiments 24 to 39, wherein at least one of the first utility module and the second utility module are configured with a gliding surface facilitating displacement and positioning the respective second utility module at the locking position with respect to the first utility module.

41. The utility assembly of any one of embodiments 24 to 40, wherein one or more of the utility modules is a container module, and the utility assembly is a container assembly or a tool caddy.

42. The utility assembly of embodiment 41, wherein the container module is compartmented and optionally configured with sub-containers and sub-compartments.

43. The utility assembly of embodiment 41 or 42, wherein a top face of the container module is configured as a lid or as a functional component of the container module.

44. The utility assembly of any one of embodiments 41 to 43, wherein the container modules is a locomoting container, configured with an arrangement for locomoting said utility assembly.

45. The utility assembly of any one of embodiments 41 to 44, wherein the container modules is configured with a carrying arrangement disposed at any one or more of its faces, optionally being a carrying handle.

46. The utility assembly of any one of embodiments 24 to 40, wherein one or more of the utility modules is a soft-shell container with at least a rigid face portion.

47. The utility assembly of any one of embodiments 24 to 40, wherein said first utility module is a mobile carrier unit.

48. The utility assembly of any one of embodiments 24 to 47, further comprising a locking mechanism for preventing unintentional separation of the modules while they are interlocked.

49. The utility assembly of any one of embodiments 24 to 48, wherein the first utility module is configured for detachably attaching at least two second utility modules thereto.

50. A mobile carrier unit comprising at least one carrier engagement surface, compatible for interlocking engagement in a detachable manner with a first engagement surface of a utility module, said carrier engagement surface having (i) one or more depressed locking locations each configured with a locking rib and at least one locking latch arresting location, configured for engagement with said first engagement surface of a utility module that comprises at least one locking latch and one or more projecting portions, each projecting portion being configured with a locking tongue, or (ii) at least one locking latch and one or more projecting portions each configured with a locking tongue for engagement with said first engagement surface of a utility module that comprises one or more depressed locking locations, each depressed locking locations configured with a locking rib and at least one locking latch arresting location.

51. The mobile carrier unit of embodiment 50, wherein once associated with the utility module, said locking tongue becomes disposed in register with said one or more depressed locking locations, and at least one locking latch become disposed in register with said at least one locking latch arresting location.

52. The mobile carrier unit of embodiment 50 or 51, configured for detachable interlocking engagement with one or more utility modules, each utility module comprising a first engagement surface.

53. The mobile carrier unit of any one of embodiments 50 to 52, further comprising at least one of a manipulating arrangement and a locomotion system.

54. An assembly comprising a mobile carrier unit of any one of embodiments 50 to 53 having at least one carrier engagement surface, and at a least one utility module having a first engagement surface, the utility module being detachably interlocked with the mobile carrier unit by engaging said first engagement surface with said carrier engagement surface.

55. The assembly of embodiment 54, wherein the mobile carrier unit and the at least one utility module are detachably interlocked with one another by a dovetail engagement mechanism, that comprises laterally projecting shoulders configured on one of the carrier engagement surfaces and the first engagement surface of a utility module, and a shoulder receiving recess configured on the other one of one of the carrier engagement surfaces and the first engagement surface of a utility module; where said laterally projecting shoulders are configured for sliding engagement with said shoulder receiving recess.

56. The assembly of embodiment 55, wherein one or both of the carrier engagement surfaces and the first engagement surface of a respective utility module are configured with depressions, each accommodating respective laterally projecting locking shoulders.

57. The assembly of embodiment 54, wherein the mobile carrier unit and the at least one utility module are detachably interlocked with one another by an undercut engagement mechanism, comprising lateral projections configured on one of the carrier engagement surfaces and the first engagement surface of a container unit, and a receiving recess configured on the other one of one of the carrier engagement surfaces and the first engagement surface of a utility module; where said lateral projections are configured for engagement with said receiving recess, such that interlocking engagement of the utility module and the carrier unit takes place by placing the first engagement surface of a utility module over the carrier engagement surface, such that the utility module's first engaging elements are disposed shifted over the respective carrier engaging elements of the carrier unit, and are then slidingly shifted to obtain sliding interlocking engagement therebetween.

58. The assembly of any one of embodiments 54 to 57, further comprising a locking mechanism configured for preventing unintentional detaching of the utility module from the carrier unit.

59. The assembly of embodiment 58, wherein the locking mechanism comprises a locking pin that is configured for snapingly protruding from one of the engagement surfaces into a designated nook on the other engagement surface.

60. An interface coupling module comprising at least one engagement surface, compatible for interlocking engagement in a detachable manner with a first engagement surface of a utility module, said interface coupling module comprising an engagement surface having (i) one or more depressed locking locations each configured with a locking rib and at least one locking latch arresting location, configured for engagement with said first engagement surface of a utility module that comprises at least one locking latch and one or more projecting portions, each projecting portion being configured with a locking tongue, or (ii) at least one locking latch and one or more projecting portions each configured with a locking tongue for engagement with said first engagement surface of a utility module that comprises one or more depressed locking locations, each depressed locking locations configured with a locking rib and at least one locking latch arresting location 61. The interface coupling module of embodiment 60, being configured for detachable or fixed attachment to a surface of an object.

62. The interface coupling module of embodiment 60 or 61, being a cargo interface module for a utility vehicle configured for attaching one or more utility modules to the vehicle.

63. The interface module of embodiment 60 or 61, being a surface mount for attaching utility modules 64. The interface module of embodiment 60 or 61, being a tool mount or a tool rack.

65. The interface module of embodiment 60 or 61, being a belt mount for mounting of utility modules to a workers belt;

66. The interface module of embodiment 60 or 61, being an interface mount module for coupling two utility modules to one another.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 1A to 6G are directed to a first example of a locking mechanism, wherein:

FIG. 1A is a top perspective view of a container assembly according to an example of the present disclosure;

FIG. 1C is a bottom, front perspective view of FIG. 1B;

FIGS. 4A to 4D are consecutive steps illustrating locking engagement of the locking latch of the second container with the respective locking latch arresting location of the first container;

FIGS. 6A to 6G are various combinations of a modular container assembly according to examples of the present disclosure.

FIGS. 7A to 12C are directed to a carrier unit and another example of a locking mechanism, wherein:

FIG. 7A is container carrier assembly according to an example of the disclosure, illustrating a top, left perspective view of a container unit, mounted on top of a carrier unit;

FIG. 8A is a top, left perspective view of a carrier unit, illustrating the carrier engagement surface in further detail;

FIGS. 8B and 8C are a top and a bottom perspective view of a carrier unit, illustrating the container unit's first engagement surface in further detail;

FIG. 12C illustrates the utility module apart from the container and flipped, so as to expose the mating coupling mechanism.

DETAILED DESCRIPTION OF EMBODIMENTS

Figure 1A:
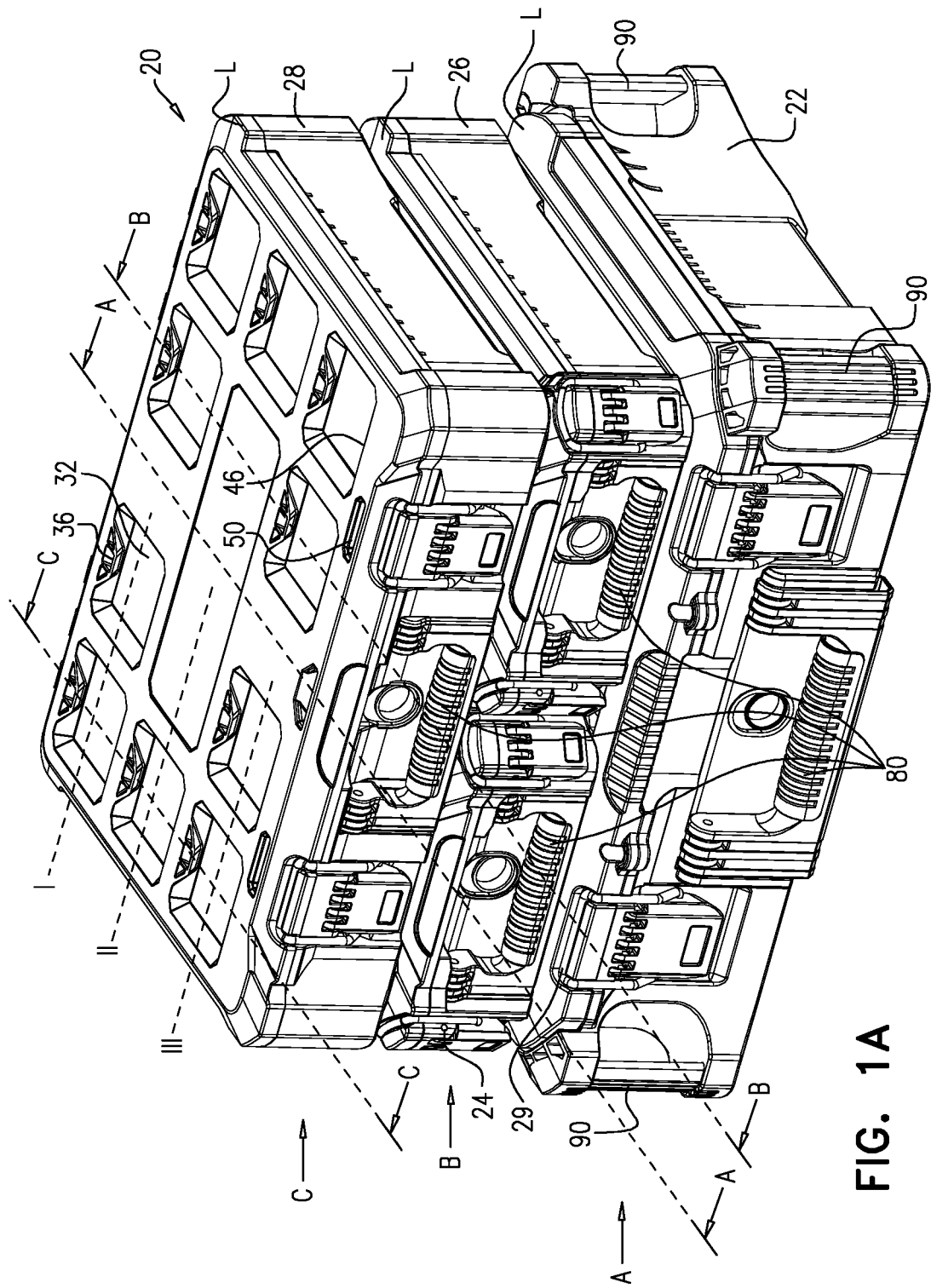
Figure 1B:
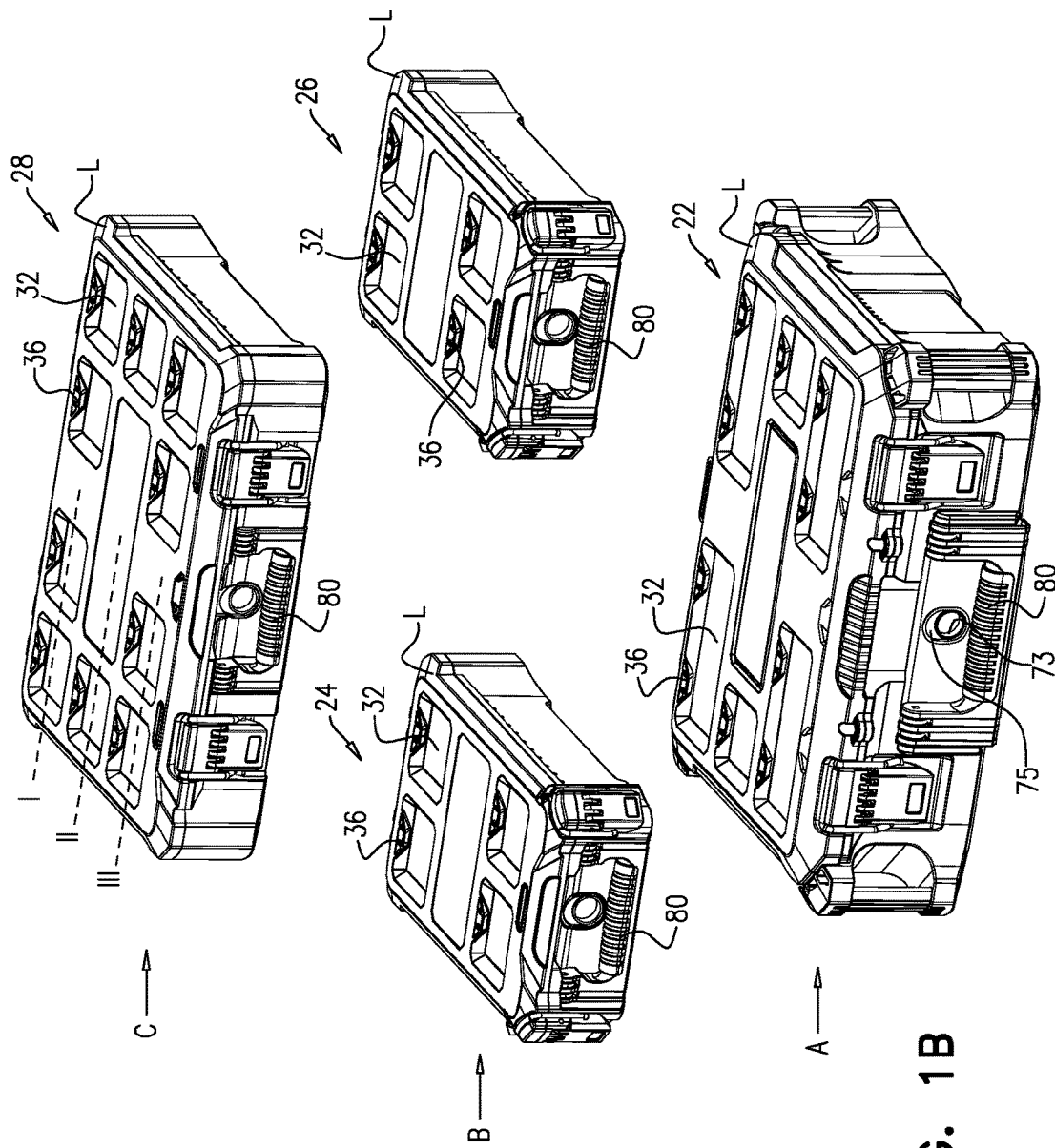
FIG. 1B is an exploded perspective view of the container assembly of FIG. 1A.
Figure 1D:
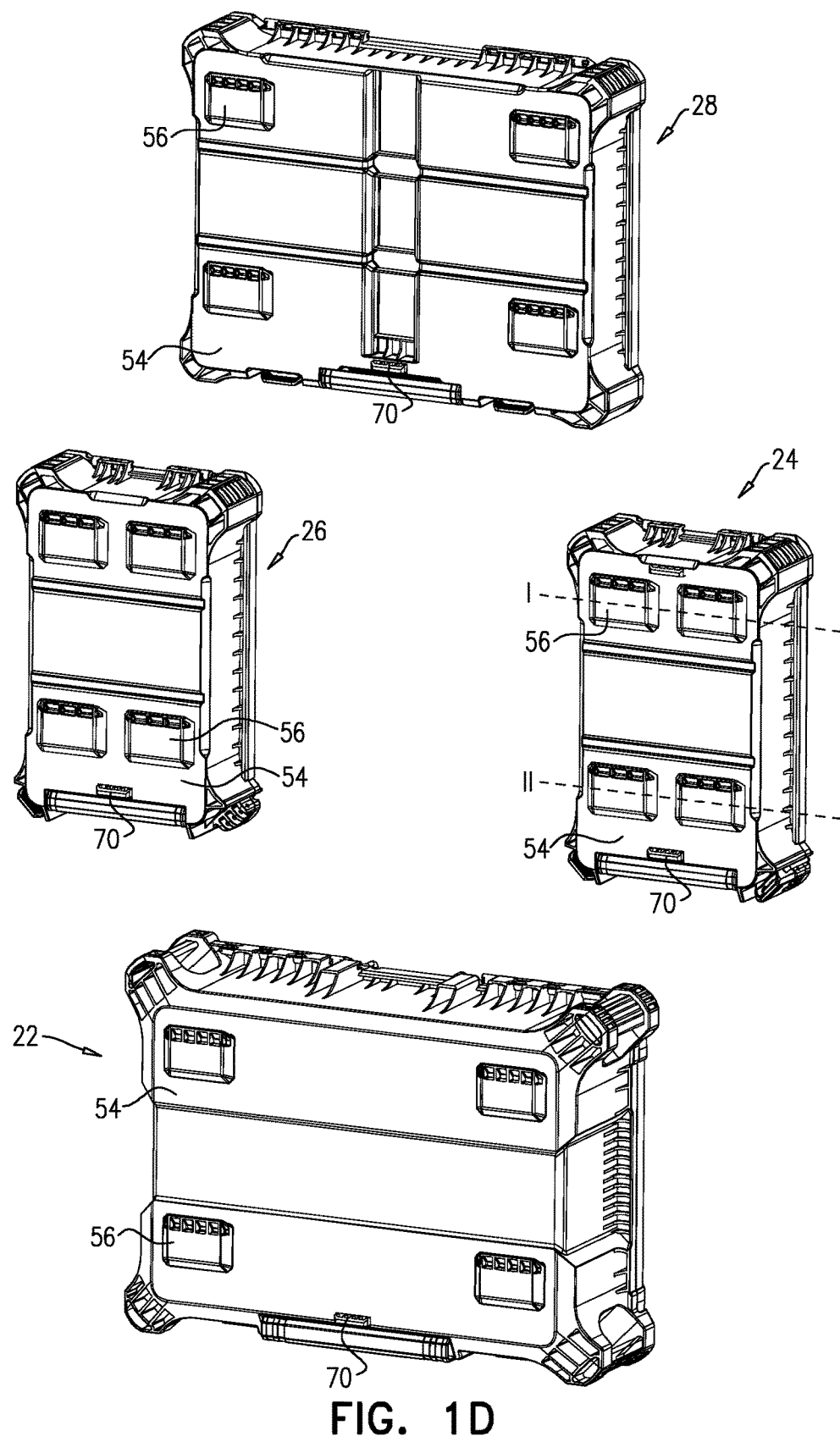
FIG. 1D is a bottom, rear perspective view of FIG. 1B.
Figure 2A:
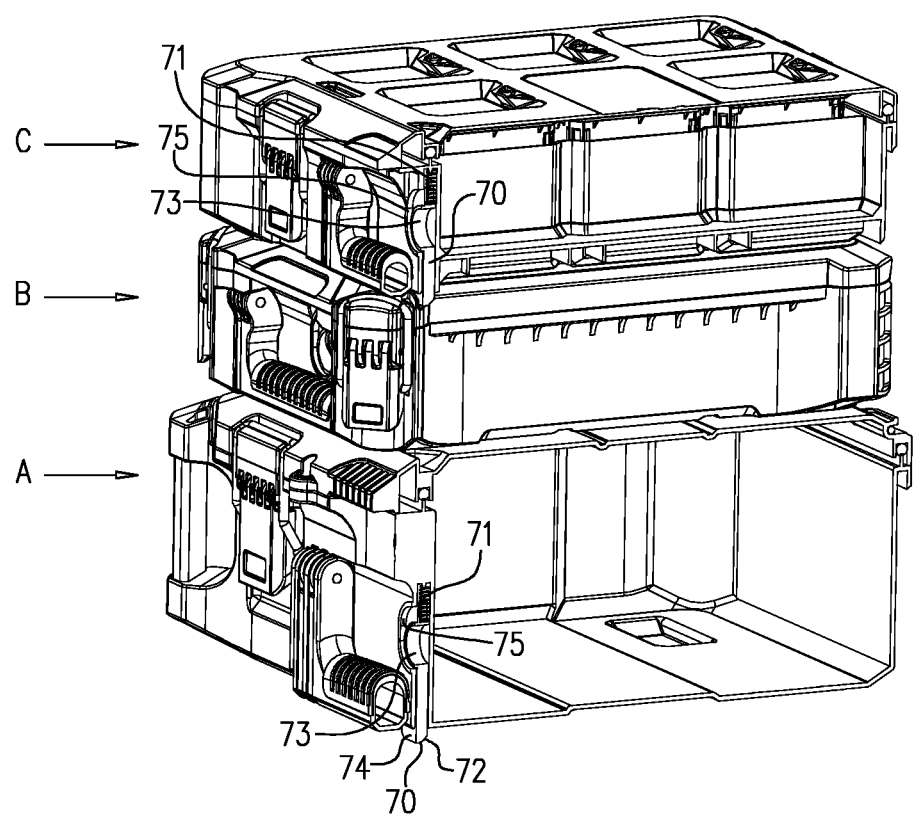
FIG. 2A is a sectioned portion along line A-A in FIG. 1A.
Figure 2B:
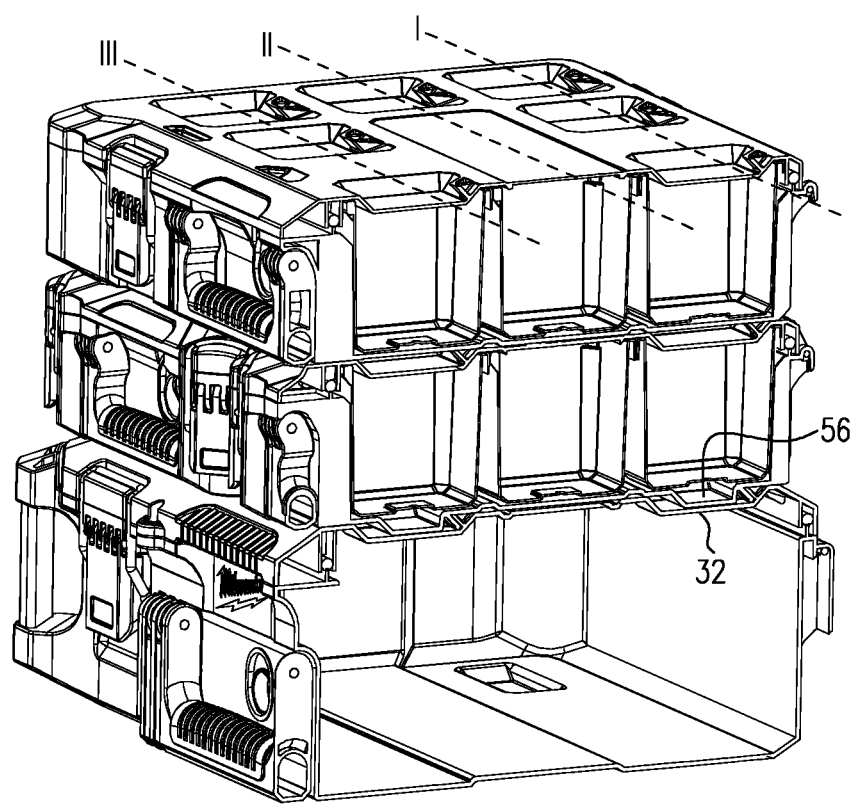
FIG. 2B is a sectioned portion along line B-B in FIG. 1A.
Figure 2C:
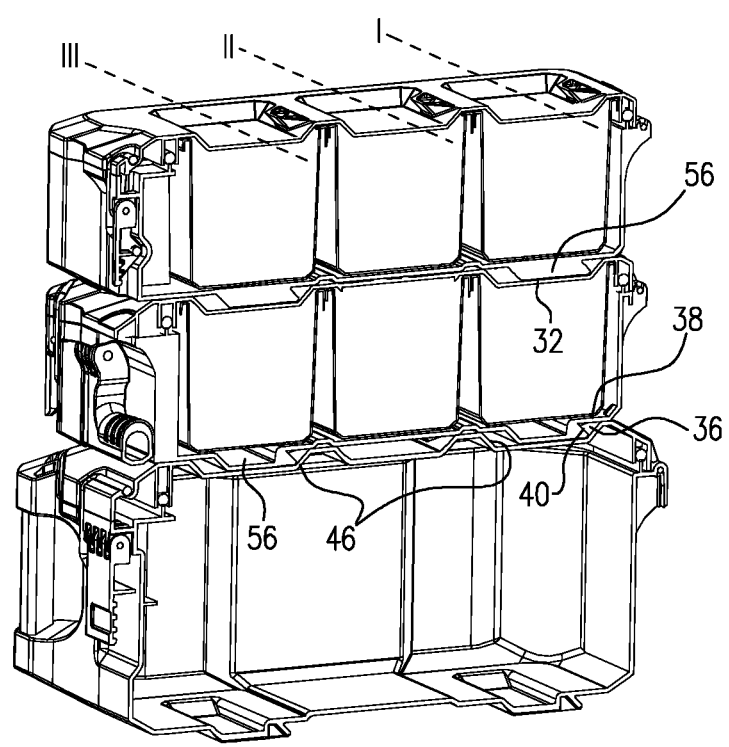
FIG. 2C is a sectioned portion along line C-C in FIG. 1A.

Reference is first being made to FIGS. 1A to 6G, directed to a first configuration of a coupling mechanism. For sake of convenience the utility modules are exemplified as containers and respectively the utility assembly is illustrates as a tool caddy. It is however appreciated that the utility modules can be of any type, shape or size, as discussed hereinabove and as will be exemplified below.

Attention is first directed to FIGS. 1A to 4D, illustrating a container assembly generally designated 20, comprising four containers 22, 24, 26 and 28 disposed in a triple stage configuration, the stages designated A, B and C. In the illustrated example containers 24 and 26 of the second stage are half-size and overlap the footprint of the first stage container 22 and the third stage container 28, wherein the first container 22 is for example a hand tool container and containers 24 to 28 are organizers or the like.

The term 'first container' as used herein denotes a container bearing over a top face thereof at least one other container, said at least one other container denoted herein as a 'second container'. It is thus appreciated that a second container of a container assembly comprising three or more stages of containers' serves as second container when referred to the first stage container, and as a first container when referred to a third stage container mounted thereover. Accordingly, in the illustrated example of FIGS. 1A-2C, container 22 is a first container and containers 24 and 26 are second containers, whilst they function as first containers when discussing locking arrangement with respect to third stage container 28.

Each of the containers is configured with a lid L constituting a top face of the respective container, said lids being pivotally attached and securely articulated to the respective container through a toggle locking latch 29. Each top face (see FIG. 1B) is configured with several depressed locking locations 32 and it is seen that the at least two depressed locking locations are disposed behind one another along imaginary lines I, II and III (though not necessarily aligned).

Each such depressed locking location is in turn configured with a laterally projecting locking rib 36 extending from a rear portion of the depressed locking location 32 towards a front face of the container. The locking rib 36 has a flat top surface 38 substantially flush with a top surface of the respective lid L, and a slanting bottom surface 40. A front portion 46 of the depressed locking location 32 is slanted too, in the same orientation as bottom surface 40 (i.e. substantially parallel thereto).

Furthermore, the top face, namely lid L of the containers, is configured with at least one locking latch arresting location in the form of a recess 50 disposed at a front portion of the respective top face and configured with a slanted rear wall portion 52 and a right angled front wall portion 53.

A bottom face 54 of each container 22, 24, 26 and 28 is configured with several projecting portions 56, extending in register with the depressed locking locations 32, and it is seen that the at least two projecting portions 56 are disposed behind one another along the imaginary lines I, II and III (though not necessarily aligned).

Each projecting portions 56 is configured with a locking tongue 60 laterally projecting rearwards and having a slanted surface 62 corresponding with slanting surface 40 of locking rib 36. Also, a front portion 66 of the projecting portions 56 slants substantially parallel to the slanted surface 62 of the locking tongue 60.

It is essential that the at least two depressed locking locations 32 and the at least two projecting portions 56 be disposed behind one another (though not necessarily aligned), as exemplified by imaginary lines I, II and III (though not necessarily aligned).

A plunger-like locking latch 70 is disposed at a front portion of each container, said locking latch 70 disposed in register with the recesses 50 and configured with a slanting rear wall portion 72 and a right angled front wall portion 74, corresponding with the sloping wall portions of the recesses 50. The locking latch 70 has an elongate finger engaging aperture 73 (FIG. 2A) accessible through an aperture 75 formed in register at a front wall face of the respective second container, said locking latch 70 being normally biased to project under force of coiled spring 71, such that the locking latch 70 is axially displaceable between a projecting, locked position and a temporary retracted position during transition into the locked position.

The locking latch 70 is typically single-handedly manipulable between its locking position and its releasing position, such that manipulation of the locking latch to disengage it from the locking latch arresting location 50 can be easily facilitated using one hand simultaneously with gripping the carrying handle 80. As seen in FIGS. 1A-2C, manipulating the finger engaging aperture 73, being part of locking latch 70, is disposed opposite to and at finger-reach distance from the carrying handle 80 when the handle is at its carrying position tilted upwards. This enables a grab, release and go detachment of the second utility module from the first utility module in a simple single-handed operation.

Figure 3A:
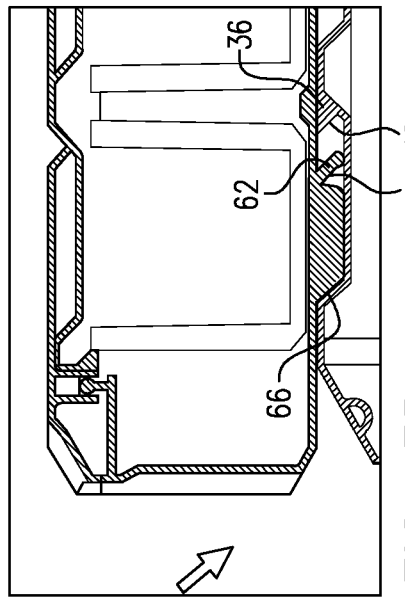
FIGS. 3A to 3D are consecutive steps illustrating locking engagement of the locking tongue of the second container with the respective locking rib of the first container.
Figure 3B:
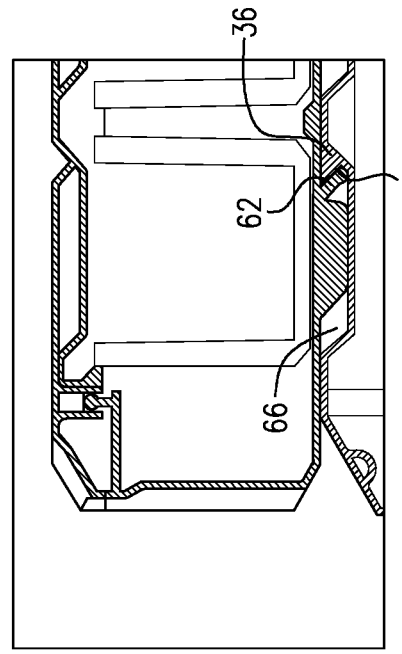
Figure 3C:
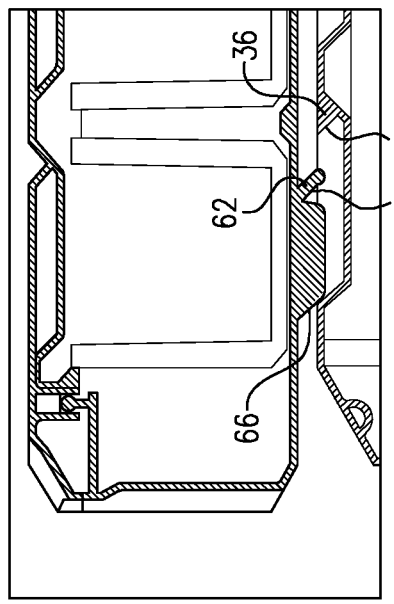
Figure 3D:
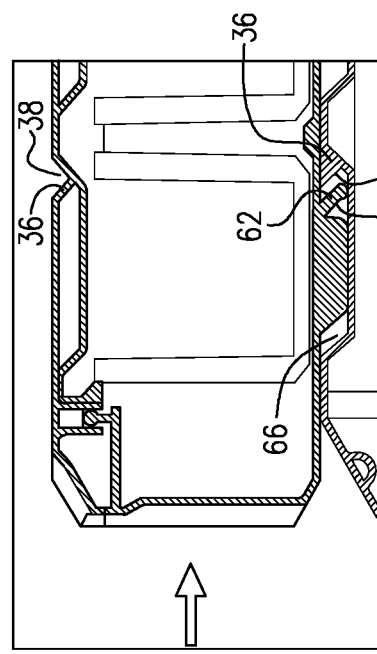

When it is required to detachably attach a second container over a first container, the former is placed over the later (FIG. 3A), placing the projecting portions 56 within the depressed locking location 32 (FIG. 3B) with the locking tongues 60 engaging below and being gradually arrested by the respective locking ribs 36 arresting is obtained (FIG. 3C) until complete arresting is obtained (FIG. 3D). Simultaneously, as the locking tongues 60 arrest by the locking ribs 36, the locking latch 70 of the second container slides into the locking latch arresting location (recess 50) and finally snaps into locking engagement therewith. It is noted (FIGS. 4A to 4D) that first (FIGS. 4B and 4C) the locking latch 70 displaces upwards against the biasing effect of spring 71, and when the second container reaches the final locking position over the first container, the locking latch 70 plunges into arresting position within the recess 50.

At the locked position the second container is attached over the top face of the first container, such that they can be moved as an integrated unit. Detaching of a second container from a first container is easily facilitated by unlocking, obtained by displacing the locking latch 70 upwards against the biasing effect of spring 71, whereby the second container can be displaced with respect to the first container and detached therefrom.

As further seen in FIGS. 1A-4D, each of the containers 22, 24, 26 and 28, is configured at a front face thereof with a tiltable carrying handle 80, for carrying a respective container or the entire container assembly 20. Also seen, some of the containers can be configured with fender-like protectors 90 at their corners.

Figure 5A:
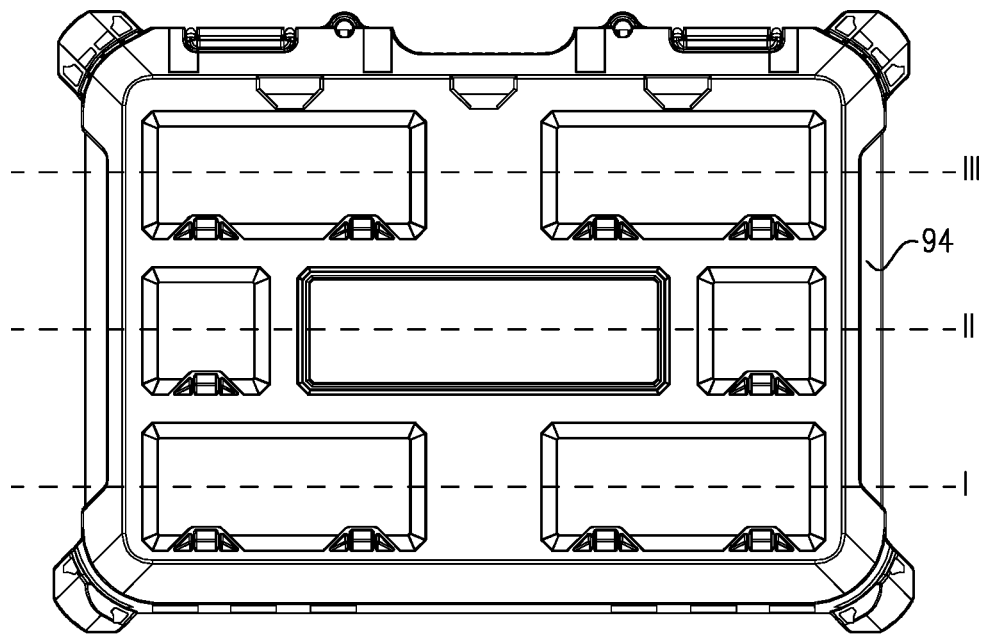
FIGS. 5A to 5E schematically demonstrate modularity of a container assembly according to the disclosure.
Figure 5B:
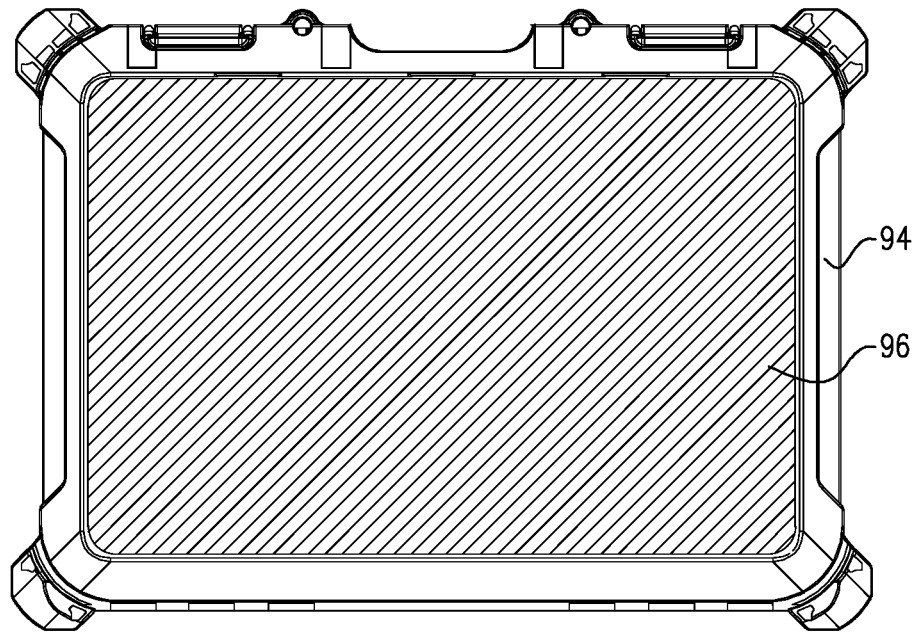
Figure 5C:
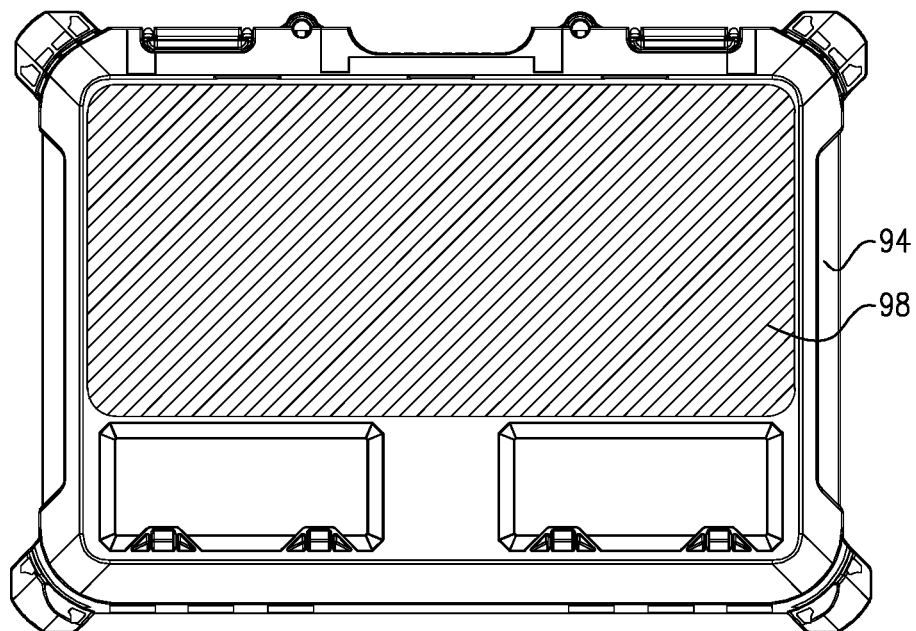
Figure 5D:
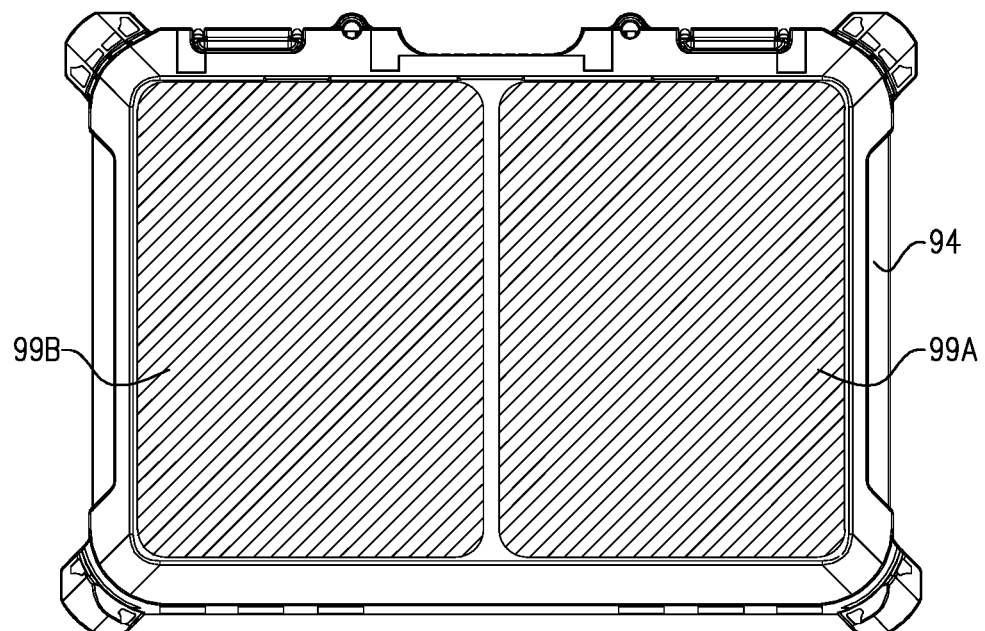
Figure 5E:
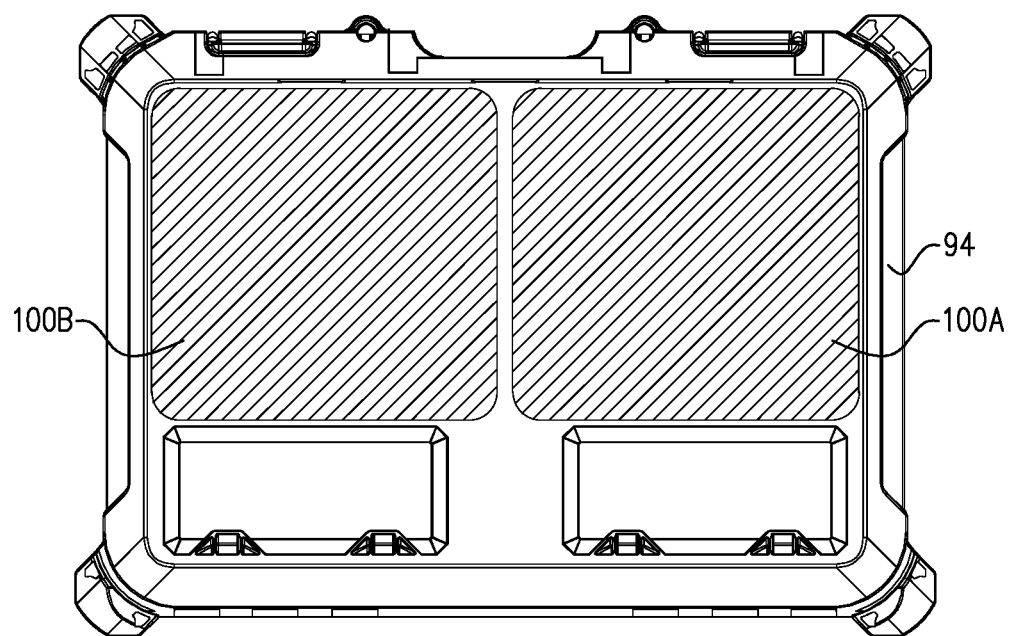

Further attention is now directed to FIGS. 5A to 5E demonstrating examples of modularity of a container assembly according to the disclosure. FIG. 5A is a planner top view of a first container 94 and FIGS. 5B to 5E illustrate second containers superimposed over the first container 94. In FIG. 5B a second container 96 is substantially as big as the first container 94, i.e. having the same footprint. In FIG. 5C a second container 98 is as wide as the first container 94, however narrower in depth, and disposed at a front portion of the first container. In FIG. 5D two second containers 99A and 99B are mounted over the first container 94 and occupy substantially the entire footprint thereof, whereby each of containers 99A and 99B is independently attachable and detachable from the first container 94, as exemplified hereinabove. In FIG. 5E two second containers 100A and 100B are positioned over the first container 94, occupying the entire width though narrower in depth and extending from a front portion of the first container 94.

Figure 6B:
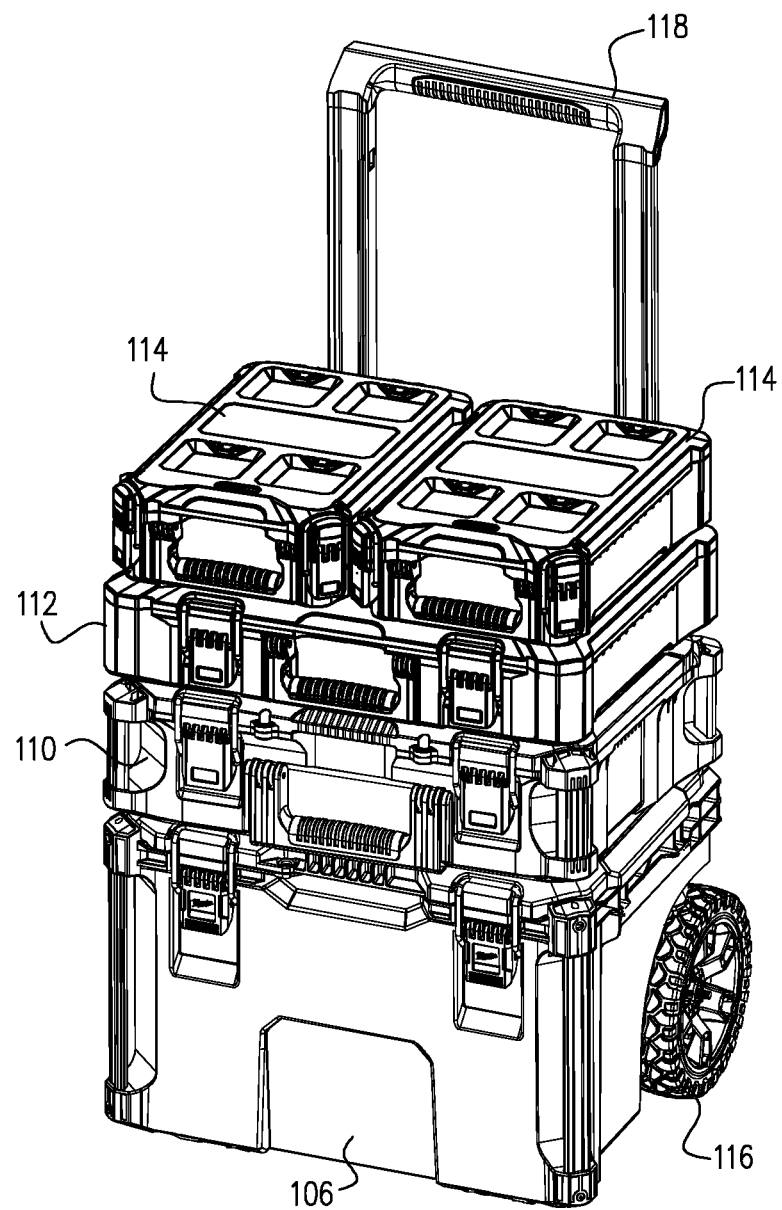
Figure 6C:
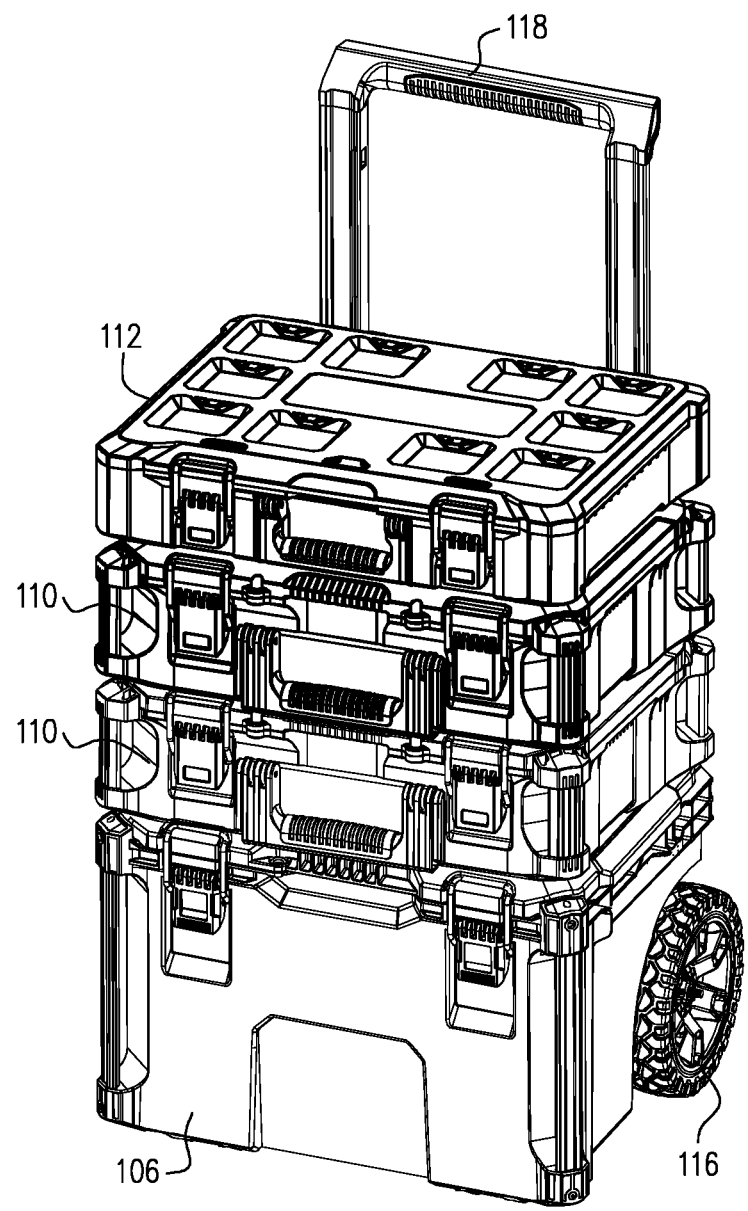
Figure 6D:
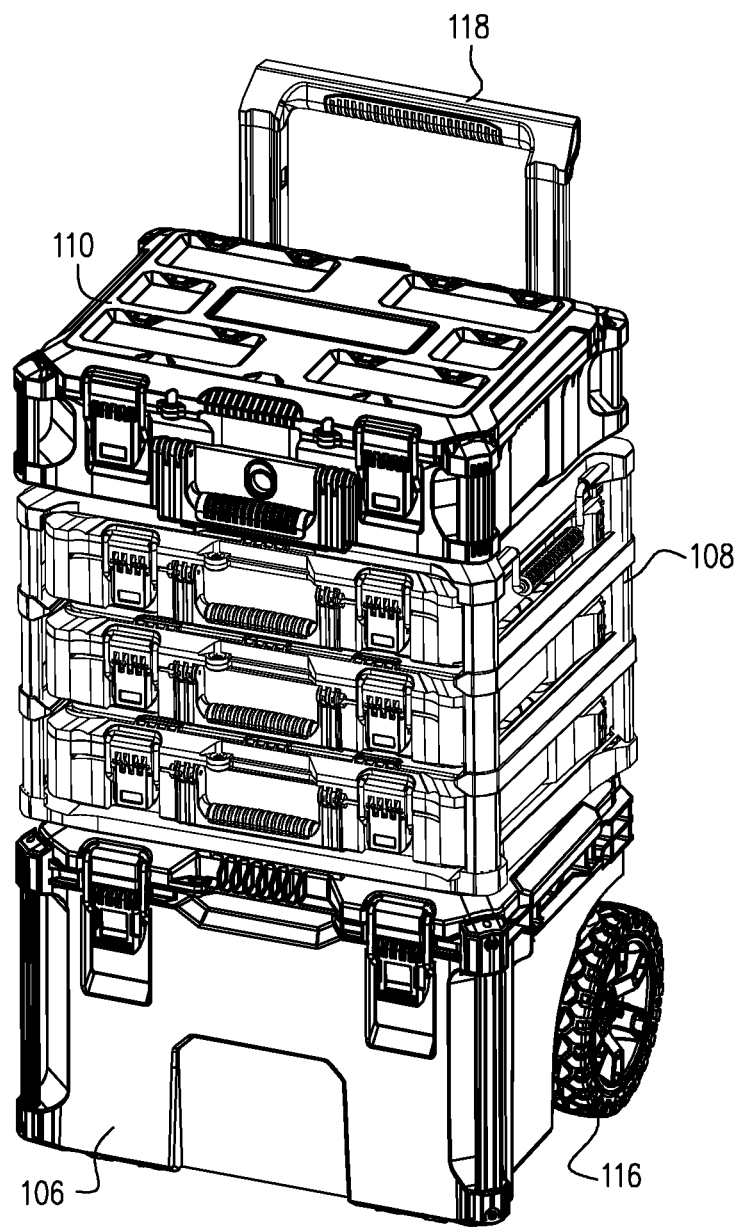

Turning now to FIGS. 6A to 6K, there are illustrated several examples of container assemblies, subassemblies and their components. FIG. 6A illustrates a disassembled container assembly collectively designated 104 and comprising a base container 106, a chest of drawers module 108 comprising three drawers, a tool caddy module 110, a compartmented storage module 112 and a half-sized compartmented storage module 114 (typically two of which). It is noted that the base container is configured for locomoting and comprises at a rear thereof wheels 116 and a telescopic handle 118. As can be appreciated from FIGS. 6B through 6D, various container assemblies are illustrated, the arrangement is such that in practice any module can constitute either a first container or a second container, as defined hereinabove (though it is more likely that base container 106 serves as a first container).

Figure 6E:
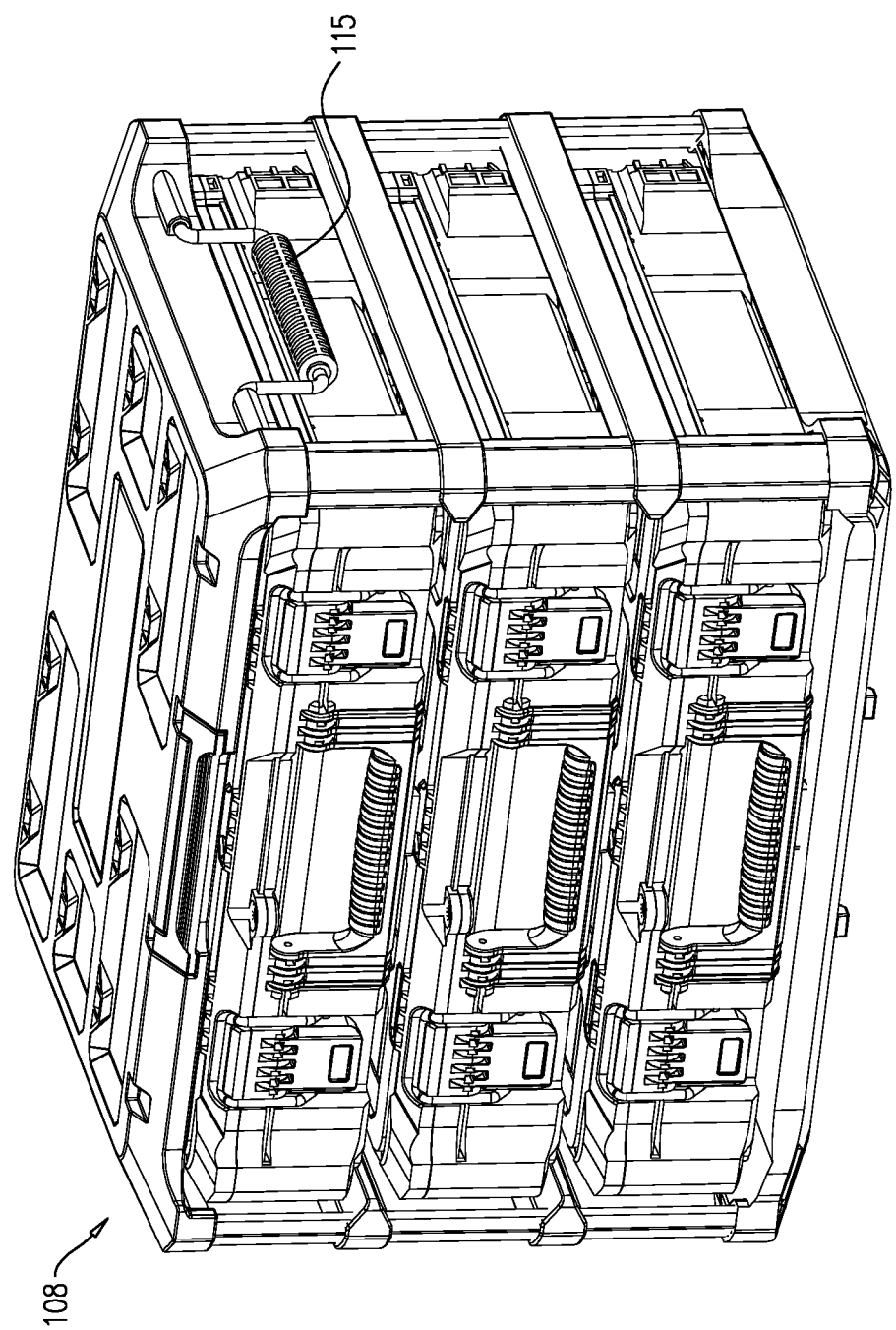
Figure 6F:
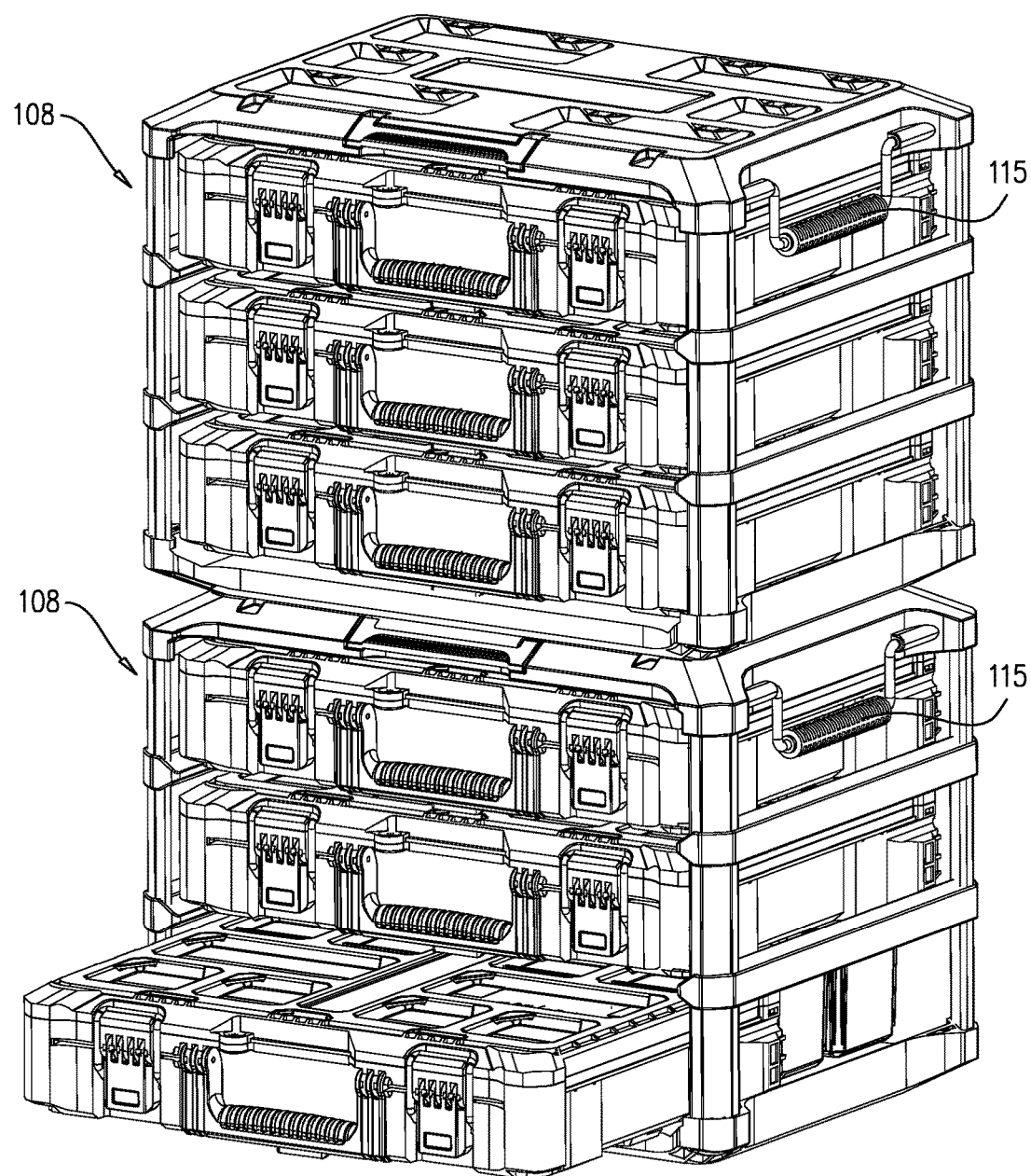

FIGS. 6E and 6F illustrate a chest of drawers module 108, illustrated separately in FIG. 6E and mounted over a similar drawer module 108 in FIG. 6F. It is appreciated that the drawers of each module can be locked at their closed position to prevent spontaneous opening thereof whilst carrying a module. Furthermore, each module 108 is configured with a pair of carrying handles 115 disposed at top side wall portions thereof, to facilitate carrying of the module.

In FIG. 6G there is illustrated a subassembly comprising a first container in the form of a tool caddy module 110 and second container in the form of a compartmented storage module 112 attached thereto, whilst the lid 119 of the first container is open facilitating access to the contents thereof.

Further attention is now directed to FIGS. 7A to 16B, showing a third aspect of the disclosure, namely a utility module being a mobile carrier unit and comprising at least one carrier engagement surface, compatible for interlocking engagement in a detachable manner with a first engagement surface of a second utility module. For sake of example only, the second utility module exemplified in the annexed drawings is in the form of a utility container. It is however appreciated that the utility modules can be of any type, shape or size, as discussed hereinabove and as will be exemplified below. Accordingly, the term container unit as used in the following description denotes any type of a utility module, as discussed herein the specification.

Figure 7A:
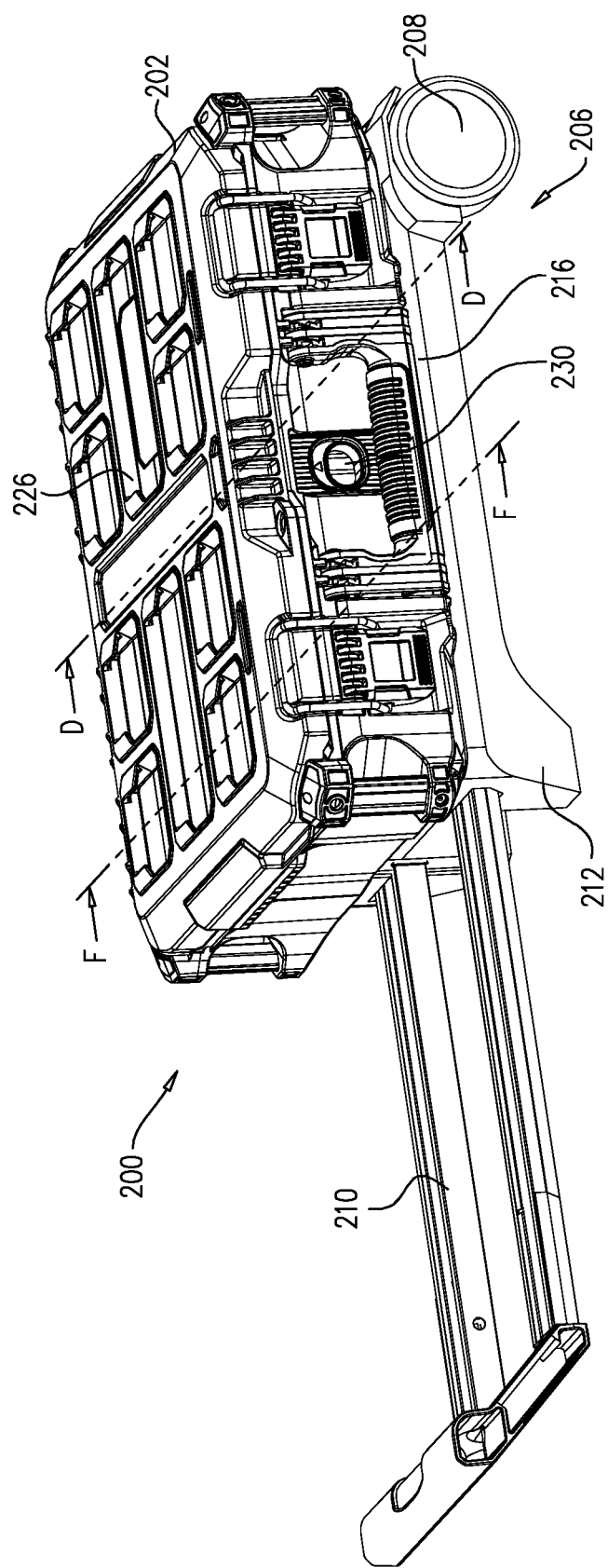

Attention is first directed to FIG. 7A, illustrating a container carrier assembly generally designated 200 comprising a container unit 202 (utility module) mounted on top of a carrier unit 206. The carrier unit 206 is equipped with a telescopic manipulating handle 210, a pair of rear wheels 208 and a set of horizontally stabilizing support legs 212 at a front portion of the carrier unit 206. The carrier unit 206 and the container unit 202 are engaged in an interlocking engagement via their engagement surfaces, i.e. a carrier engagement surface 216 at a top face of the a carrier unit 206 (best seen in FIG. 8A), and the container unit's first engagement surface 220 (namely its bottom face; best seen in FIGS. 8B and 8C). The container unit 202 is configured with yet a second engagement surface 226 (namely the container's top face), simulating the carrier engagement surface 216. The container unit 202 further comprises a locking mechanism 230 configured for arresting within a respective notch 231 at the carrier engagement surface 216, to thereby to prevent displacement and separation of the engagement surfaces 216 and 220 once they are interlocked, as later will be explained.

The carrier engagement surface 216 seen in greater detail in FIG. 8A, illustrates a top perspective view of a carrier unit 206 with the telescopic handle 210 in a retracted position. The carrier engagement surface 216 comprises multiple carrier engaging elements 236, depressed from the surface, and designated for interlockingly receiving respective container unit's first engaging elements 240, projecting from the first engagement surface (bottom face) 220 of the container unit 202.

Each carrier engaging element 236, is a so-called female coupler and has a depressed locking location configured with at least one locking rib extending above a depressed surface and along a sliding path and having an open edge facing in a first sense. As seen in the drawings, it is generally constituted by a receiving recessed depression 244 in the carrier engagement surface 216, configured with a pair of facing locking ribs 248, forming the aforementioned recess. The locking ribs 248 extend substantially parallel to sliding path of the container unit 202 with respect to the carrier unit 206, said path (designated P in FIGS. 7A and 10B). Further noted, side walls 250 of depressions 244 are sloped in order to allow directing of a container unit's first engaging element 240, mounted upon it, to its interlocking position.

A corresponding coupler configured at the container unit is a so-called male coupler comprising a projecting locking location disposed in register with said depressed locking location and configured with at least one locking tongue extending along said engaging sliding path at a second sense, opposite to said first sense, and configured for arresting engagement at a space between said locking rib and depressed surface. As seen, a single container unit's engaging element 240 is generally constituted a downwardly projecting outwards protrusion 258, projecting from the bottom face 220 of the container 202.

Figure 9A:
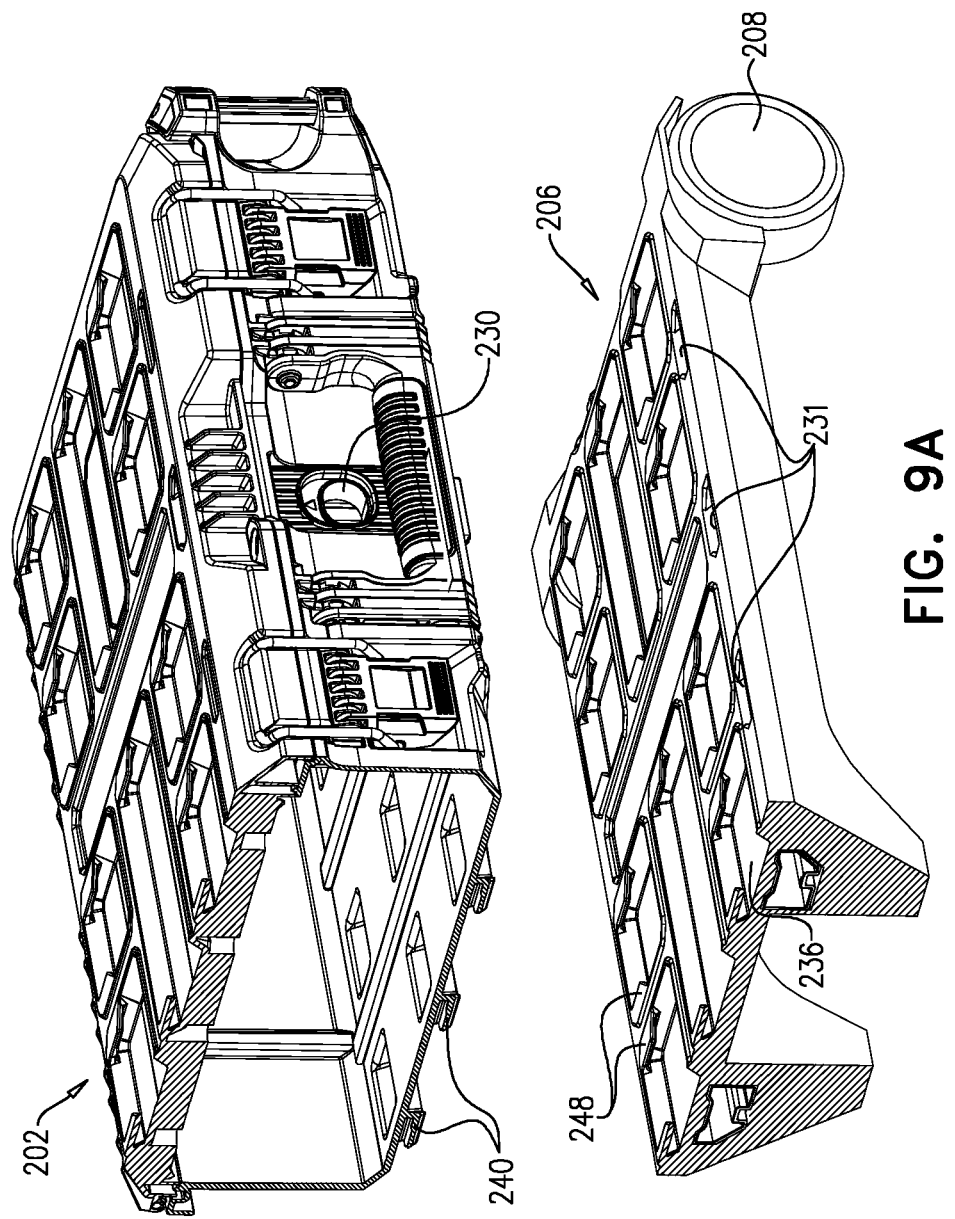
FIG. 9A is a side section along line F-F in FIG. 7A, illustrating the container unit and the carrier unit unattached.
Figure 9B:
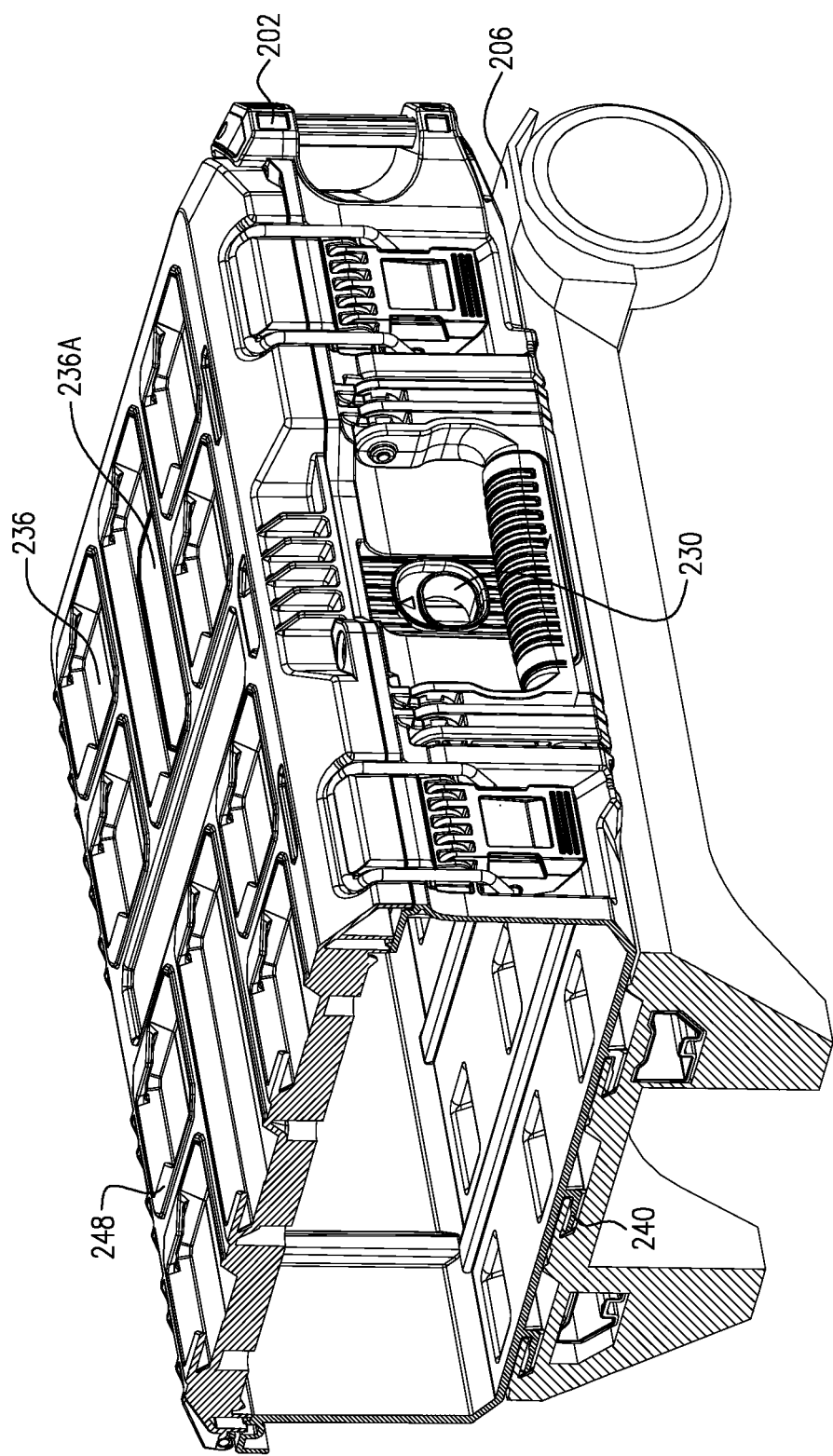
FIG. 9B is a side section along line F-F in FIG. 7A illustrating the container unit and the carrier unit attached.
Figure 9C:
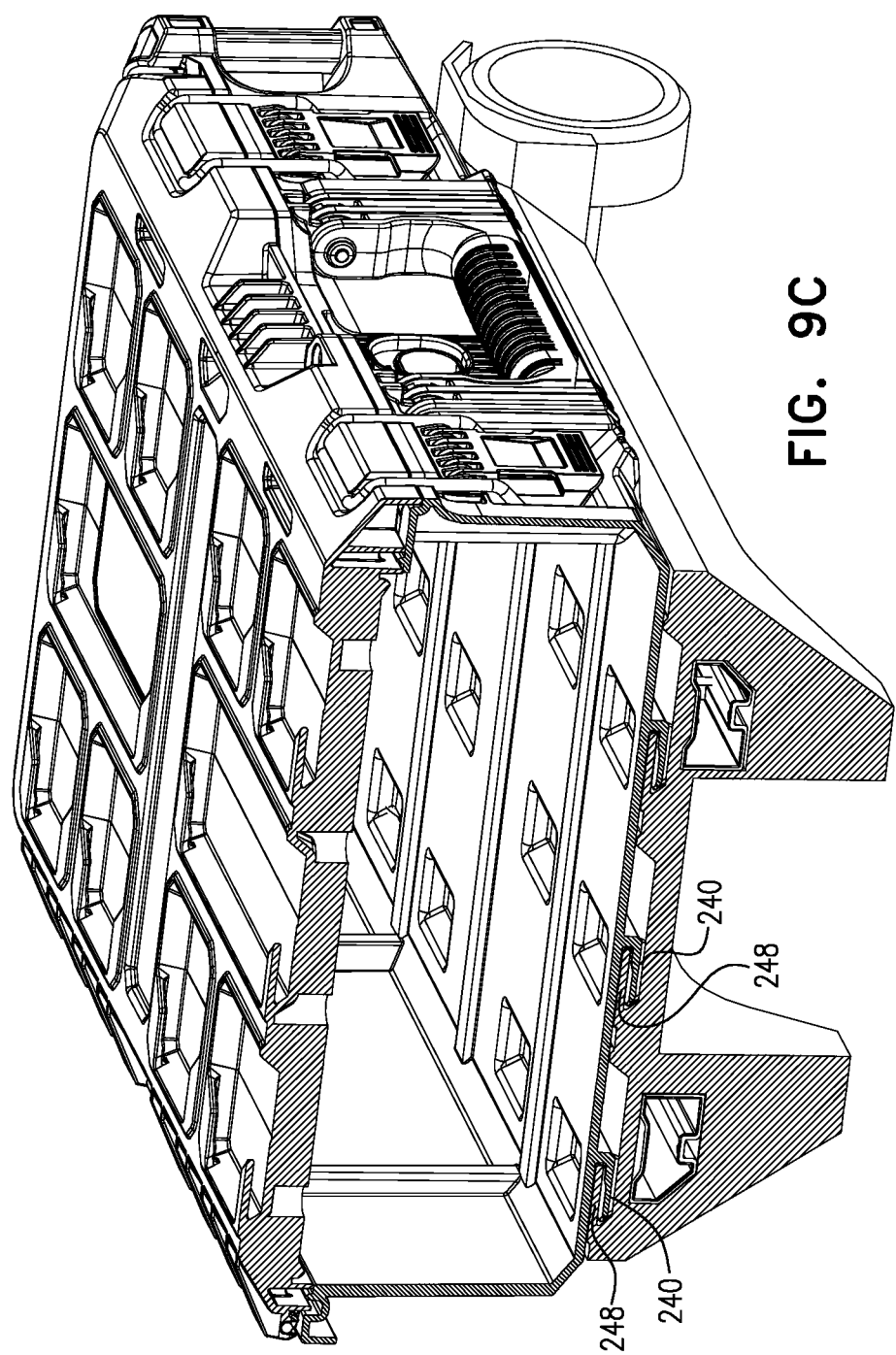
FIG. 9C is a close-up view of FIG. 9B.
Figure 9D:
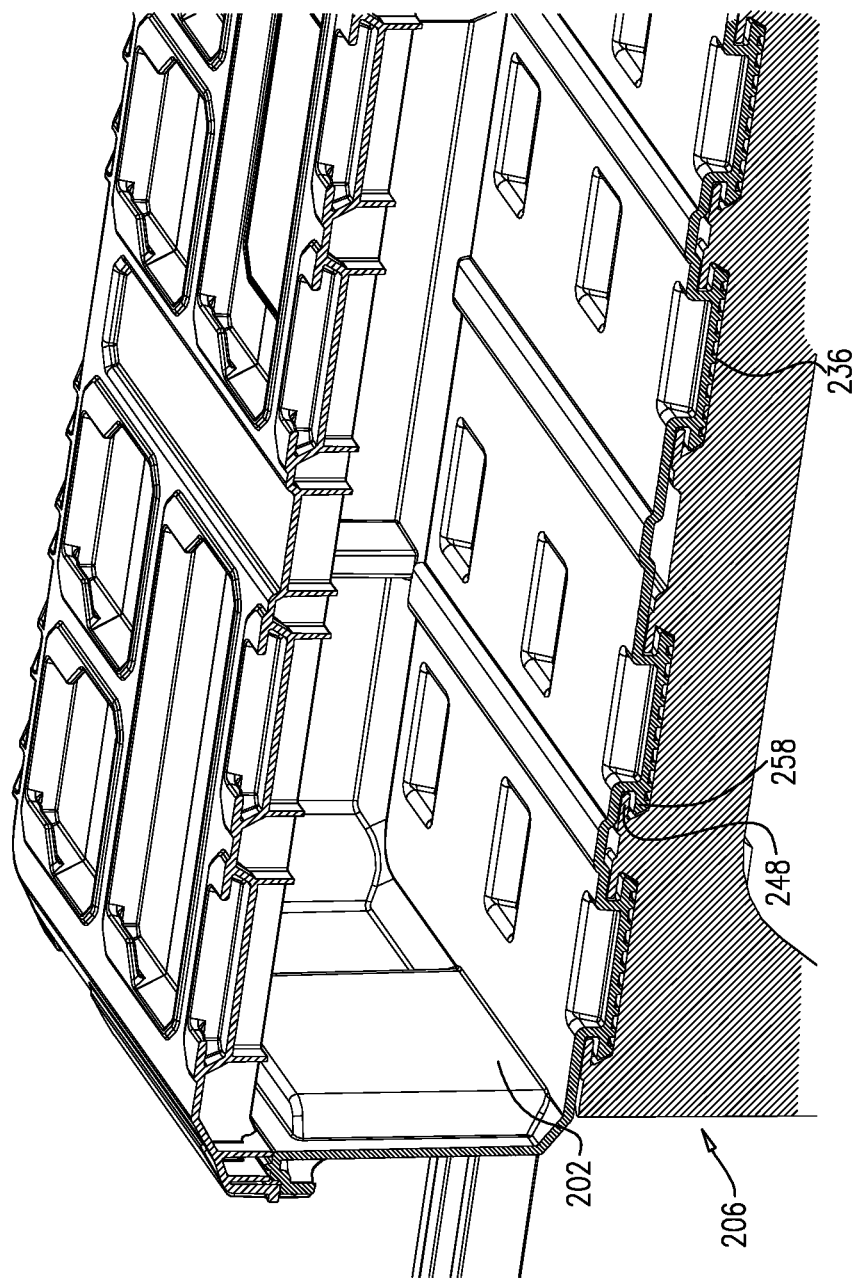
FIG. 9D is a sectioned view along line F-F in FIG. 7A illustrating the interlocking engagement of the carrier engaging elements together with the container unit's first engaging elements.

In order to lock the container 202 over the carrier unit 206, upon placing the container 202 over the carrier engagement surface 216 of carrier unit 206 one must mount the container unit's first engaging elements 240 into the depressions 244 and then slide the container 202 along the sliding path P (i.e. towards the locking ribs 248) so that the engaging elements 240 engage below said projecting ribs/shoulders 248 and the engaging elements 240 are thus arrested at a space between said locking ribs and the depressed surface, as seen in FIG. 9C. interlocking engagement of the container (or any other utility module) can be facilitated by a single male-female locking mechanism of the aforementioned type, or by a plurality of such locking mechanism, at any location over the carrier unit 206.

The shape and size of the locking members is modular as far as the depression 244 in the carrier engagement surface 216, can be single or double in size (e.g., 236 and 236A in FIG. 8A, respectively), so it is large enough to accommodate two container unit's first engaging elements 240, or two neighboring container unit's first engaging elements. Locking/engaging and detaching of this configuration is similar to a single locking module.

The engagement and locking mechanism is modular in the sense that any first article can be easily and readily articulated to a surface of any second article, wherein the articulation is strong and firm (i.e. substantially motionless).

Figure 7B:
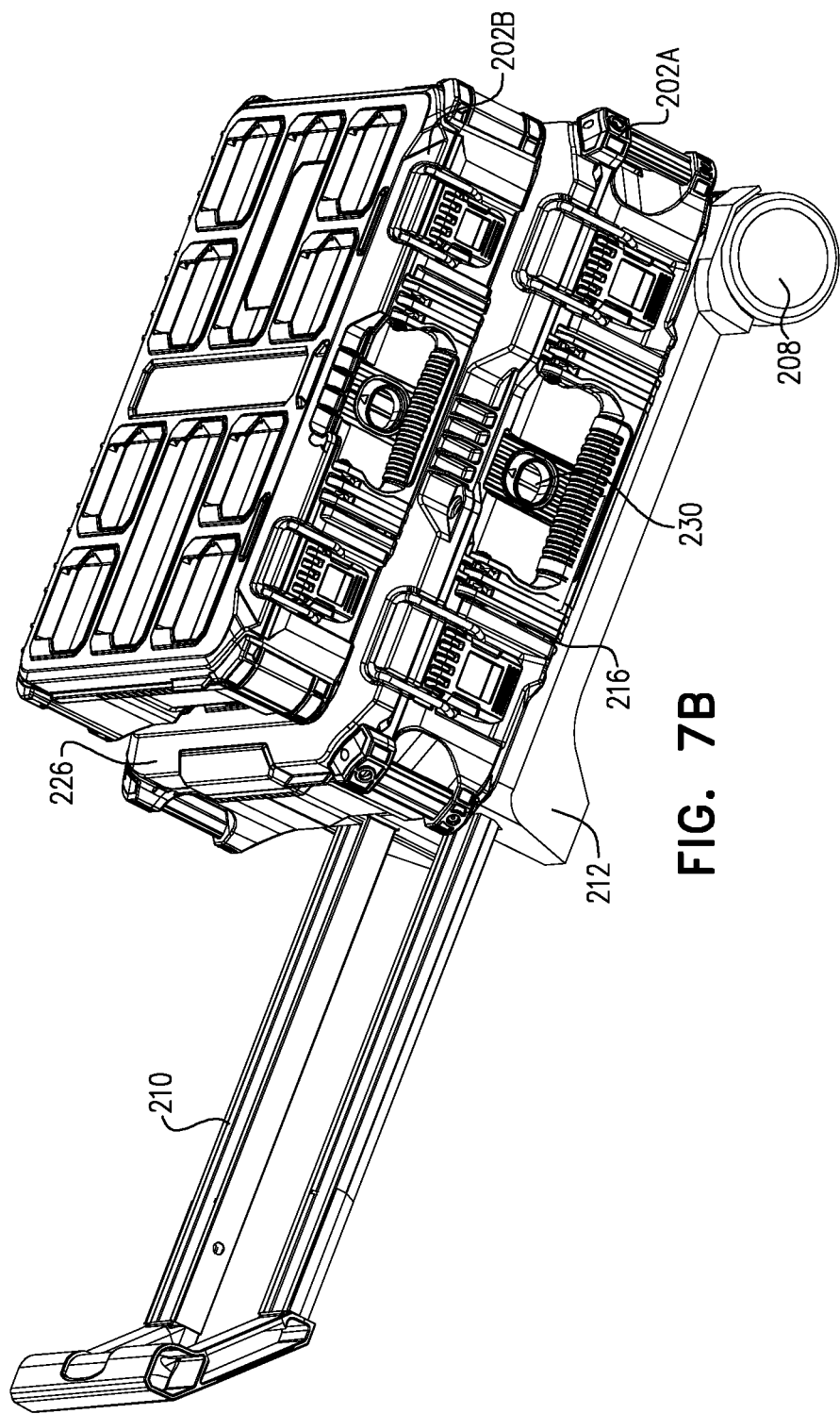
FIG. 7B is a top, left perspective view of a second container unit, mounted on top of a first container unit, which in turn is mounted on top of a carrier unit according to an example of the present disclosure.
Figure 8C:
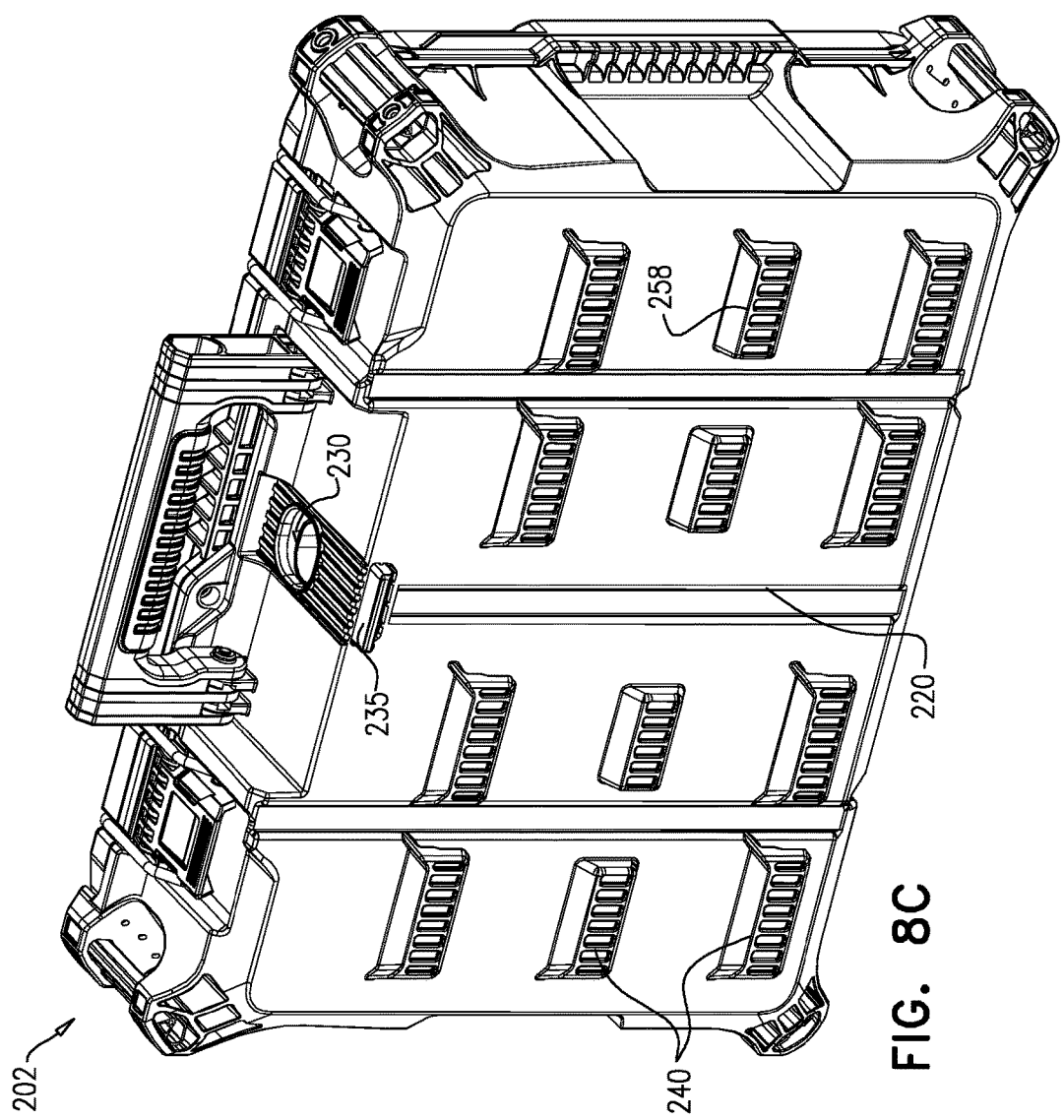

With further reference to FIG. 7B, there are illustrated two containers 202A and 202B articulated over one another, the arrangement being such that the bottom face of the intermediate container 202A serves for engaging with the top face of the carrier unit 206 and likewise, the top face of the intermediate container 202A serves for engaging with the bottom face of the top container 202B, as discussed herein above. The arrangement is such that each stage is lockingly secured by the locking mechanism 230, wherein each stage can be detached from the stage below upon releasing locking engagement of the respective locking mechanism 230.

Figure 10A:
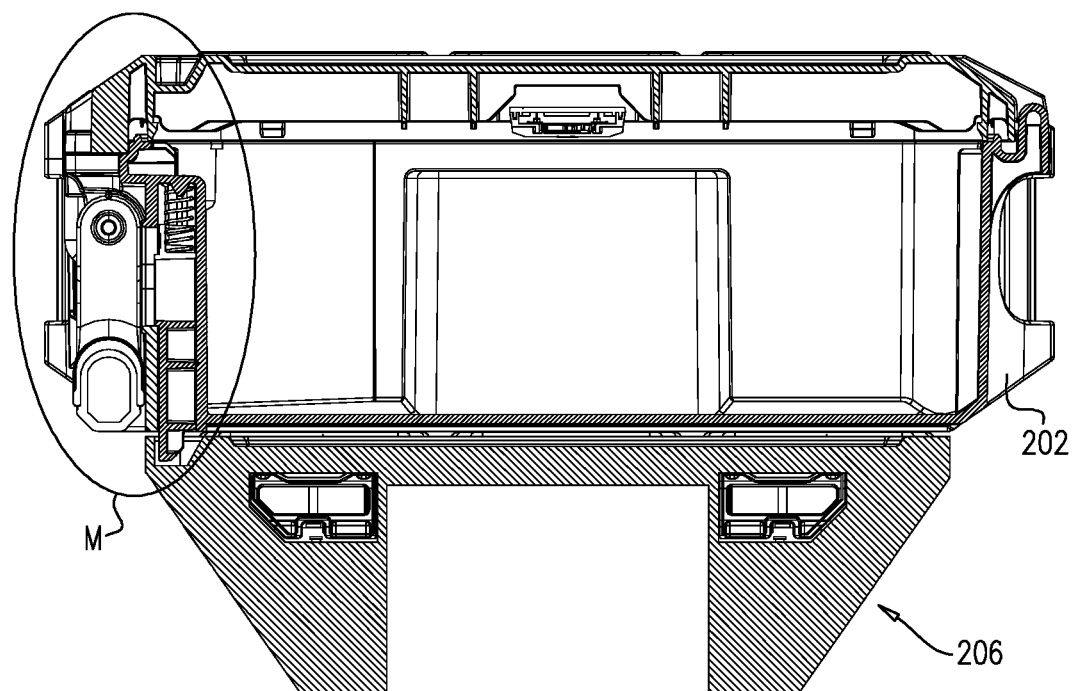
FIG. 10A is a sectioned view along line D-D in FIG. 7A, illustrating the locking mechanism.
Figure 10B:
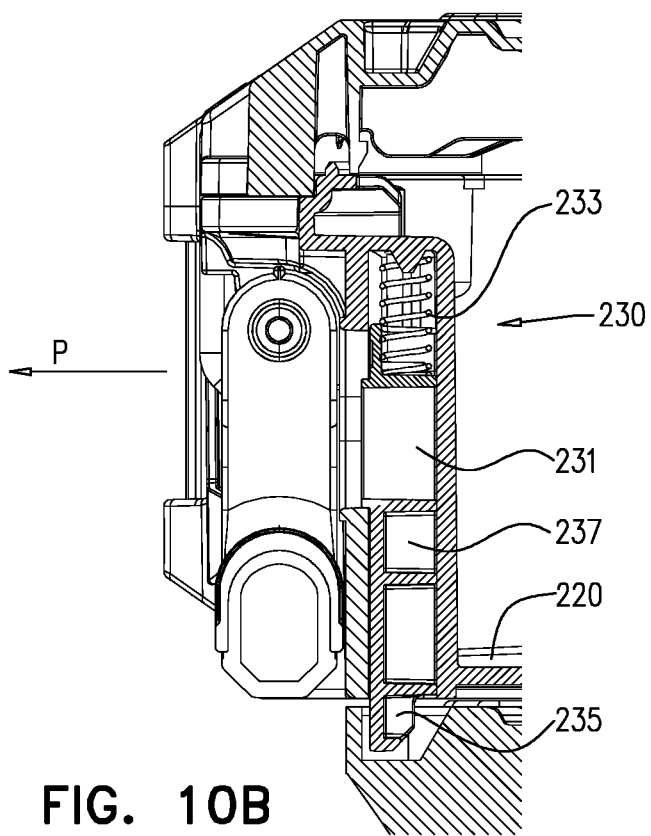
FIG. 10B is an enlarged image of the portion marked M in FIG. 10A.
Figure 11A:
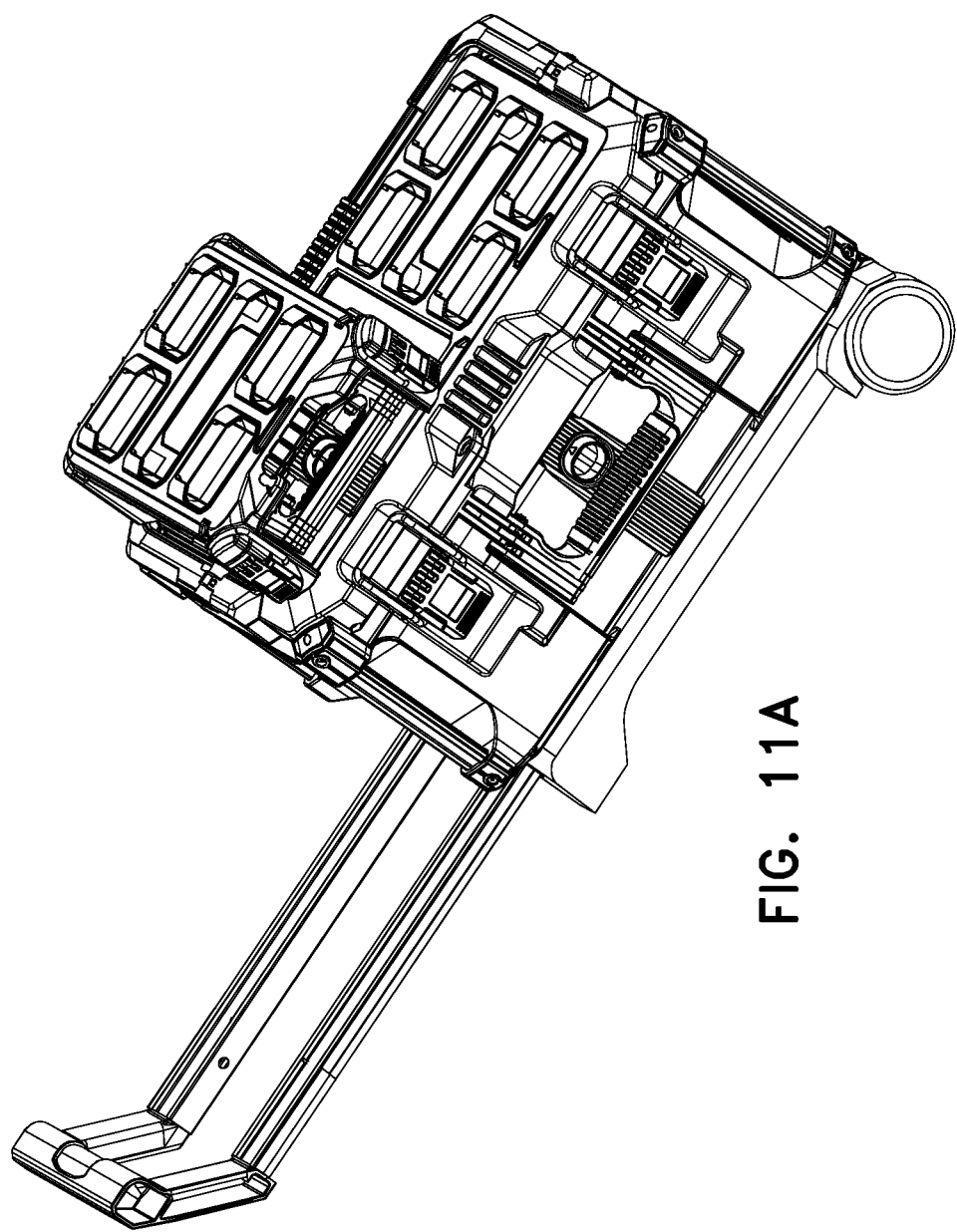
FIG. 11A illustrates different sizes of container units forming an assembly, at a tilted orientation.
Figure 11B:
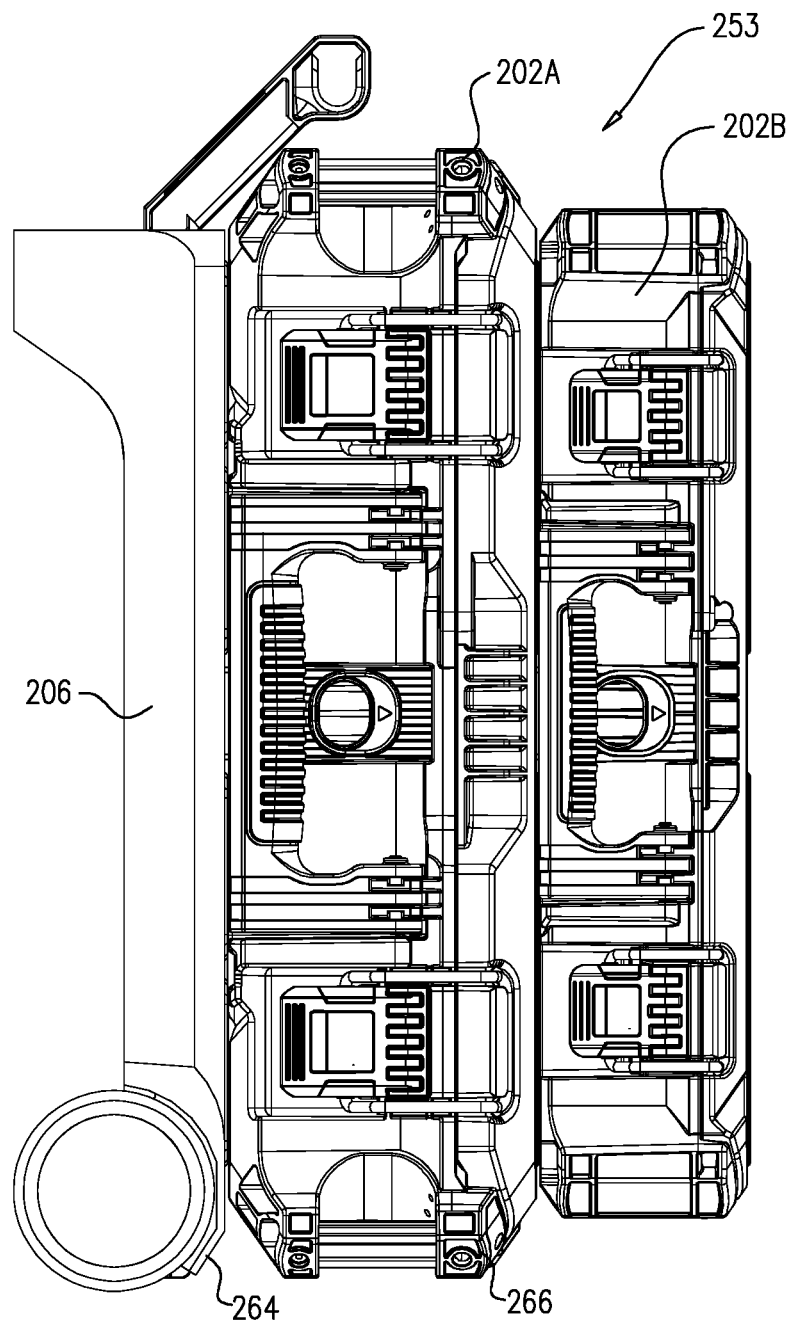
FIG. 11B illustrates an assembled configuration balanced vertically relatively to the ground.

The locking mechanism 230 is shown in further detail in FIGS. 10A and 10B. The locking mechanism comprises a locking pin 231 normally biased by spring 233 such that a tip 235 projects from a bottom surface of the container 202 (see also FIG. 8B) and is configured for snap arresting within a respective notch 231 configured at the engagement surface 216 of the carrier unit 206 (seen also in FIG. 8A).

The locking pin 231 is slidable within a race at the side wall of the container, and comprises a finger manipulating portion at 237 (accessible through an opening at the side wall of the container), for displacing the locking pin, against the biasing effect of spring 233, into its disengaged position, thus facilitating sliding the container along the path P into disengagement from the carrier unit (or respective other container or utility module). The carrier unit 206 is further configured at a bottom end, with a pair of stability supports 264 (FIGS. 8A, 11B), configured for supporting the carrier unit, with or without a container attached thereto, at an upright, i.e. vertical position, thus preventing it from tipping over, in particular with containers or any other utility module articulated thereto. Stability supports 264 can be, according to a particular configuration, an extension of the telescopic handle 210, whereby the stability supports are functional as such only when the handle is fully contracted. However, in the illustration of FIGS. 16A-16B the utility assembly 253 is maintained at its upright position owing to said stability supports 264 and further bearing over a side face 266 of the intermediate container 202A, being substantially flush with a bottom face of the stability supports 264.

Figure 12A:
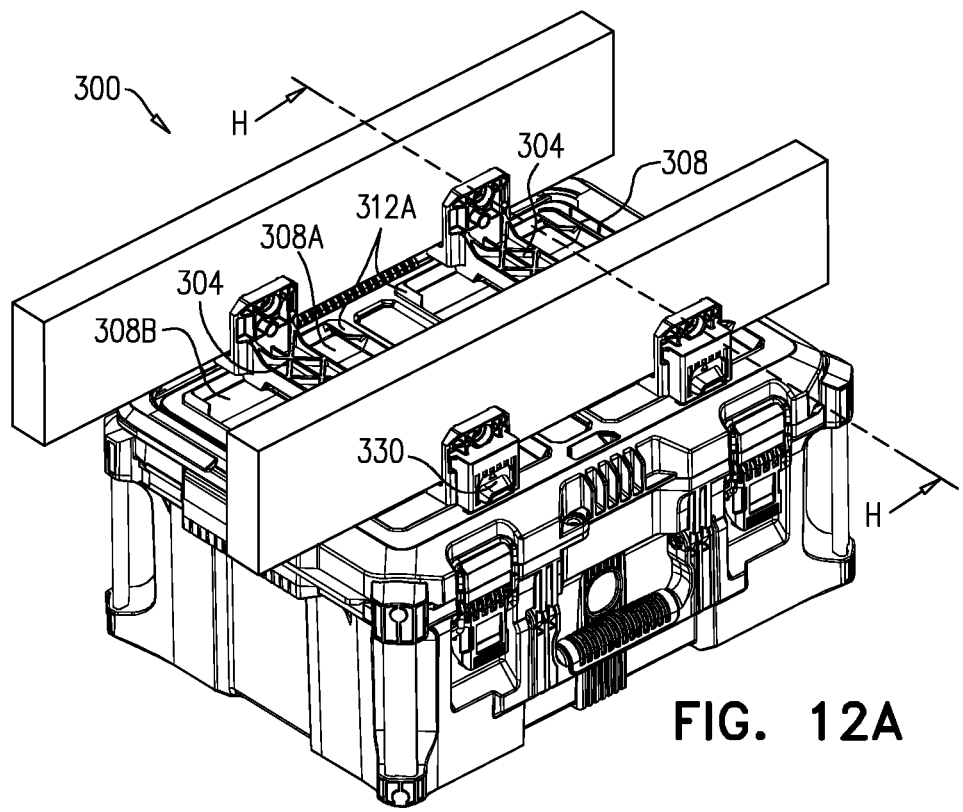
FIG. 12A shows a container assembly wherein the female coupler comprises two locking ribs extending at respective side edges of two neighboring depressed locking locations.
Figure 12B:
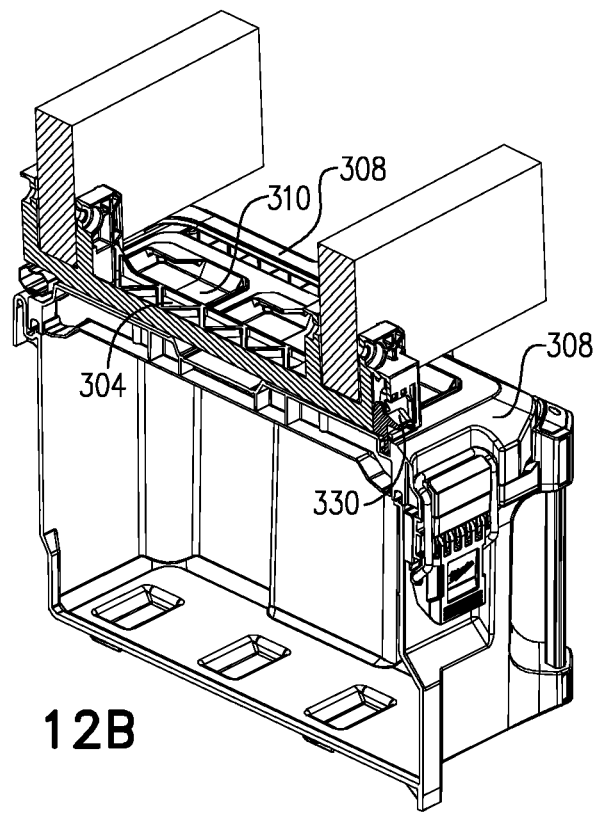
FIG. 12B is a section along line H-H in FIG. 12A.
Figure 12C:
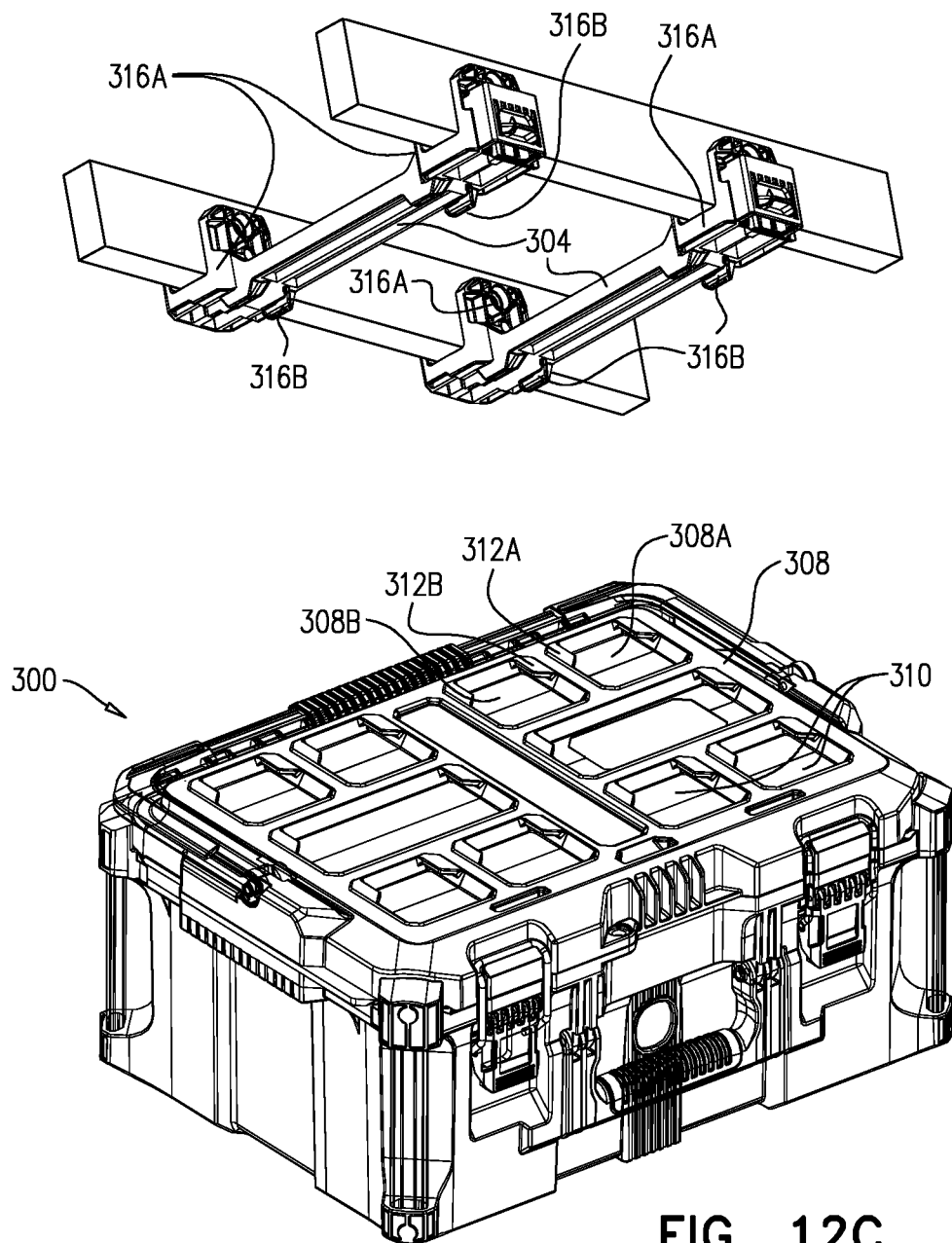

With further reference to FIGS. 12A to 12C there is illustrated a modification of articulation between a first utility module (container 300 in the particular example) and a second utility module (two work-piece supports 304 in the particular example). The container 300 is substantially similar to that illustrated in the previous examples, wherein the cover/lid 308 is configured with a plurality of female coupler members 310, each configured with a depressed locking location and a pair of locking ribs extending above the depressed surface and along a sliding path. The opposing locking ribs 312A and 312B have an open edge facing in a first sense (the introducing direction).

In the examples hereinbefore, engagement with a corresponding male coupler took place within the vicinity of a single coupling element, i.e. over two engaging ribs 312A and 312B of a single depressed locking location facing each other. However, in the example of FIGS. 12A-12C engagement of the work-piece supports 304 takes place over two engaging ribs 312A and 312B of two neighboring depressed locking locations 308A and 308B. Accordingly, the male coupler of the two work-piece supports 304 is configured for arresting with the two engaging ribs 312A and 312B by two individual (separate) male couplers 316A and 316B, each configured for arresting one of the respective engaging ribs 312A and 312B. Arresting of the male projections 316 takes place as discussed before, by arresting below the respective engaging ribs, within the space at the depressed locking location. In spite of the relative narrow body structure of the work-piece supports 304, they are each configured with a locking mechanism 330, similar to locking mechanism 230 discussed hereinbefore.

Turning now to FIGS. 13A to 24, there are illustrated various examples of utility modules, utility assemblies and various configurations according to the disclosure.

Figure 13B:
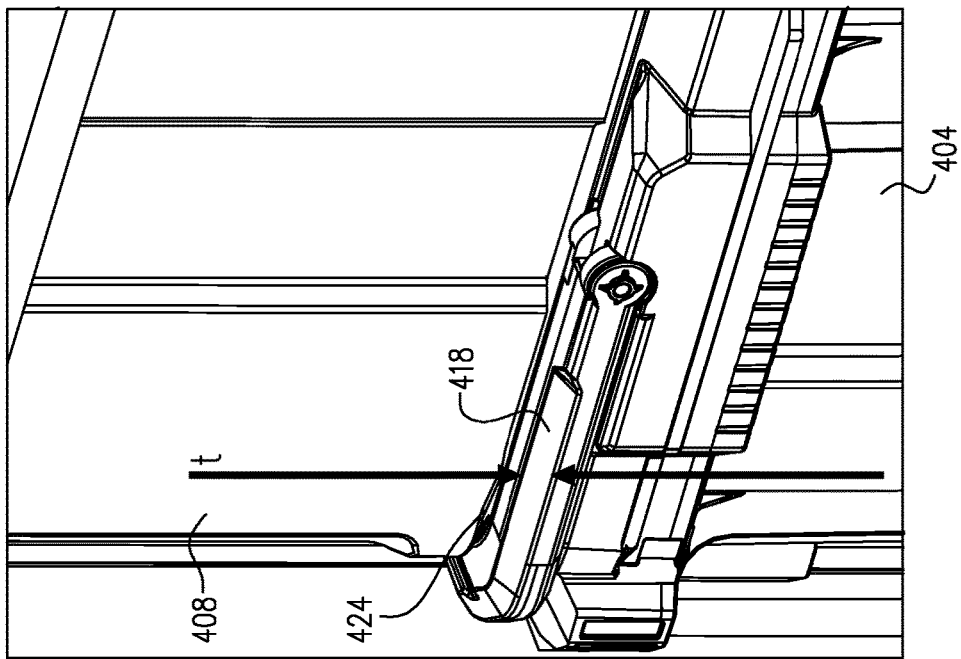
FIGS. 13A to 24 are different embodiments and configurations of utility modules and utility assemblies according examples of this disclosure.
Figure 13A:
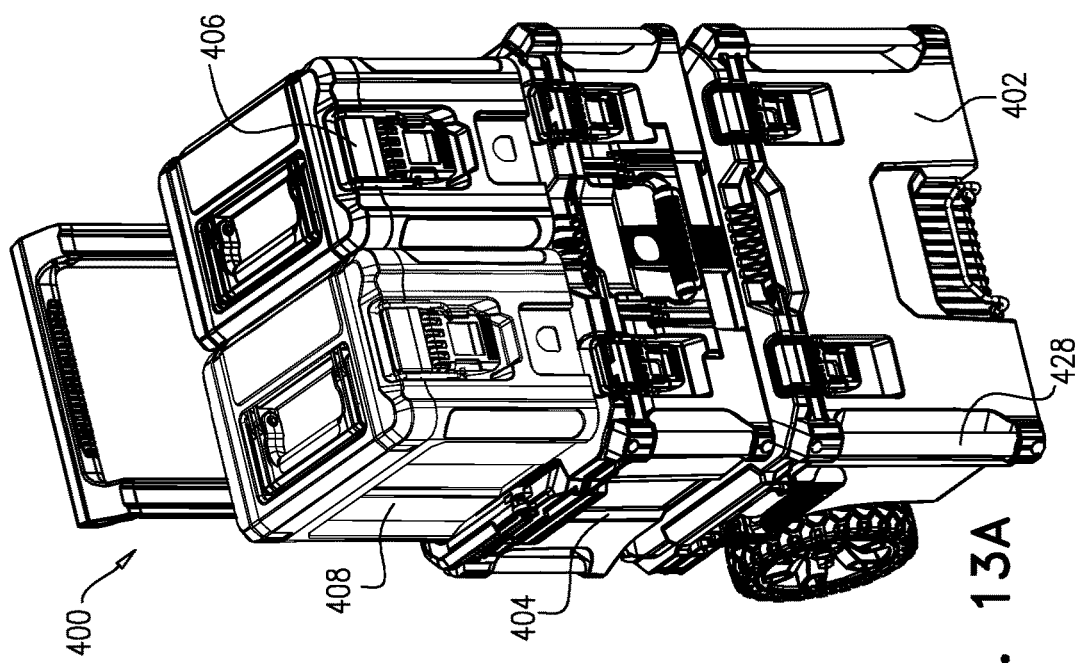

FIG. 13A illustrates a utility module assembly generally designated 400, comprising a wheeled base container 402 supporting an intermediate container 404, bearing in turn a cooler box 406 and a power unit 408 disposed side by side over the intermediate container. At least the intermediate container 404 is configured at a bottom face thereof with a male-type coupling arrangement, for attachment over the cover of the base container, said cover configured with a respective female coupling arrangement. The cover of the intermediate container 404 is configured with a similar female coupling arrangement, and can thus engage with one the utility modules 406 and 408, each configured at its bottom face with a respective male-type coupling arrangement.

Figure 13D:
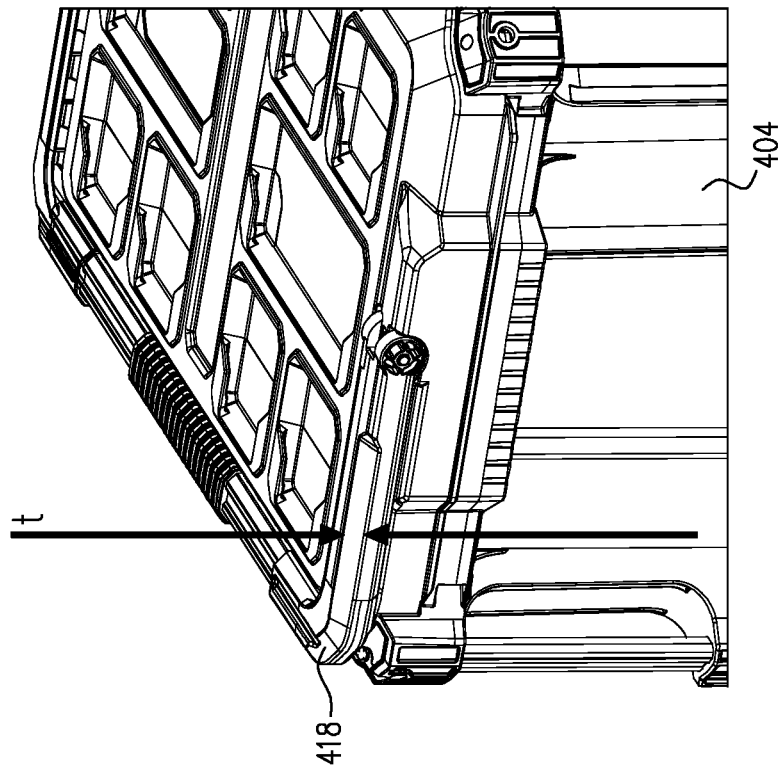
Figure 13C:
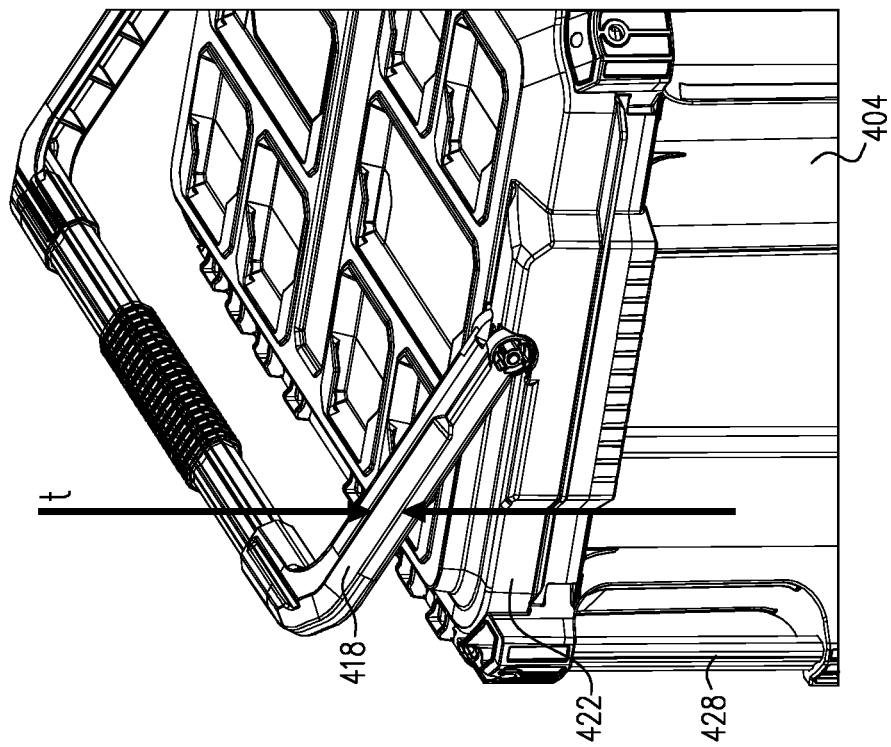

It is seen in FIGS. 13B through 13D that the intermediate container 404 is fitted with a pivotal carrying handle 418 articulated at the top side walls thereof. The carrying handle has a thickness t and the arrangement is such that at the stowed/folded position (FIGS. 13B, 13D) the handle 418 is received within a peripheral groove 422 extending over a top edge of the intermediate container 404 and a peripheral groove 424 extending at a bottom edge of the utility modules 408 and 406 (cooler box 406 and a power unit 408), such that the handle 418 does not constitute an obstacle in mounting and interlocking a utility module over another utility module. It is also seen that at least some of the utility modules are configured with side handles 428 serving both as carrying handles and as bumpers.

Figure 14A:
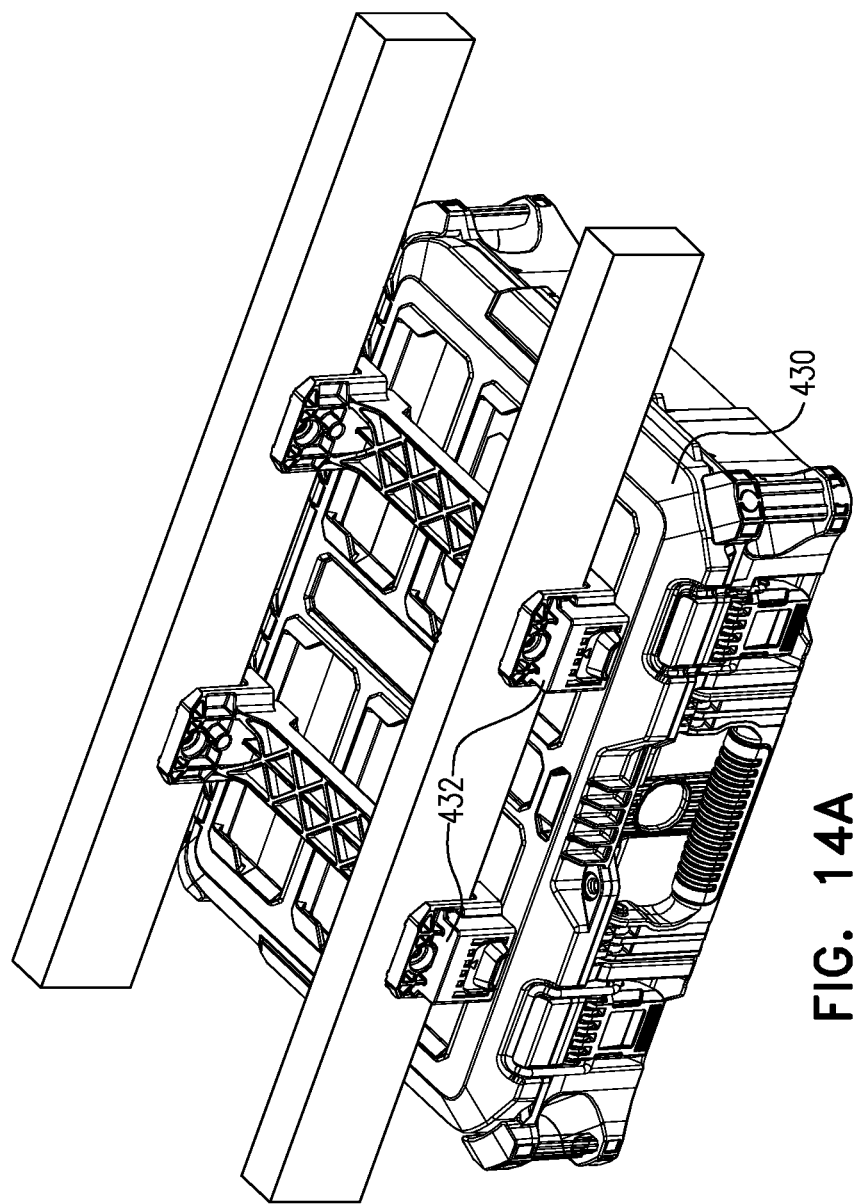
Figure 14B:
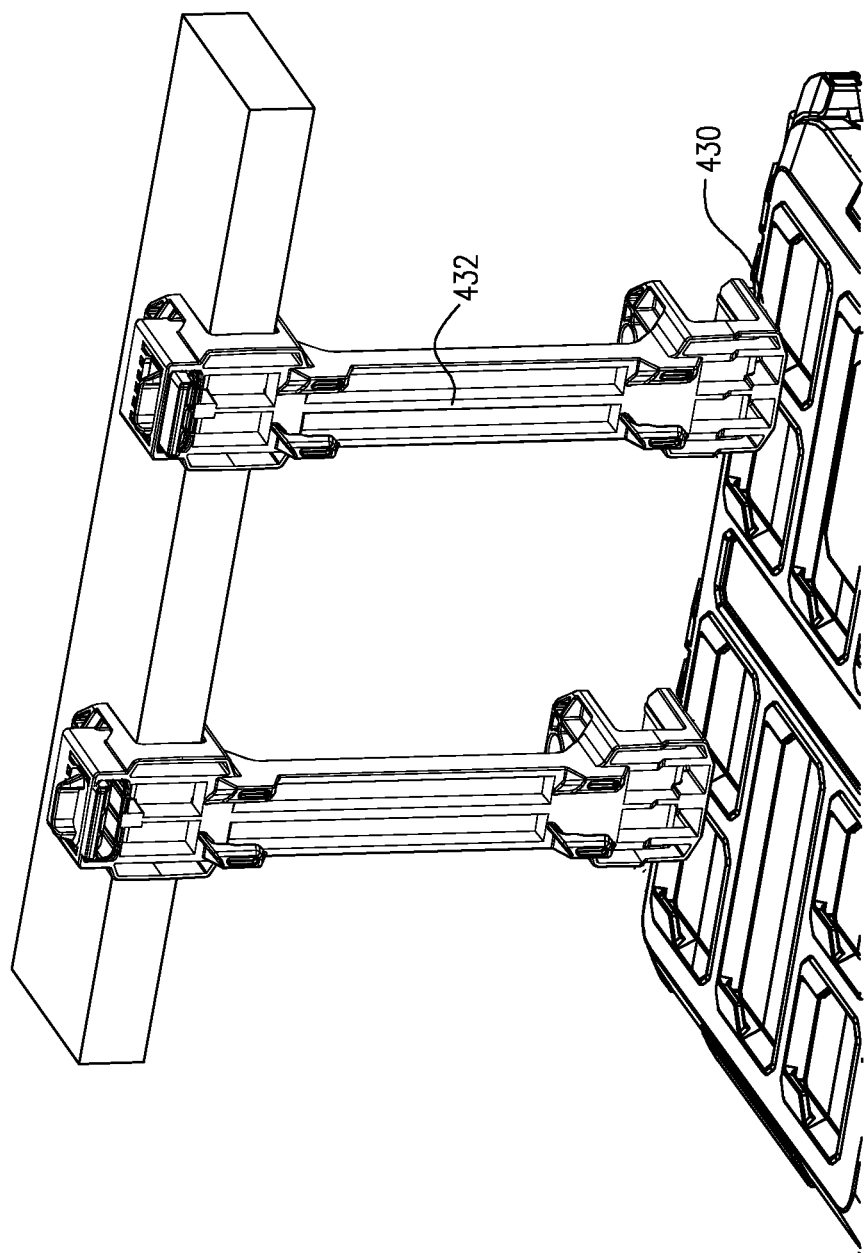
Figure 14C:
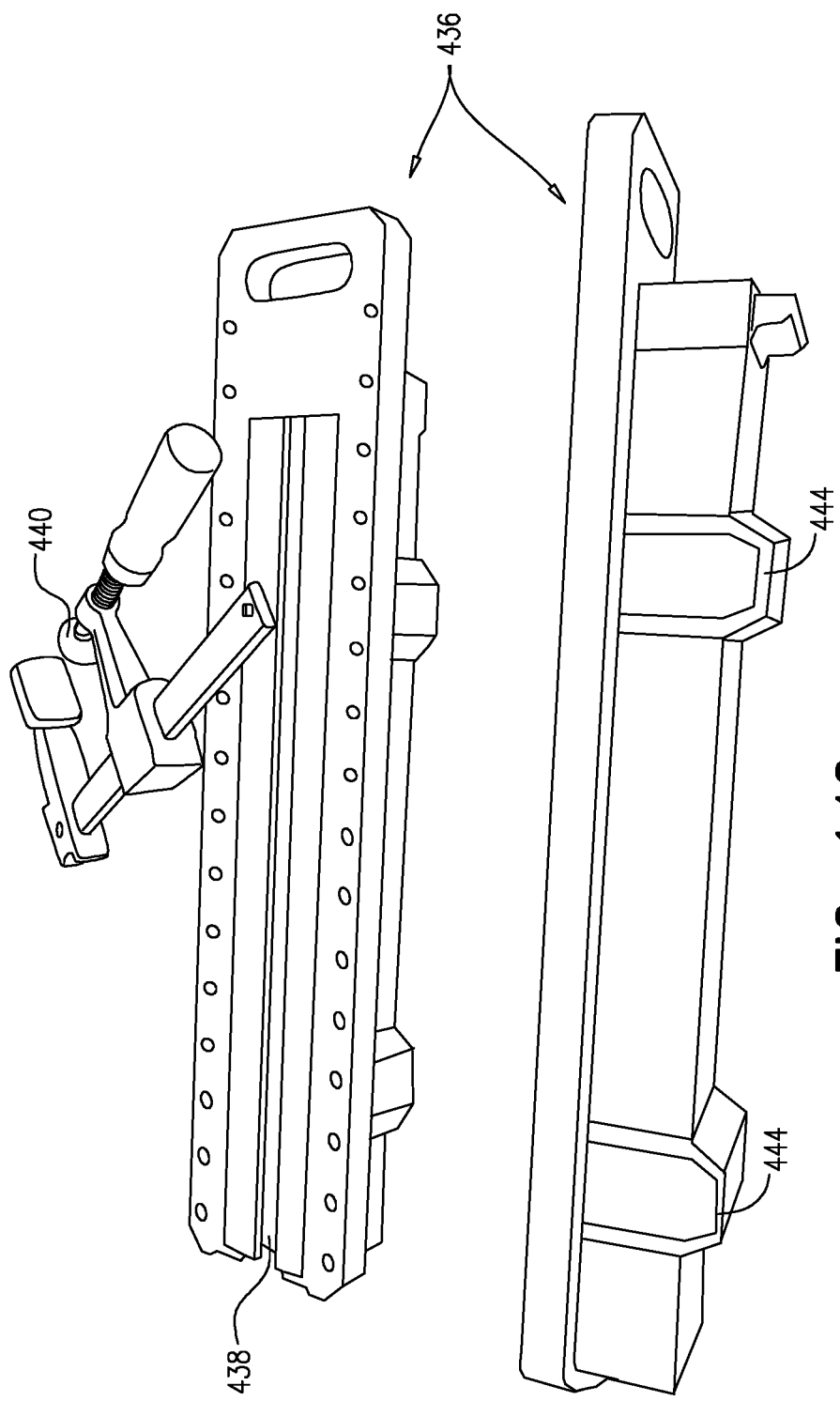

FIGS. 14A to 14C illustrate a first utility module in the form of a container 430 supporting two detachable workpiece-piece supports 432 (attached as discussed herein before with reference to FIGS. 12A-12C). FIG. 14C illustrates a utility module in the form of a work surface 436 configured with a vice race 438, so that a vice 440, or other workshop tools can be used. The workpiece-piece supports 432 are configured with a male type coupling having projecting locking locations 444 for engaging with respective female couplers.

Figure 15A:
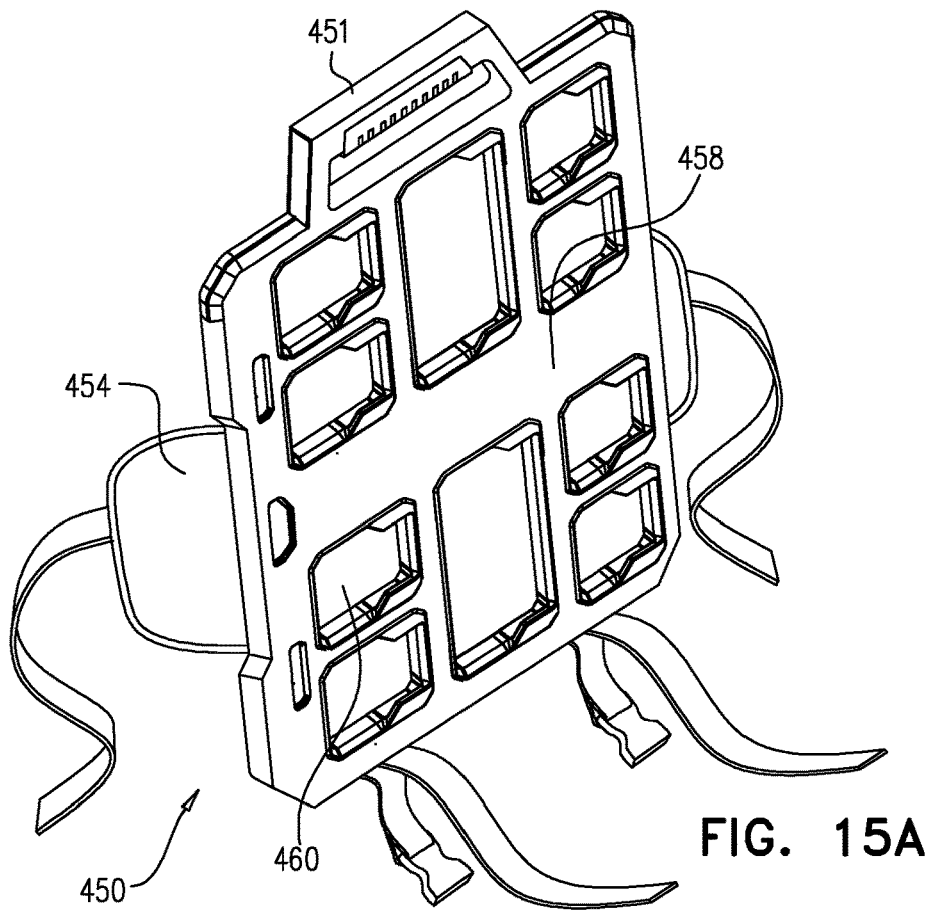
Figure 15B:
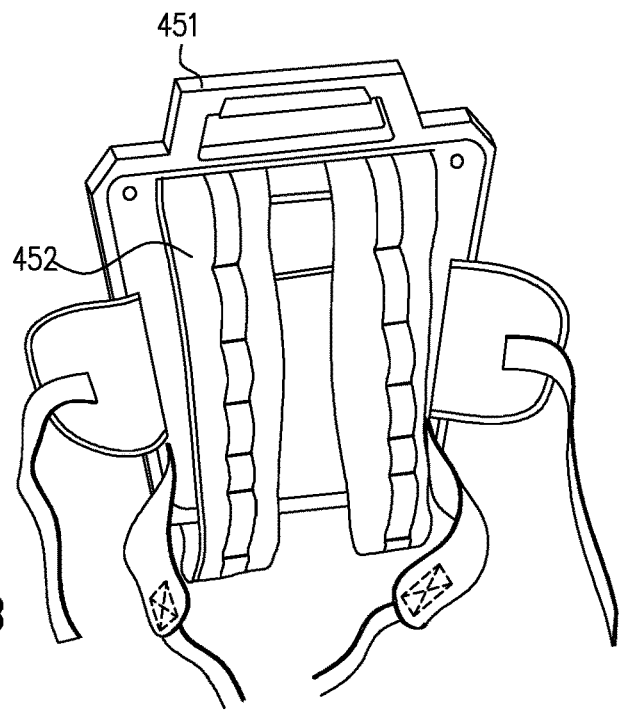

In FIGS. 15A and 15B there is illustrated a back-rack 450 being a substantially rigid platform having a carrying handle 451 and configured at one side thereof with a pair of adjustable shoulder harnesses 452, and an adjustable waist harness 454. The other side of the back-rack is configured as a universal utility mounting platform 458, configured with a plurality of attachment locations 460. In the illustrated example all attachment locations 460 are so-called female attachments (as discussed hereinabove in detail), however it is appreciated that the attachment locations can just as well be male-type attachments, or a combination of male and female attachments. According to yet an example (not shown), one side of the carrying platform can be configured with male-type attachments, and an opposite side of the platform be configured with female-type attachments, wherein a used has the choice of attaching the platform to the harness system at an orientation of choice.

Figure 16A:
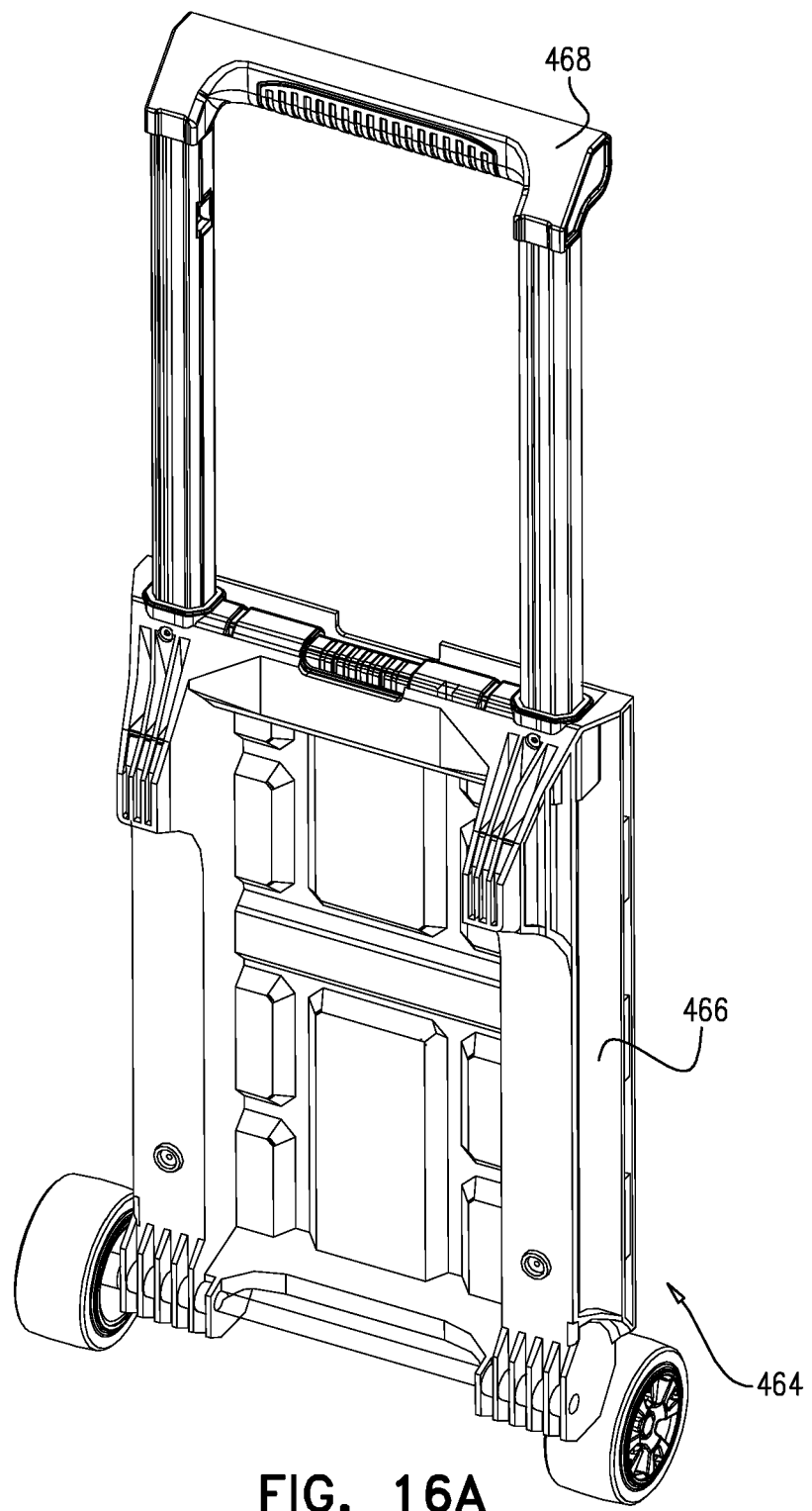

In FIG. 16A there is illustrated a utility module in the form of a wheeled carrying unit 464 (shown from a bottom side), similar to that disclosed in connection with FIGS. 7A to 11B. The carrying unit 464 comprises a rigid platform 466 fitted at a top face thereof with a female/male attaching arrangement in accordance with the disclosure, such that any utility module according to the disclosure can be detachably attached thereto. Also provided is a telescopic manipulating handle 468 and a pair of wheels 466. The carrying unit can be fitted with a collapsible support plate configuring it into a pushcart (not shown).

Figure 16B:
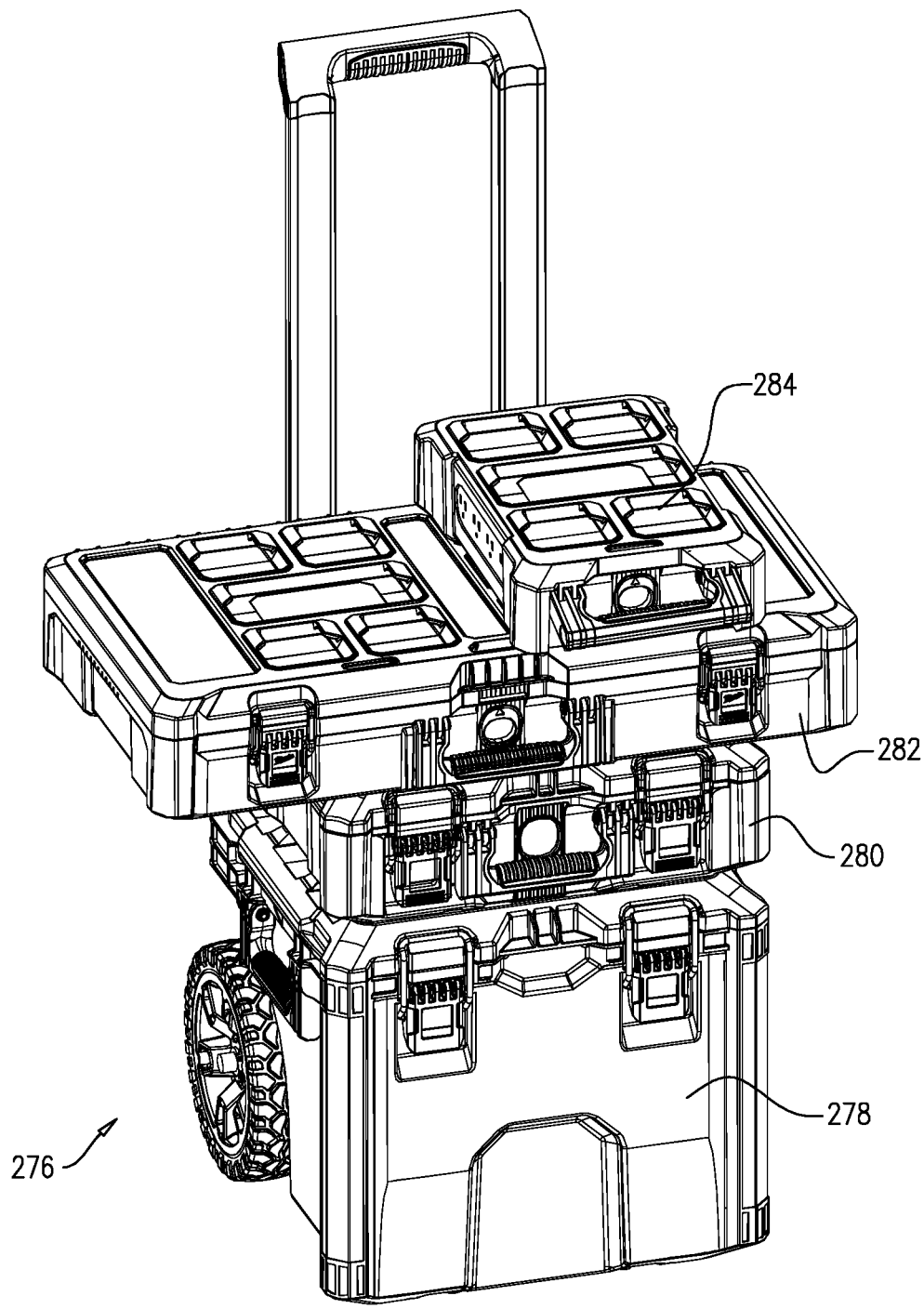

FIG. 16B shows a utility assembly 276 comprising a wheeled base container 278 interlocked with a first intermediate container 280 mounted thereover (constituting a second stage of the assembly), and a second intermediate container 282 mounted thereover (constituting a third stage of the assembly 276), there being yet a fourth stage utility module container 284 mounted over the second intermediate container 282. Whilst the second intermediate container 282 has a wider footprint than the first intermediate container 280, this does not constitute any difficulty as far as attaching it over the second intermediate container 282, and further, the top face of the second intermediate container 282 has a great surface suited for articulation thereof of several fourth stage utility modules (only one shown).

Figure 17:
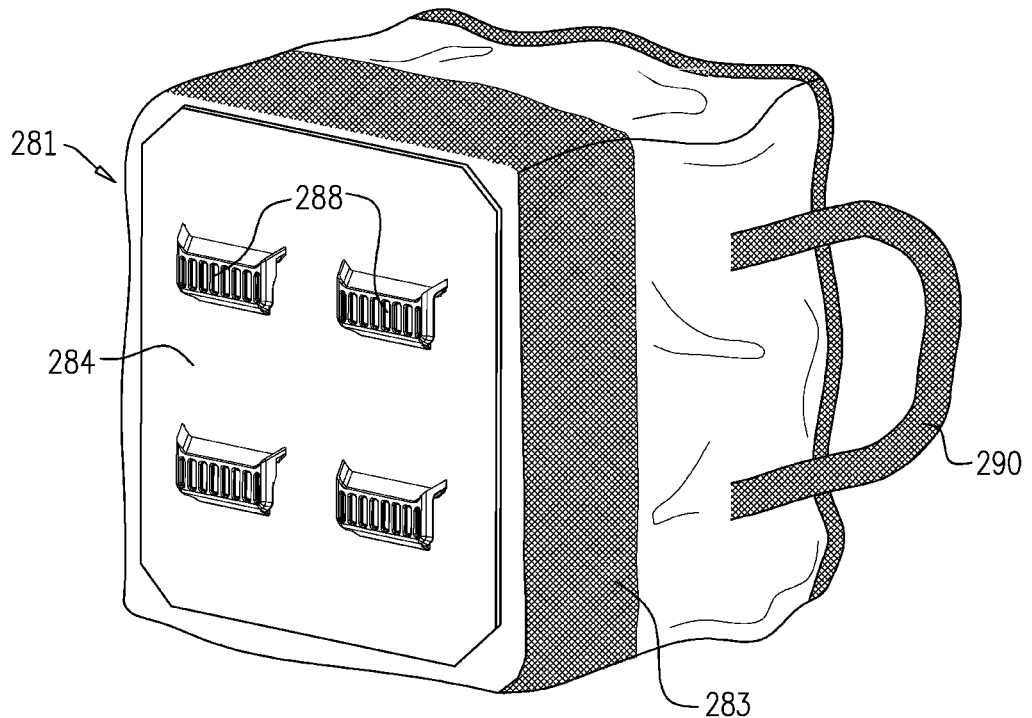
Figure 18A:
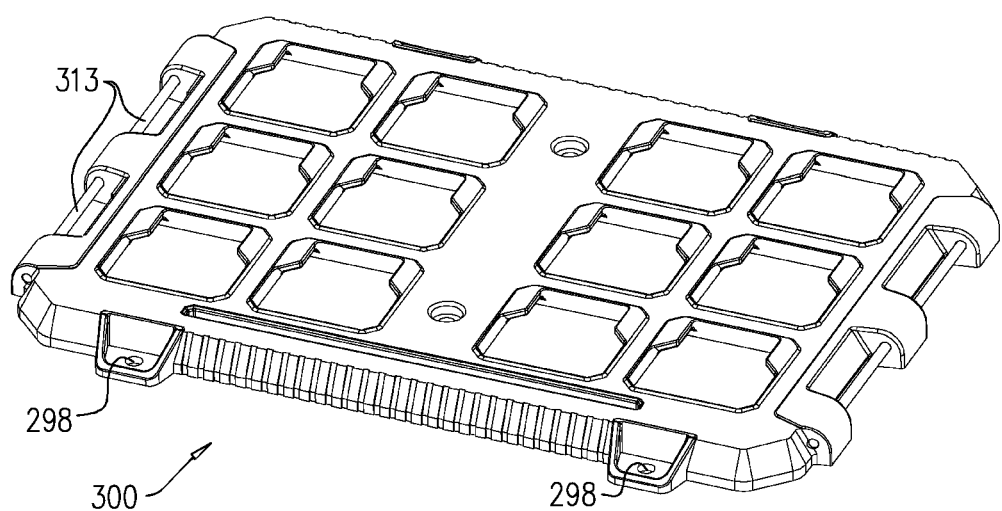
Figure 18C:
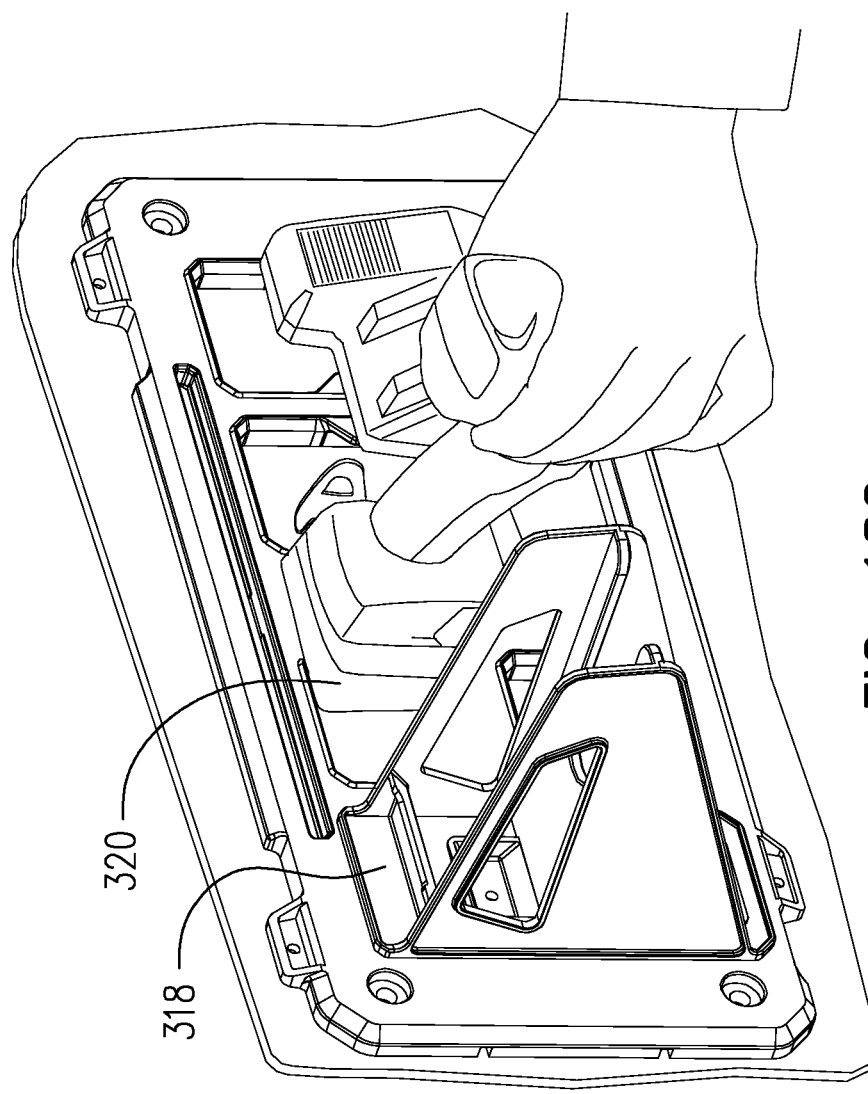

FIG. 17 shows a carrying bag 281 having soft side walls 283 (in the example illustrated made of fabric), however fitted with (integrally or detachable) an articulation platform base 284, said articulation platform made of a firm rigid material and is configured with four male-type coupling locations 288 of the type disclosed hereinabove. The carrying bag 281 has a carrying strap 290 useful for hand held or shoulder carrying of the bag. FIG. 18A shows a rigid coupling platform 300, configured with a plurality of female coupling locations (of the type disclosed herein) and further configured with bolt eyes 298 for securing to any desired surface, and carrying bars 313.

The coupling platform 300 can be attached for example to a truck bed 306 (FIG. 20), directly over the truck bed or over a cargo container attached to the truck. The coupling platform 300 can be attached to a wall, as in FIG. 18B, wherein a plurality of various utility modules can be articulated thereto. For example, utility modules can be an electric charger 315 of a power tool, a wall mounted sorting container 314, a hand tool rack 318 (FIG. 18C), a tool coupling adaptor 320 (FIG. 18C), etc.

Figure 19:
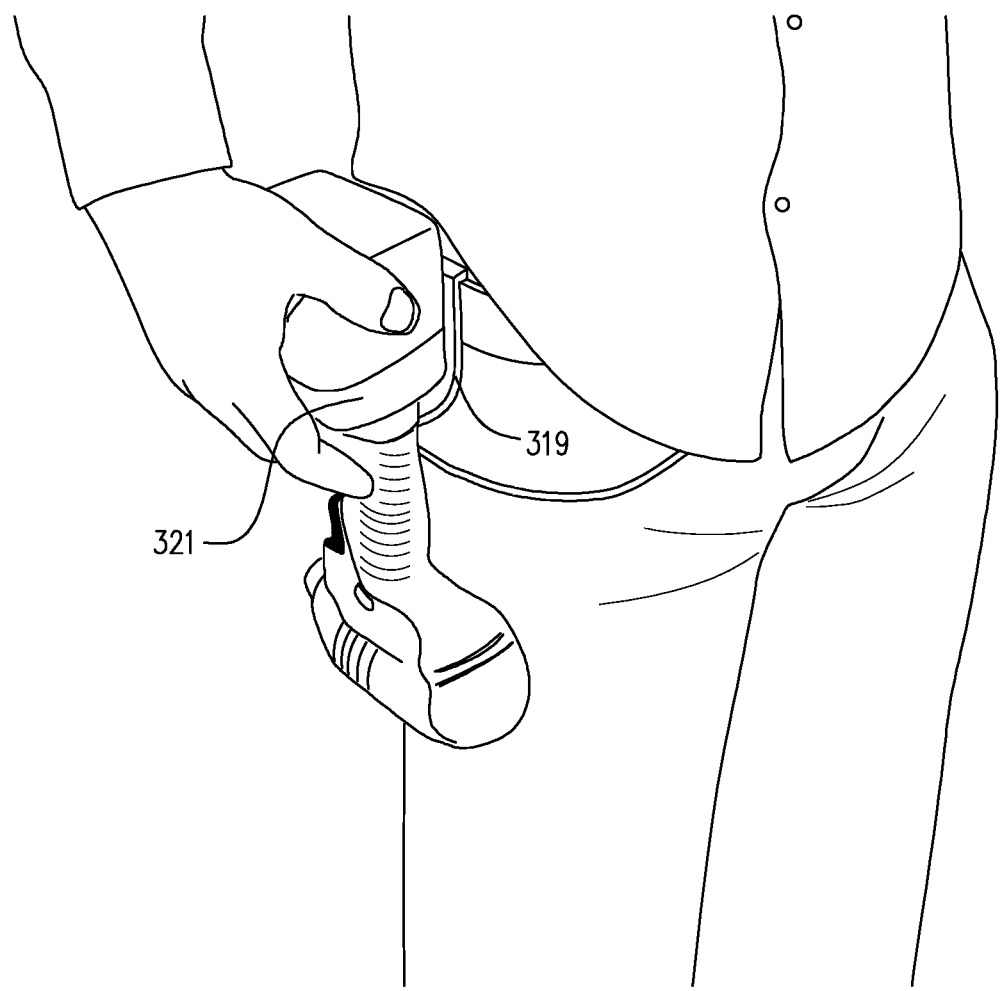
Figure 20:
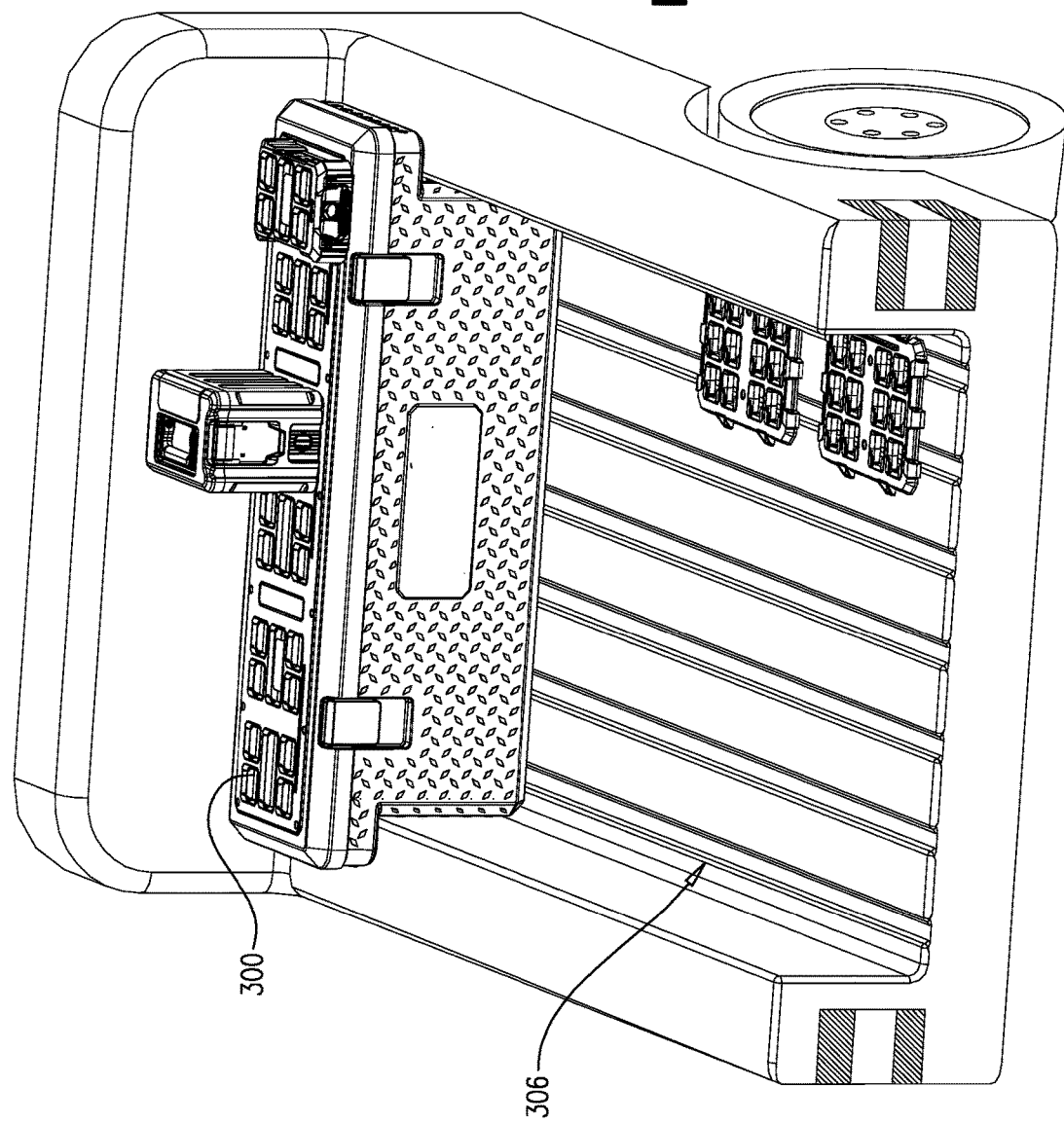

In FIG. 19 there is illustrated a belt-mount 319 configured as a female coupler according to the disclosure, wherein a tool 321 or a bag/pouch configured with a male coupler can be detachably attached thereto.

Figure 21:
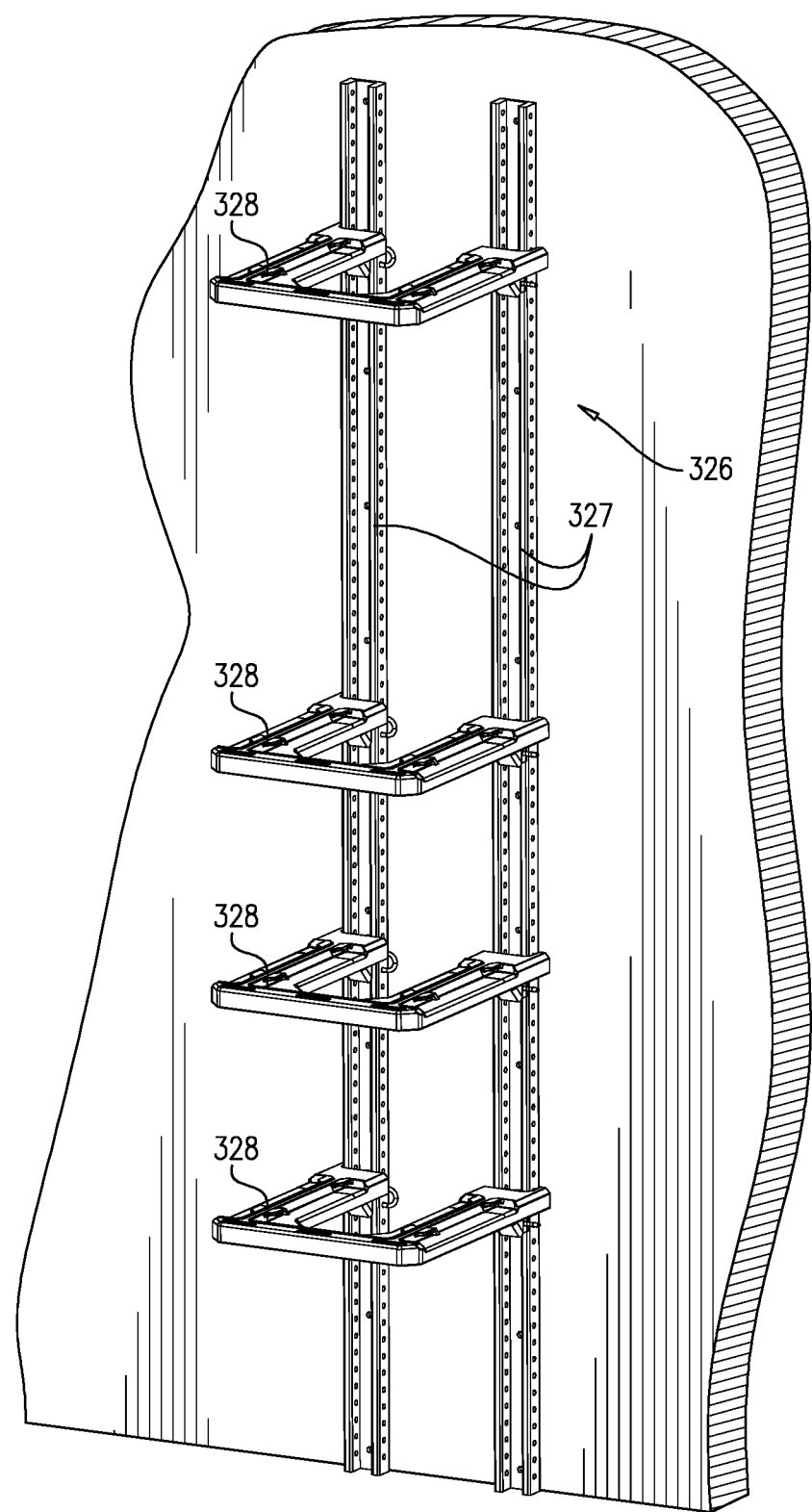

In FIG. 21 there is illustrated a wall rack 326 comprising four utility modules in the form of articulation platforms 328 (mountable at different elevations about the wall supports 327) each configured for bearing and attaching thereto any utility module in accordance with the disclosure.

Figure 22:
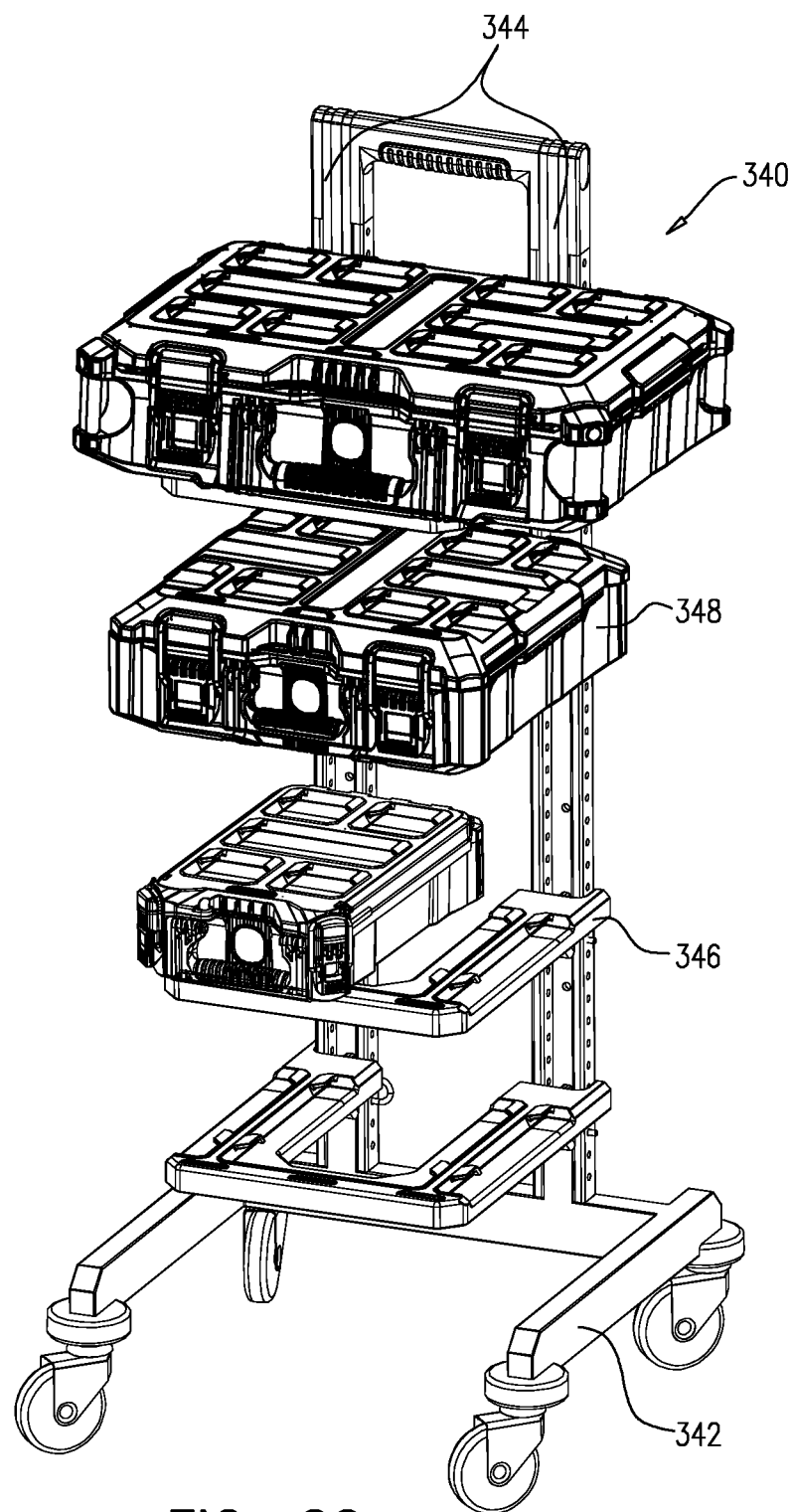

In FIG. 22 there is illustrated a mobile work stand 340 comprising a wheeled base 342 supporting two racks 344 with four utility modules in the form of articulation platforms 346 (mountable at different elevations about the wall supports 327) each configured for bearing and attaching thereto any utility module (e.g., containers 348) in accordance with the disclosure.

Figure 23:
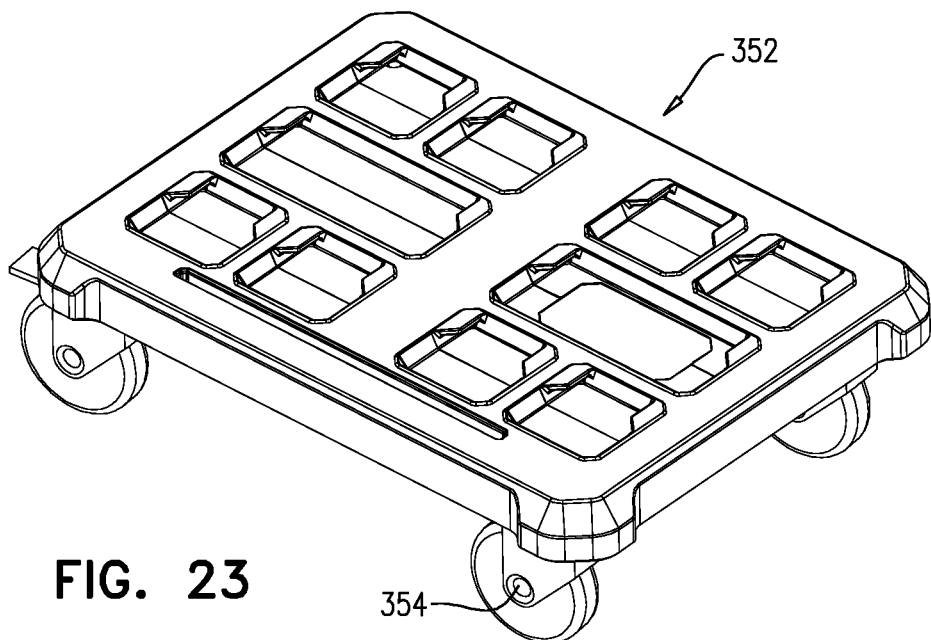

In FIG. 23 the utility module is in the form of a dolly 352 configured with wheels 354 and having a top surface configured with an array of female type couplings, as discussed.

Figure 24:
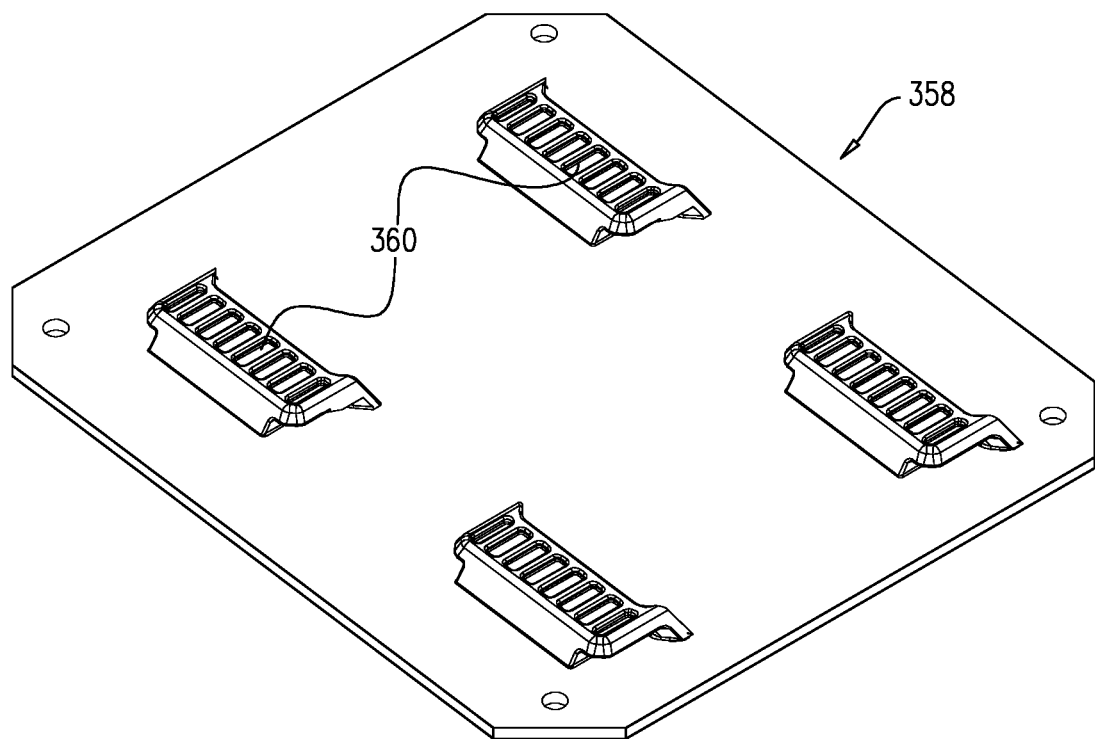

In FIG. 24 there is illustrated a utility coupling platform 358 suited for articulation to any desired article (e.g., a bag, a tool, etc.). the utility coupling platform is configured at least at one face thereof with a male coupling locations 360 mimicking the coupling arrangement of the disclosure, rendering it suitable for articulation with a coupling system according to the disclosure.

The invention claimed is:

1. A utility assembly, comprising:
   at least a first utility module;
   at least a second utility module; and
   a coupling mechanism for readily detachably attaching the first and second utility modules, the coupling mechanism being configured between the first utility module and the second utility module, wherein the coupling mechanism comprises at one of a top face of the first utility module and a bottom face of the second utility module one or more depressed locking locations each configured with a locking rib, and at least one locking latch arresting location; and the other one of the top face of the first utility module and a bottom face of the second utility module includes one or more projecting portions each configured with a locking tongue disposed in register with the one or more depressed locking locations, and at least one spring-biased locking latch configured for normally projecting from a face of the respective first or second utility module and disposed in register with the at least one locking latch arresting location;

wherein at a locked position, the bottom face of the second utility module at least partially rests over the top face of the first utility module, and the one or more locking tongues are arrested by the corresponding one or more locking ribs, and the at least one locking latch is arrested by a corresponding at least one locking latch arresting location and is snap locked in the at least one locking latch arresting location, thereby preventing sliding displacement between the first utility module and the second utility module, and disengaging the second utility module from the first utility module is facilitated by disengaging the at least one locking latch from the at least one locking latch arresting location.

2. The utility assembly of claim 1, wherein the first and second utility modules are in a locking engagement when the one or more depressed locking locations and the one or more projecting portions are disposed behind one another.

3. The utility assembly of claim 1, wherein the one or more depressed locking locations and the one or more locking latch arresting locations are configured at the top face of the first utility module, and the one or more projecting portions and the at least one locking latch are configured at the bottom face of the second utility module.

4. The utility assembly of claim 1, wherein at least one second utility module is configured for snap-type locking over the first utility module.

5. The utility assembly of claim 1, wherein engaging the first and second utility modules into the locked position is provided by sliding the second utility module with respect to the first utility module along a sliding path defined by at least one of the at least one locking rib and the at least one locking tongue.

6. The utility assembly of claim 5, wherein the at least one locking rib extends substantially parallel to the sliding path.

7. The utility assembly of claim 6, wherein (i) the at least one locking rib extends substantially perpendicular and intersects the sliding path, (ii) a single locking rib extends at rear end of a depressed locking location and substantially perpendicular to the sliding path, (iii) two locking ribs extend at side edges of a depressed locking location and disposed substantially parallel to the sliding path, or (iv) two locking ribs each extend at a respective side edge of two neighboring depressed locking locations, the locking ribs disposed substantially parallel to the sliding path.

8. The utility assembly of claim 1, wherein a top face of the first utility module interlocks with a bottom face of the second utility module disposed thereover in one of a substantially fully overlapping relation or a partially overlapping relation.

9. The utility assembly of claim 1, further comprising a release latch for displacing the locking latch into disengagement from the locking latch arresting location can be disposed at a front face of the respective second utility module.

10. The utility assembly of claim 1, wherein the locking latch is configured for displacement in a direction substantially normal to a respective face of a utility module.

11. The utility assembly of claim 1, wherein two or more second utility modules are mountable over a first utility module, each of the two or more second utility modules being independently attachable and detachable over the first utility module.

12. The utility assembly of claim 1, wherein at least one of the first or second utility modules is a container module.

13. The utility assembly of claim 12, wherein the container module is characterized by at least one of the features selected from (i) the container module is compartmented, (ii) a top face of the container module is configured as a lid, (iii) the container module is a locomoting container, configured with an arrangement for locomoting the utility assembly, and (iv) the container module is configured with a carrying arrangement, the carrying arrangement being disposed at any one or more of faces of the container module.

14. The utility assembly of claim 1, wherein one or more of the first or second utility modules are a soft-shell container with at least a rigid face portion or wherein the first utility module is a mobile carrier unit.

15. The utility assembly of claim 1, wherein one or both of a front edge of the projecting portion and a corresponding front edge of the depressed locking location is slanted for gliding positioning of the second utility module into locking position over the first utility module.

16. A mobile carrier unit, comprising:
at least one carrier engagement surface compatible for interlocking engagement in a detachable manner with a first engagement surface of a utility module;
wherein the carrier engagement surface includes (i) one or more depressed locking locations each configured with a locking rib and at least one locking latch arresting location, configured for engagement with the first engagement surface of a utility module that includes at least one downwardly spring biased locking latch and one or more projecting portions, each of the one or more projecting portions being configured with a locking tongue, or (ii) at least one downwardly spring biased locking latch and one or more projecting portions each configured with a locking tongue for engagement with the first engagement surface of a utility module that includes one or more depressed locking locations, each of the one more depressed locking locations configured with a locking rib and at least one locking latch arresting location.

17. The mobile carrier unit of claim 16, wherein once associated with the utility module, the locking tongue becomes disposed in register with the one or more depressed locking locations, and at least one locking latch becomes disposed in register with the at least one locking latch arresting location.

18. An interface coupling module, comprising:
at least one engagement surface, compatible for interlocking engagement in a detachable manner with a first engagement surface of a utility module;
wherein the interface coupling module includes an engagement surface having (i) one or more depressed locking locations each configured with a locking rib and at least one locking latch arresting location, configured for engagement with the first engagement surface of a utility module that comprises at least one downwardly spring biased locking latch and one or more projecting portions, each projecting portion being configured with a locking tongue, or (ii) at least one downwardly spring biased locking latch and one or more projecting portions each configured with a locking tongue for engagement with the first engagement surface of a utility module that comprises one or more depressed locking locations, each depressed locking locations configured with a locking rib and at least one locking latch arresting location.

19. The interface coupling module of claim 18, being configured for detachable or fixed attachment to a surface of an object.

20. The interface coupling module of claim 18, being selected from the group consisting of a cargo interface module for a utility vehicle configured for attaching one or more utility modules to the vehicle, a surface mount for attaching utility modules, a tool mount or a tool rack, a belt mount for mounting of utility modules to a workers belt, and a coupling platform for coupling two utility modules to one another.

* * * * *